US011527171B2

(12) United States Patent
Freiwirth et al.

(10) Patent No.: US 11,527,171 B2
(45) Date of Patent: Dec. 13, 2022

(54) VIRTUAL, AUGMENTED AND EXTENDED REALITY SYSTEM

(71) Applicant: The Commons XR LLC, San Diego, CA (US)

(72) Inventors: Raphael Freiwirth, San Diego, CA (US); Mark Claude Lewison, West Hollywood, CA (US); Michelle Chiang, San Diego, CA (US); Nelson Thor Brickman, San Diego, CA (US)

(73) Assignee: THE COMMONS XR LLC, San Diego, CA (US)

( * ) Notice: Subject to any disclaimer, the term of this patent is extended or adjusted under 35 U.S.C. 154(b) by 325 days.

(21) Appl. No.: 16/854,743

(22) Filed: Apr. 21, 2020

(65) Prior Publication Data
US 2020/0335001 A1   Oct. 22, 2020

Related U.S. Application Data

(60) Provisional application No. 62/986,621, filed on Mar. 6, 2020, provisional application No. 62/903,710, filed on Sep. 20, 2019, provisional application No. 62/867,224, filed on Jun. 26, 2019, provisional application No. 62/837,141, filed on Apr. 22, 2019.

(51) Int. Cl.
*G09B 5/06* (2006.01)
*G06T 19/00* (2011.01)
*H04L 67/131* (2022.01)

(52) U.S. Cl.
CPC ............ *G09B 5/065* (2013.01); *G06T 19/006* (2013.01); *H04L 67/131* (2022.05)

(58) Field of Classification Search
None
See application file for complete search history.

(56) References Cited

U.S. PATENT DOCUMENTS

| 9,311,742 B1 * | 4/2016 | Glover .................... G06T 13/00 |
| 2011/0296163 A1 * | 12/2011 | Abernethy ............ G06F 1/3203 713/100 |
| 2015/0356788 A1 * | 12/2015 | Abe ...................... A63F 13/335 345/633 |
| 2016/0027336 A1 | 1/2016 | Towers et al. |

(Continued)

OTHER PUBLICATIONS

PCT/US2020/029367, International Search Report & Written Opinion (dated Sep. 4, 2020).

(Continued)

*Primary Examiner* — David H Chu
(74) *Attorney, Agent, or Firm* — Muncy, Geissler, Olds & Lowe, P.C.

(57) ABSTRACT

Systems, methods and apparatus for multi-realm, computer-generated reality systems are disclosed. A method for managing a multi-realm, computer-generated reality includes determining one or more variances between each activity of a first participant and a corresponding baseline activity for each of a plurality of activities associated with traversal of a managed reality system during a session, and quantifying the one or more variances to obtain a performance metric. The method includes combining at least one performance metric for each activity of the first participant to obtain a session performance measurement for the first participant.

28 Claims, 38 Drawing Sheets

(56) References Cited

U.S. PATENT DOCUMENTS

| | | | | |
|---|---|---|---|---|
| 2016/0180248 A1* | 6/2016 | Regan | ............... | G09B 5/00 |
| | | | | 706/12 |
| 2017/0090589 A1* | 3/2017 | Sharma | ............. | G06Q 30/0641 |
| 2017/0213473 A1* | 7/2017 | Ribeira | ............... | G16H 40/67 |
| 2018/0364803 A1* | 12/2018 | Khalid | ............... | G06F 3/04842 |

OTHER PUBLICATIONS

PCT/US2020/029367, International Preliminary Report on Patentability dated May 6, 2021. (27 pages).

* cited by examiner

Session/Dynamic Configuration (2200)

| Object Distance: | Medium |
|---|---|
| Lead Distance: | Medium |
| ... | ... |
| Time Variance: | Medium |

Object-1 Configuration (2210)

| Look-At Function: | Medium |
|---|---|
| Gather Function: | Medium |
| ... | ... |
| Visibility Function: | Medium |

Object-N Configuration

| Look-At Function: | Medium |
|---|---|
| Gather Function: | Medium |
| ... | ... |
| Visibility Function: | Medium |

Object-1 Performance (2220)

| | Dwell Time | Distances | | Activity Level |
|---|---|---|---|---|
| | | Object | Lead | |
| Participant-1 | 3:18 | 0.5 | 0.7 | 9 |
| Participant-2 | 3:14 | 1.5 | 0.4 | 8 |
| Participant-3 | 3:21 | 3 | 0.3 | 7 |
| Participant-4 | 0:55 | 5 | 0.1 | 3 |
| Participant-5 | 1:15 | x | x | 0 |
| ... | ... | ... | ... | ... |
| Participant-M | 2:10 | 2.2 | 3.1 | 8 |

2222 → Participant-1
2224 → Participant-4
2226 → Participant-5

Object-N Performance

| Dwell Time | Distances | | Activity Level |
|---|---|---|---|
| | Object | Lead | |
| 5:10 | 0.1 | 0.1 | 9 |
| 5:10 | 0.1 | 0.1 | 8 |
| 6:20 | 0.1 | 0.1 | 7 |
| 5:20 | 0.2 | 0.2 | 8 |
| 5:10 | 0.1 | 0.1 | 0 |
| ... | ... | ... | ... |
| 5:12 | 0.1 | 0.1 | 8 |

*FIG. 22*

VIRTUAL, AUGMENTED AND EXTENDED REALITY SYSTEM

PRIORITY

This application claims priority to and the benefit of U.S. Provisional Patent Application Ser. No. 62/837,141 filed in the U.S. Patent Office on Apr. 22, 2019, U.S. Provisional Patent Application Ser. No. 62/867,224 filed in the U.S. Patent Office on Jun. 26, 2019, U.S. Provisional Patent Application Ser. No. 62/903,710 filed in the U.S. Patent Office on Sep. 20, 2019, U.S. Provisional Patent Application Ser. No. 62/986,621 filed in the U.S. Patent Office on Mar. 6, 2020, the entire content of these applications being incorporated herein by reference as if fully set forth below in their entirety and for all applicable purposes.

TECHNICAL FIELD

The present invention relates generally to virtual reality, augmented reality and cross reality systems and more particularly to system that provides a universal entry to multiple virtual reality, augmented reality and cross reality systems.

BACKGROUND

Virtual reality (VR), augmented reality (AR) and cross reality or extended reality (XR) systems are deployed to provide specific services, including gaming and control systems. VR provides a computer-simulated reality in which a participant may be immersed in a gaming environment, a simulation used for training and some other emerging uses. AR provides computer-generated information that may be superimposed on a direct or captured view of a participant's physical environment. AR can provide contextually relevant information to the user and/or support gaming that is implemented in the physical world. XR may be used to describe applications employing a combination of VR and AR, including in human-machine interactive systems that involve closed loop control effected through a combination of sensors that provide tactile, auditory and visual feedback.

Conventional VR, AR and XR systems have been implemented using proprietary and/or standards-based protocols that provide limited constructs with limited interoperability. Devices used to provide input and/or output (I/O) are also designed with no great emphasis on interoperability. For example, a VR headset designed for a first gaming environment may not be directly usable in a second gaming environment. Users of multiple conventional VR and AR systems must generally establish a profile and presence in each VR and AR system to participate in activities involving computer-simulated reality. Configuration and operation of peripherals used in conventional VR and AR systems can also be complex, and it can be difficult to use peripherals across multiple VR and AR systems.

Improvements in interoperability and reduction in complexity configuration are needed to enable VR, AR and XR systems to realize their full potential.

SUMMARY

Certain aspects disclosed herein relate to improved methods and system for virtual and augmented reality system.

In one aspect of the disclosure, a method for managing a multi-realm, computer-generated reality includes receiving information generated by one or more sensors in a device worn by a participant in a session conducted on a managed reality system, where the information generated by the one or more sensors indicates a point of focus or a point of view of the participant, providing focus measurements for the participant based on the information generated by the one or more sensors, each focus measurement characterizing a duration of focus of the participant on a leader of the session or on one or more objects indicated by the leader of the session while engaged in a plurality of activities associated with the session, calculating variances between the focus measurements for the participant and corresponding baseline focus measurements for the session, and generating a session performance metric for the participant by quantifying the variances.

In some examples, the method includes authenticating a user of a reality context at a controller that manages or controls the multi-realm, computer-generated reality, configuring a logical connection between the reality context and the multi-realm, computer-generated reality using one or more physical communication channels, and establishing presence of the user as the participant in the multi-realm, computer-generated reality through the logical connection while maintaining presence of the user in the reality context.

In one aspect of the disclosure, a method for managing a multi-realm, computer-generated reality includes determining one or more variances between each activity of a first participant and a corresponding baseline activity for each of a plurality of activities associated with traversal of a managed reality system during a session, and quantifying the one or more variances to obtain a performance metric. The method includes combining at least one performance metric for each activity of the first participant to obtain a session performance measurement for the first participant. In some instances, performance metrics can be used for future persistence and retention predictors.

In one aspect the baseline activity relates to a leader of the session. The baseline activity may be obtained from an aggregation of prior sessions. The one or more variances may include a difference in location of an avatar of the first participant from an avatar of a leader of the session. The one or more variances may include a difference in time of arrival of an avatar of the first participant at a location and a corresponding time of arrival of an avatar of a leader of the session at the location. The one or more variances may include a difference in time of departure of an avatar of the first participant from a location and a corresponding time of departure of an avatar of a leader of the session from the location. The one or more variances may include a difference in dwell time of an avatar of the first participant at a location and a corresponding dwell time of an avatar of a leader of the session at the location.

In one aspect, the method includes determining a level of attention parameter for the first participant based on input received from one or more sensors managed by equipment operated by the first participant while participating in the session, and combining the level of attention parameter with the at least one performance metric for each activity of the first participant when obtaining the session performance measurement for the first participant. The one or more sensors may include a motion sensor. The one or more sensors may include a location sensor. The one or more sensors may include an audio sensor.

In one aspect, determining the level of attention parameter includes monitoring chat activity of the first participant. Determining the level of attention parameter may include monitoring accesses of system information by the first participant.

The computer-generated reality may involve a simulation. The computer-generated reality may implement an experiential teaching reality.

BRIEF DESCRIPTION OF THE DRAWINGS

FIG. 22 illustrates an example of a participation report that may be generated for a session in a multi-participant environment in accordance with certain aspects of this disclosure.

DETAILED DESCRIPTION

Figure 1:
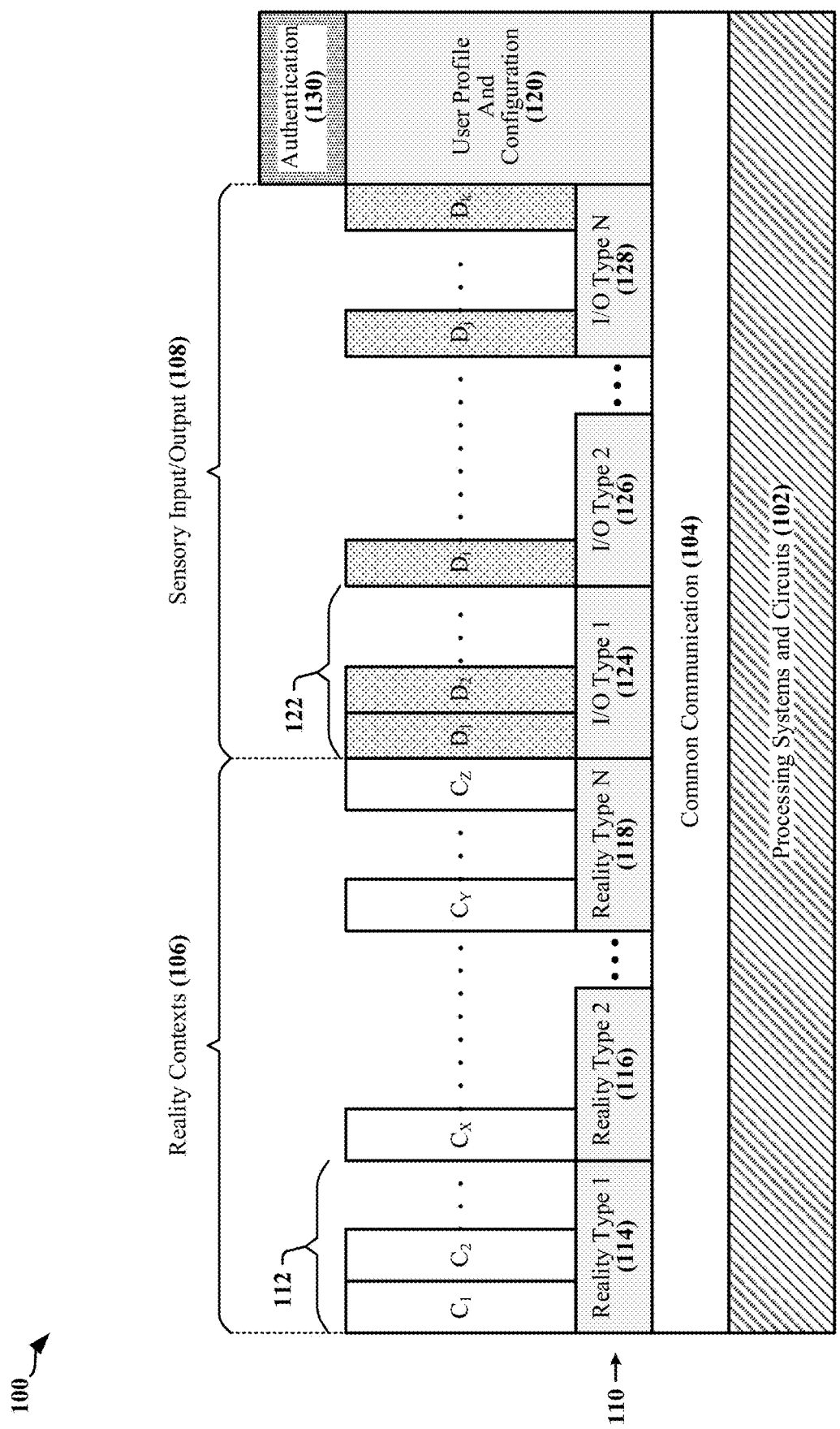
FIG. 1 illustrates an example of a system that enables coexistence and cooperation between multiple instances of computer-generated or computer-assisted realities in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of VR, AR and XR systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. In addition, the term "headset" will be used synonymously for any type of headset, head-mounted device (HMD), goggle, or glasses that provides either VR and/or AR capabilities, either independently, or together.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to VR, AR and XR environments. A controller that interlinks multiple computer-generated realities may authenticate participants of a first device and a second device coupled to the controller, receive a message from the first device, the message including a request to participate in a multi-realm application, configure a first communication path between the controller and the second device, configure a second communication path between the first device and the second device, and send at least one message related to the multi-realm application over the first communication path.

The communication paths provide a method for providing in a multi-realm, computer-generated reality the capability to determine one or more variances between each activity of a first participant and a corresponding baseline activity for each of a plurality of activities associated with traversal of a managed reality system during a session, and quantifying the one or more variances to obtain a performance metric.

Aspects of VR, AR and XR Systems

According to certain aspects disclosed herein, VR, AR and XR systems may be provided using a combination of processing devices and systems that can communicate with one another to some extent. VR, AR and XR systems are typically developed and operate in accordance with one or more proprietary standards and protocols. In one example, a VR game may be developed by a first provider according to a set of programming interfaces and/or protocols that define the structure of systems and software that can interoperate with products and services deployed by other providers. Certain aspects disclosed herein provide or enable a platform that can provide interoperability between disparate VR, AR and XR systems and experiences regardless of the nature of the systems and software used to develop and deploy the disparate VR, AR and XR systems and experiences.

FIG. 1 illustrates an example of an architecture for a system 100 that can support or enable coexistence and cooperation between multiple participants accessing multiple VR, AR and/or XR systems and/or multiple instances of computer-generated or computer-assisted realities (experiences). The system 100 may be constructed on one or more processing systems and/or processing circuits 102. In one example, the system 100 may implement a closed environment used for simulating a complex machine, where the virtual environment is generated using one or more processing circuits operated under unified control and interacting with processing systems that manage feedback sensors, transducers and other electromechanical simulation devices. In another example, the system 100 may implement a multiparticipant online educational environment, where each participant or small group of participants participates through a console (such as a gaming console), personal computer, mobile telephone or other communication device. In another example, the system 100 may implement a multiplayer online role-playing game, where each player or small group of players participates through a gaming console, personal computer, mobile telephone or other communication device.

In the illustrated example, the system 100 may include a common communication infrastructure 104 that interconnects the components of the processing systems and/or processing circuits 102 and that provides communication channels between VR, AR and XR instances, which may be referred to herein as reality contexts 106. The common communication infrastructure 104 includes some combination of electronic circuits and software configured to implement communication protocols. The common communication infrastructure 104 may be distributed among different physical devices. The common communication infrastructure 104 implemented independently in different devices may cooperate through one or more networking technologies.

The common communication infrastructure 104 may provide a transport mechanism that carries control and data between input/output devices 108 and/or between individual reality contexts 106 and certain input/output devices 108. The communication channels may be implemented using any available and/or suitable network interface and associated networking protocols. The input/output devices 108 may include keyboards, mice, joysticks, location sensors, microphones, cameras, motion detectors, as well as audio playback devices, displays and other video outputs including display systems, smart glasses and gaming headsets.

An adaption subsystem 110 is provided to interface each reality context 106 and input/output device 108 with the common communication infrastructure 104 and, through the common communication infrastructure 104, with other reality contexts 106 and/or other input/output devices 108. In the illustrated example, a first group of the reality contexts 112 ($C_1$ to $C1_{X-1}$) may be developed according to a first set of programming interfaces and/or protocols and a first adapter 114 may be implemented to convert input, output, definitions, descriptors and behaviors of the first group of reality contexts 112 to a common set of input, output, definitions, descriptors and behaviors. Other groups of the reality contexts 106 may be developed according to other sets of programming interfaces and/or protocols and other adapters 116, 118 may be implemented to convert input, output, definitions, descriptors and behaviors to the common set of input, output, definitions, descriptors and behaviors.

Adapters 124, 126, 128 may be provided for each type of the input/output devices 108 or group 122 of the input/output devices 108. The adapters 124, 126, 128 may be configured to convert device-specific resolution, capabilities, sensitivities, definitions of the input/output devices 108 to a common set of resolutions, capabilities, sensitivities, definitions. The system 100 may maintain participant-specific configuration information 120 that can be accessed after the participant has been authenticated by the system. The configuration information 120 may include participant profile information, subscriptions, credit, metadata, avatars, licenses and/or other parameters that affect the participant's presence, appearance, personality and/or imagery in different reality contexts 106.

Figure 2:
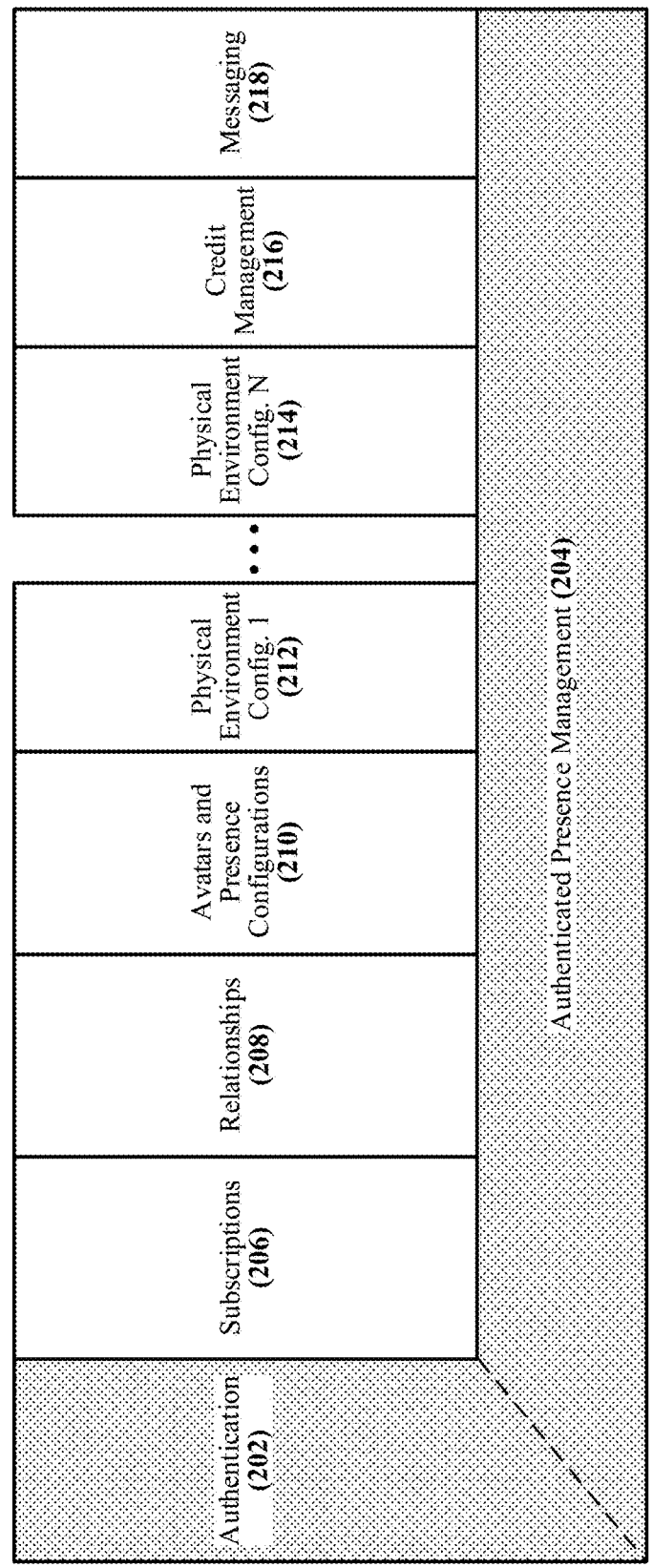
FIG. 2 illustrates an example of participant profile and configuration information in accordance with certain aspects disclosed herein.

FIG. 2 illustrates certain aspects related to an example of participant profile and configuration information 200, which may correspond to the configuration information 120 illustrated in FIG. 1. The participant profile and configuration information 200 may be accessed through an authentication function 202, which may use or include any number of hardware and software security features that can be operated to limit access to the system 100 to authorized participants. Security features may range from biometric information to password controls. When authenticated, the participant may access a presence management utility 204 that permits the participant to access or modify features and/or enter one or more reality contexts 106. The features may include subscriptions 206 that identify the reality contexts 106 available to the participant and that define rights, benefits, status and participation level in each accessible reality context 106. A subscription may define a participant's rights, benefits, status and participation level in a corresponding reality context 106. The features may include relationships 208 that identify certain other participants and the nature of the association between the associated participants and the participant.

The features may include presence information 210. Presence information may include parameters defining skill level, input/output capabilities of systems, an avatar, historical performance and other information. The features may include information 212, 214 describing one or more system environments available to the participant for accessing one or more VR, AR and/or XR systems. The features may include credit management information that defines acquired or accumulated benefits and/or payment methods to be used in expanding or sustaining the participant presence in one or more reality contexts 106, as well as licensing credits or fees that may be involved with any of the described features of the participant profile and configuration information 200. Certain features may be stacked according to different group environments that involve or are associated with the participant, and which may include overlapping or separate reality contexts 106 intersecting certain input/output devices 108 that may include sensor input devices associated with the participant.

The features may include messaging 218. Messaging 218 may define communication at various levels. For example, the participant may define limitations on audio, texting and in-game communication used to communicate with other participants. In another example, the participant may configure networking parameters that permit personal computing equipment to connect with other processors in the common communication infrastructure 104.

Figure 3:
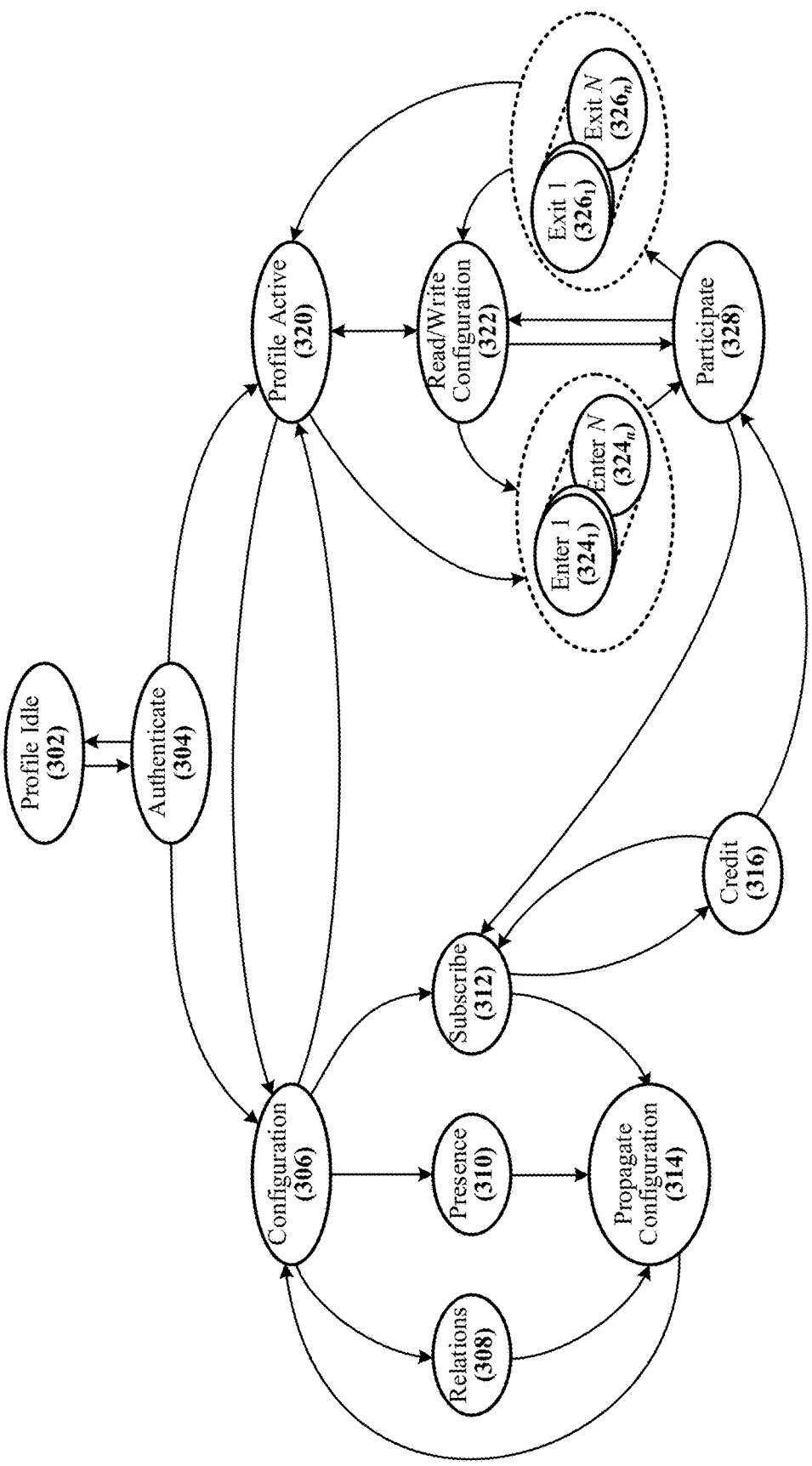
FIG. 3 is a state diagram illustrating participant entry to the system of FIG. 1 and certain aspects related to configuration in accordance with certain aspects disclosed herein.

FIG. 3 is a state diagram 300 illustrating user entry to the system 100 and certain aspects related to configuration. The state diagram is provided as an example and shows certain, but not all possible states and transitions. The user may have a presence represented by a user profile. Initially, the user profile is in an idle state 302, and typically remains in the idle state 302 until the user attempts entry to the system 100. The user profile may enter an authentication state 304 in which the user is challenged to prove identity. If the user fails to provide authenticating information sufficient to prove identity, the user profile may return to the idle state 302. If the user provides authenticating information sufficient to prove identity, the user may become a participant, and the user profile may enter an active state 320 or a configuration state 306. The term "participant" may be applied to a user that has been authenticated and is granted access to the TCXR system. In some instances, a participant may select between the active state 320 and the configuration state 306. The participant may move between the active state 320 and the configuration state 306 as needed or desired.

In some implementations, the participant may navigate from the configuration state 306 to configure relationships 308, presence 310 or subscriptions 312. Updates to the user configuration may be captured and propagated at state 314, before the user profile returns to the highest-level configuration state 306. The user profile may be propagated to associated participants with whom the participant has an association or affiliation and/or to one or more reality contexts 106 or managers of reality contexts 106. In some instances, a credit profile 316 may be configured or accessed from the configuration state 306. In one example, the credit profile 316 may be accessed in relation to configuration of subscriptions 312.

In some implementations, the active state 320 may be used to enter one or more realities $324_1$-$324_N$ in order to participate in the services or events provided by the one or more realities and may the participant may exit from the one or more realities $326_1$-$326_N$. In some implementations, the participant may participate in multiple realities simultaneously. The user profile may be updated and/or read from the active state 320, upon entry or exit to one or more realities and/or while in the participation state 328. In some instances, the participant may access and update the subscriptions 312 and/or the credit profile 316.

Figure 4:
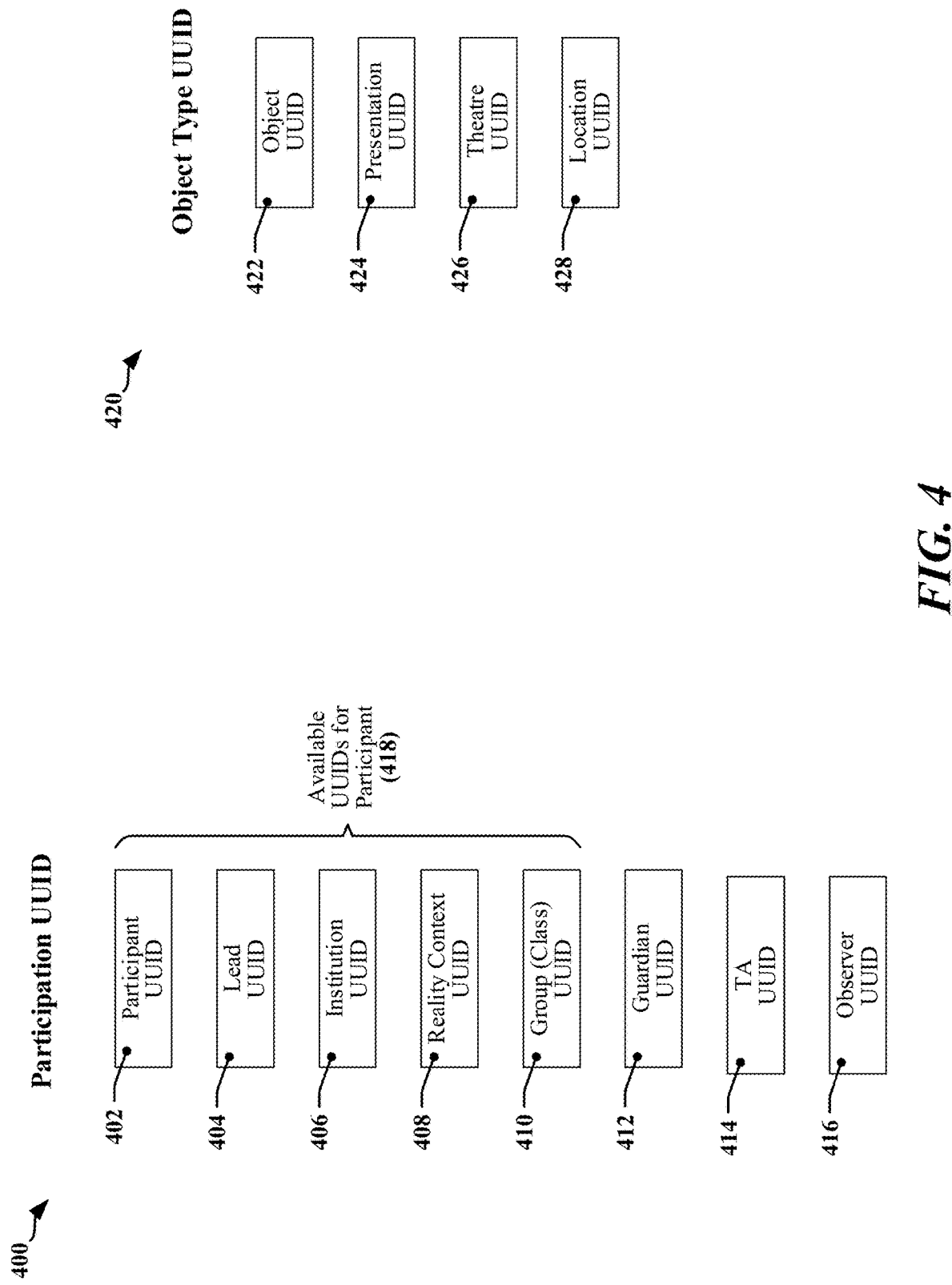
FIG. 4 illustrates Unique User IDs configured in accordance with certain aspects of the disclosure.

With reference to FIG. 4, upon authentication, and before the participant is permitted to participate in a reality context, a number of Unique User IDs (UUIDs) 418 can be selected from available types of UUIDs 400 and/or combined to identify, authorize and/or enable the authenticated user to access and use features of the TCXR system. The types of UUIDs 400 include, but are not limited to, participant UUID 402 ("P-UUID"), institution UUID 406 ("I-UUID"), lead UUID 404 ("L-UUID") including UUIDs for docents, instructors, guides, escorts, motivators, and other leaders, Group UUID 410 ("G-UUID") related to class, instruction, and/or lessons, Reality Context UUID 408 ("R-UUID"), Guardian UUID 412 ("X-UUID"), TA UUID 414 ("T-UUID"), and observer UUID 416 ("O-UUID"). One or more of the UUIDs 400 can be grouped and matched in numerous ways for authorizing a participant to enter one or more reality contexts. It also allows for various parties to be able to monitor or help a lead through a reality context. Other examples UUIDs are provided in the partial list of UUIDs 420 in FIG. 4. The list includes UUIDs 420 that may be used within reality contexts to identify or illustrate objects or concepts (object UUID 422 or "Oo-UUID); presentation UUID 424 or "Op-UUID"; theatre UUID 426 or "Ot-UUID"; Location UUID 428 or "Ol-UUID") may also have authorization considerations depending upon the participant. Certain other types of UUIDs not shown in the list but disclosed herein include CL-UUID, CT-UUID, CM-UUID, etc., which may include UUIDs that can be used within reality contexts to better detail TCXR characteristics for an object.

Figure 5:
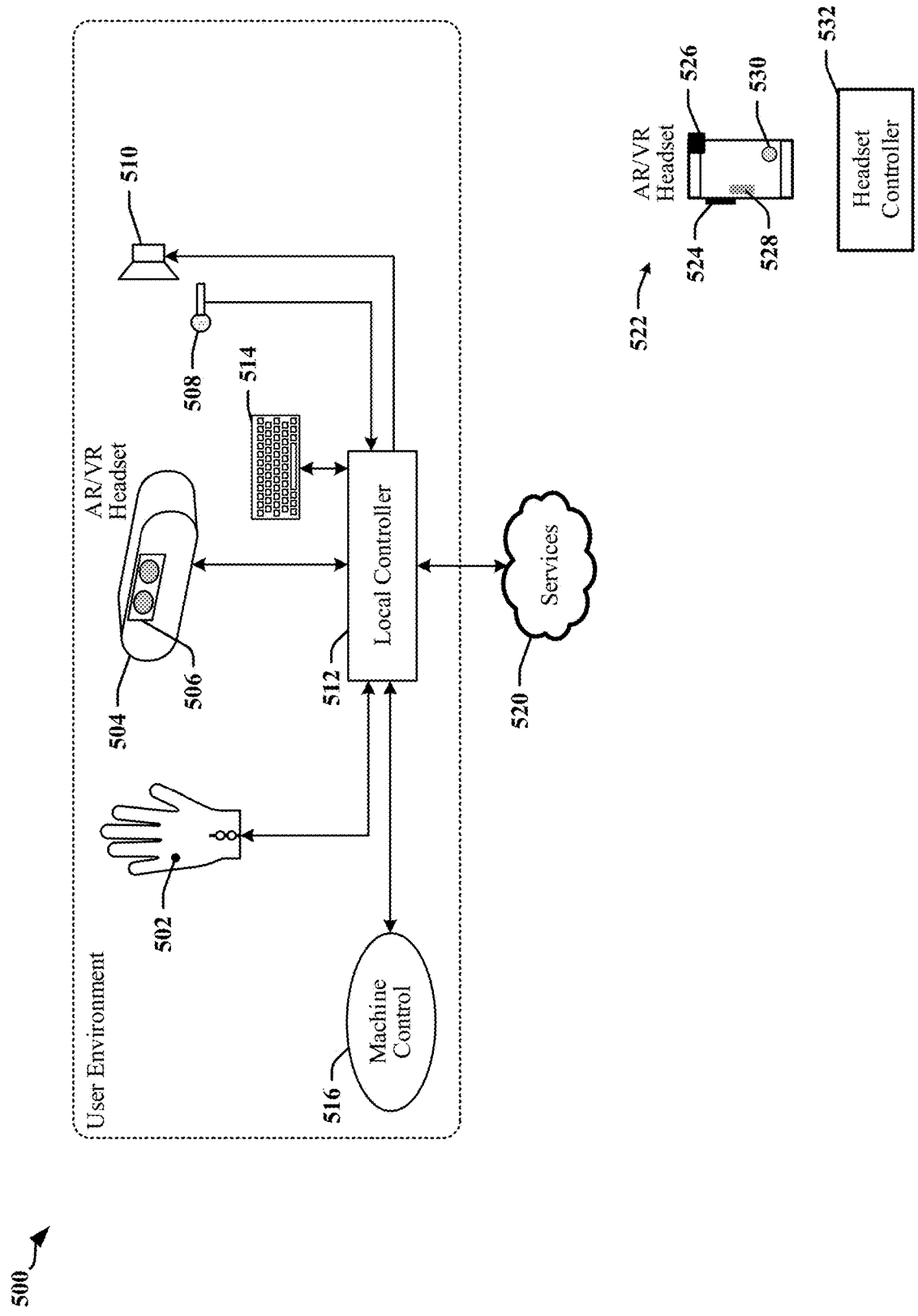
FIG. 5 illustrates an environment that permits a participant to participate in one or more VR, AR and/or XR realities in accordance with certain aspects disclosed herein.

FIG. 5 illustrates a participant environment 500 that permits a participant to participate in one or more VR, AR and/or XR realities in accordance with certain aspects disclosed herein. The illustrated participant environment 500 is but one example and other combinations of peripherals, systems and services may be combined to provide a VR, AR and/or XR experience in accordance with certain aspects disclosed herein. A participant may interact with a VR, AR and/or XR reality through video, audio and tactile input and output.

Tactile input and output may be provided in wearable equipment 502 and may include sensors and/or transducers that can detect or induce motion, pressure, temperature, impact, orientation, shape, or other sensible parameters. The wearable equipment 502 may include gloves, helmets, headsets and/or other items that can be worn or carried by a participant. In the illustrated example, tactile input and output may be coupled to a local controller 512 associated with the participant.

Video input and output may be provided using displays and cameras associated with the participant. In some instances, headsets 504 worn by a participant may display images and may include one or more cameras 506 usable to capture still and/or video images. Video input and output may also be provided using displays and cameras that are present in a location visited or occupied by a participant, and such locational video equipment may be independently coupled to a centralized system or to a local controller 512 associated with the participant.

Audio input and output may be provided using loudspeakers 510 and microphones 508, which may be incorporated in a headset 504. Audio input and output may also be provided using loudspeakers and microphones that are present in a location visited or occupied by a participant, and such locational audio equipment may be independently coupled to a centralized system or to a local controller 512 associated with the participant.

The participant may also use a keyboard 514, mouse and/or other input devices to interact with one or more VR, AR and/or XR realities. Such input devices may be coupled to the local controller 512 or to another device operated by the participant.

The participant may also interact with electromechanical equipment 516 that is controllable through the one or more VR, AR and/or XR realities. The electromechanical equipment 516 may include flight simulators, gaming equipment and props associated with games. Such electromechanical equipment 516 may be coupled to the local controller 512 or to another device operated by the participant.

Interoperability

Certain aspects disclosed herein provide a platform that can support and/or interconnect multiple types of VR, AR and/or XR realities. The platform enables coexistence and cooperation between different active VR, AR and/or XR systems and can permit a participant to participate concurrently in multiple instances of computer-generated or computer-assisted realities or experience). In one example, a participant may interact concurrently with one or more VR, AR and/or XR realities through the participant environment 500 illustrated in FIG. 5.

The platform may convert input received from the participant environment 500 to a set of common descriptors and functions that can map physical equipment to a model apparatus or combination of devices and/or sensors, source of input or other sink of information generated by a VR, AR and/or XR system. The platform may provide information output for transmission to the participant environment 500 from information encoded as a set of common descriptors that represents a model transducer or destination in the participant environment 500. In various examples, the platform provides services 520, which may include translators or machine learning features that enable harmonization and interaction of participant environment 500 input and output with machine controllers, different types of tactile information converters, and different formats of video, audio, images and/or three-dimensional (3D) representations of objects.

Different types of headset may be used in the participant environment 500. For instance, the headset 522, which is depicted from a side view, includes front-facing cameras 524 that may be used both for AR and motion detection capabilities. The Services 520 may be used to interpret both the images and/or the motion seen through the front-facing cameras 524. An internal, inward-facing camera 528 can be used to provide eye-tracking capability or for personal identification using biometric markers (iris scanning markers, for example). The headset 522 may have both front-facing cameras 524 and internal, inward-facing cameras 528 to facilitate both of these services. In some instances, the headset 522 may incorporate a single front-facing camera 524 and a single inward facing camera 526. Other types of headsets may include straps for charging, connectors for an attached wired controller or wireless controller 532. Headsets 522 may also incorporate IoT sensors 530 and/or function specific sensors for detecting motion, whether the participant is wearing the headset 522, or audio input. For example, a microphone may be included to help identify a participant using voice recognition.

Figure 6:
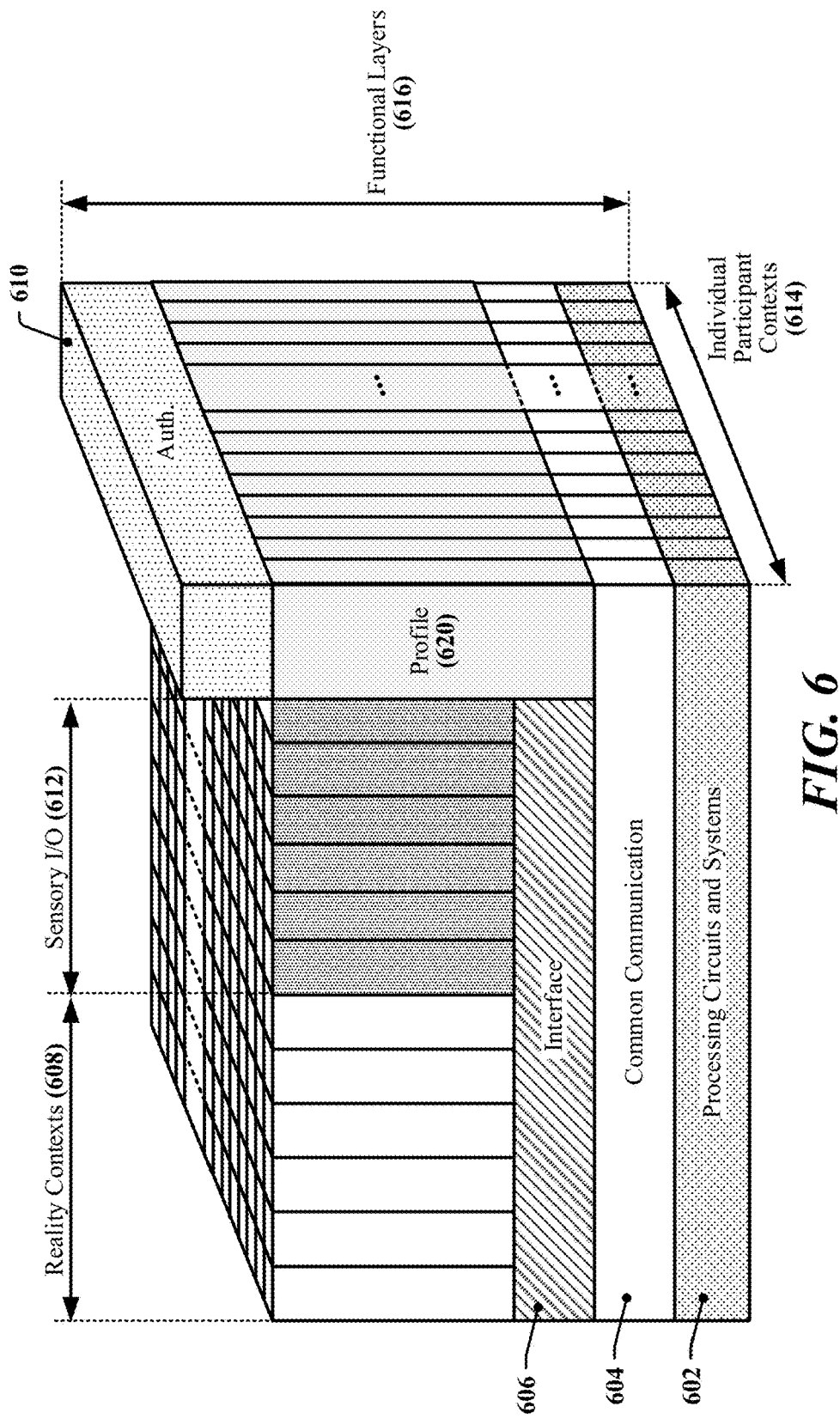
FIG. 6 illustrates an architecture of an integrated VR, AR and/or XR system that may be adapted in accordance with certain aspects disclosed herein.

In accordance with certain aspects disclosed herein, multiple participant environments 500 may be integrated with different proprietary VR, AR and/or XR systems and public sources of VR, AR and/or XR related information. FIG. 6 illustrates an architecture 600 representing one implementation of one example of an integrated VR, AR and/or XR system. The architecture 600 is represented in three dimensions with multiple functional layers 616 and multiple participant contexts 614. A participant context 614 may refer to the collection of all objects, rights, privileges, preferences and meta data which can be used by a participant across one or more reality contexts to instantiate the participant's presence, provide the participant with correct privileges, link participants to other reality contexts and present links to other participants within the current reality context where participant contexts overlap. Each participant context 614 may be implemented using the system 100 illustrated in FIG. 1. Each participant context 614 is represented as a slice of the architecture 600, such that the third dimension of the architecture 600 is composed of multiple instances of the system 100, where each system 100 can be implemented using different combinations of hardware, software and peripheral devices. In many instances, the architecture 600 may be better represented in more than three dimensions to reveal certain relationships that are not adequately represented in three dimensions.

In certain implementations, a participant context 614 at any time may incorporate at least a portion of one or more reality contexts 106, and a reality context 106 may be modified by association with one or more participant contexts 614. A participant context 614 may also be considered to be an instance of the reality context for an individual participant or for a group of participants that includes that individual participant. In one example, a reality context 106 may be modified when a participant enters the associated VR, AR and/or XR space. The participant may enter a VR, AR and/or XR space with certain objects, images, audio and/or video feeds. In another example, a reality context 106 may be modified to assimilate information that is made available when one or more sensors associated with a participant entering VR, AR and/or XR space become accessible within the reality context 106. A modified reality context may also be an instance of a reality context for the entering participant or a group of entering participants.

A processing layer 602 may include the various processing circuits, systems and operating software that support the individual participant contexts 614, or parts of the participant contexts 614. For example, a participant context 614 may be supported by a gaming console or personal computer. A single participant context 614 may be supported by multiple processing circuits, including remotely-located processing circuits that operate as a server, translation system or the like. Some processing circuits and systems in the processing layer 602 may support multiple participant contexts 614 or multiple parts of multiple participant contexts 614.

A common communication layer 604 may include the devices, circuits, communication networks and interfaces that enable individual participant contexts 614 to communicate with one another. In one example, the common communication layer 604 may implement, include or be coupled to a wireless local network, a wide area network and/or one or more cellular networks. An interface layer 606 includes circuits and/or modules that can translate between individual VR, AR and/or XR systems and components to corresponding VR, AR and/or XR systems and components in a common reality environment. In some implementations, the common reality environment is implemented as a virtual reality operating system (VROS). In some examples, the VROS enables a VR system to communicate seamlessly with an XR system, including when the VR and XR systems use different techniques and models for representing actions, sensory information received from sensory I/O 612, video, audio, images and/or 3D representations of objects.

Each participant context 614 may support one or more reality contexts 608 based on participant subscriptions. The reality contexts 608 may be resident in the participant context when active. In some instances, an idle reality context may be resident when the participant is not actively engaged with the idle reality context, such that the idle reality context may produce alerts, messages and other information to the participant and/or to active reality contexts. Subscriptions, reality context activity, avatars and other configuration and system management information may be maintained as a participant profile 620, accessible through an authentication function 610. The authentication function 610 can identify participants and provide access to corresponding participant contexts 614 available to an authenticated participant. In some instances, an authenticated participant may be provided access to more than one participant context 614. In some examples, a participant may establish a relationship with another participant that defines limited access to another participant context 614.

Figure 7:
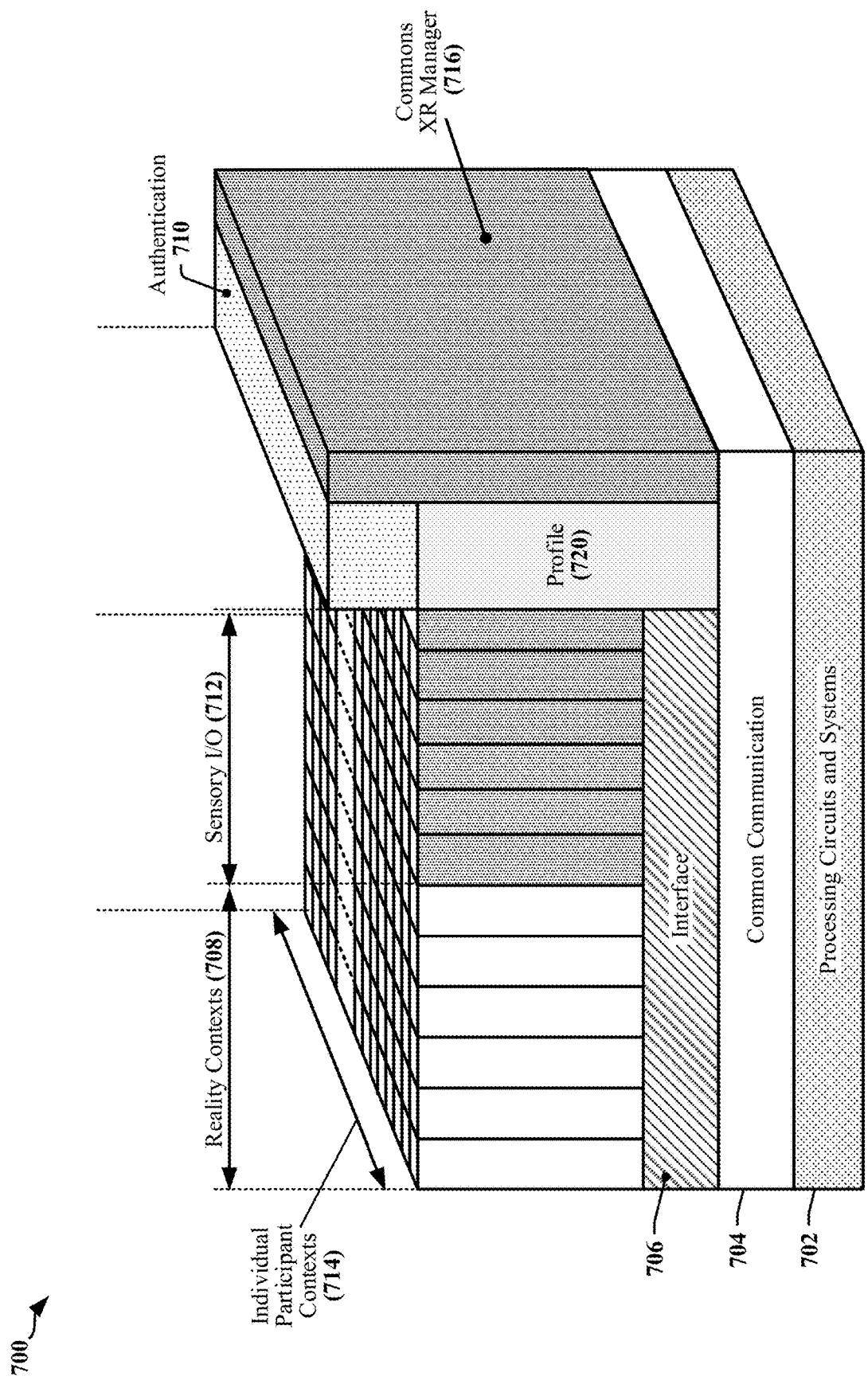
FIG. 7 illustrates an example of a managed system architecture that may be provided in accordance with certain aspects disclosed herein.

FIG. 7 illustrates an example of a managed system architecture 700 that may be provided in accordance with certain aspects disclosed herein. The architecture 700 supports multiple participant contexts 714 that may be implemented using the system 100 illustrated in FIG. 1, where each participant context 714 is represented as a slice in the third dimension of the managed system architecture 700. A processing layer 702 may include the various processing circuits, systems and operating software that support the individual participant contexts 714. For example, a participant context 714 may be supported by a gaming console or personal computer. A single participant context 714 may be supported by multiple processing circuits, including remotely-located processing circuits that operate as a server, translation system or the like. Some processing circuits and systems in the processing layer 702 may support multiple participant contexts 714. A common communication layer 704 may include the devices, circuits, communication networks and interfaces that enable components of the managed system architecture 700 to communicate with one another. An interface layer 706 includes circuits and/or modules that can translate between individual VR, AR and/or XR systems and components to corresponding VROS systems and components. Each participant context 714 may support one or more reality contexts 708 based on participant subscriptions, including certain reality contexts may be resident in the participant context 714 when active.

Subscriptions, reality context activity, avatars and other configuration and system management information may be maintained as a participant profile 720, accessible through an authentication function 710. The authentication function 710 can identify participants and provide access to corresponding participant contexts 714 available to an authenticated participant. In some instances, an authenticated participant may be provided access to more than one participant context 714. In some examples, a participant may establish a relationship with another participant that defines limited access to another participant context 714.

Relationship-based access and participation in multiple reality contexts 708 may be managed by a common management and/or control layer, which may be referred to herein as a Commons XR Manager 716. In one example, a participant may register multiple reality contexts 708 with the Commons XR Manager 716. In another example, two or more participants may register and/or configure a relationship with the Commons XR Manager 716 such that the Commons XR Manager 716 can control access and participation in one or more reality contexts 708 available to the participant contexts 714 associated with corresponding or related participants. Multi-realm applications may be supported, managed and operated through the Commons XR Manager 716. A multi-realm application may operate across multiple reality contexts 708 and/or multiple participant contexts 714.

The Commons XR Manager 716 may represent an authenticated participant in multiple contexts and a corresponding participant profile 720. In one example, the Commons XR Manager 716 may interact with a participant profile maintained for the participant in order to propagate aspects of the participant profile to profiles used by reality contexts 708 and/or other applications. In one example, the participant may define an avatar to represent the participant in multiple realities, and the Commons XR Manager 716 may format and communicate an avatar descriptor to each of the realities. In another example, the Commons XR Manager 716 may obtain permissions to use purchases made in one reality context 708 in other, unrelated reality contexts 708.

The Commons XR Manager 716 may establish and/or maintain connections between multiple reality contexts accessible and/or occupied by an authenticated participant. The Commons XR Manager 716 may configure channels through the common communication layer 704 that enable information related to the authenticated participant to be exchanged between two or more reality contexts 708, two or more sensory input/output devices 712 and between one or more reality contexts 708, one or more sensory input/output devices 712. The Commons XR Manager 716 may configure VROS translators to support participant-specific types of input/output devices 712. In some instances, the Commons XR Manager 716 may configure VROS reality contexts to provide compatibility between different types of reality contexts 708.

Figure 8:
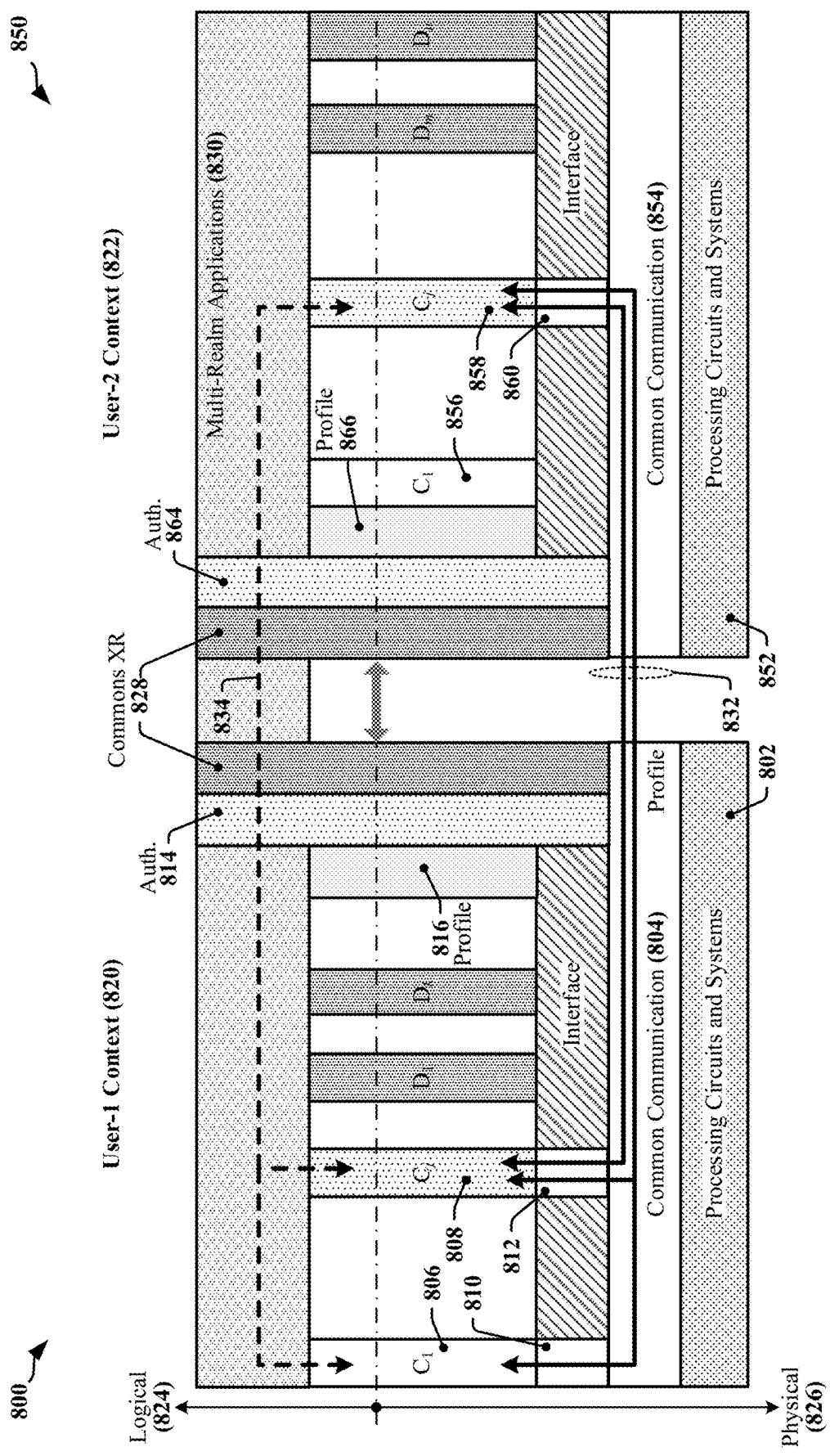
FIG. 8 illustrates an example of a relationship constructed between two participants by a Commons XR Manager implemented according to certain aspects disclosed herein.

FIG. 8 illustrates an example of a relationship 800 constructed between two participants by the Commons XR Manager 716 according to certain aspects disclosed herein. The relationship is illustrated in a logical domain 824 and in an underlying physical domain 826. A first participant context 820 may be implemented using first processing circuits and systems 802, while second participant context 822 is implemented using second processing circuits and systems 852. In some instances, the first participant context 822 and the second participant context 822 may share at least some parts of the processing circuits and systems 802, 852. Respective common communication layers 804, 854 enable communication between the participant contexts 820, 822. Each participant context 820, 822 supports multiple reality contexts, including certain reality contexts 806, 808, 856, 858 that are supported or accessible to both participant contexts 820, 822.

A Commons XR Manager 828 that has presence in both participant contexts 820, 822 may establish logical connections 834 between one or more reality contexts 806, 808, 856, 858 in each participant context 820, 822. The logical connections 834 may be requested by a participant and/or by one or more multi-realm applications 830. For example, a multi-realm application 830 may request that a logical connection 834 be established between instances of the same reality context 808, 858 maintained on both participant contexts 820, 822 in order that avatars of the two participants can interact in a manner that is not provided or otherwise supported by the reality context 808, 858. Responsive to the request, the Commons XR Manager 828 may cause one or more physical communication paths 832 to be established between the participant contexts 820, 822 to implement and support the logical connection 834. In some implementations, information generated at one of the participant contexts 820, 822 in relation to the logical connection 834 may be routed through the Commons XR Manager 828 and/or the physical communication paths 832. The Commons XR Manager 828 may operate as a router and/or translator in this respect. In some instances, the Commons XR Manager 828 may configure the physical communication paths 832 to establish the logical connection 834 and may have limited interaction with communications associated with the logical connection 834, including in implementations where the multi-realm application 830 is responsible for end-to-end communication between reality contexts 808, 858 after the physical communication paths 832 are established.

In some implementations, multi-realm applications 830 may be executed independently in the two participant contexts 820, 822 and may support interactions between two or more shared reality contexts 806, 808, 856, 858. In one example, a multi-realm application 830 may establish a logical connection 834 between reality contexts 806, 808 maintained in the first context and a reality context 858 maintained in the second context. The Commons XR Manager 828 may configure the corresponding physical communication paths 832 through the common communication layers 804, 854. The Commons XR Manager 828 may manage the nature of the communication between reality contexts 806, 808 in accordance with authorization functions 814, 864 in the respective participant contexts 820, 822.

According to certain aspects of this disclosure, the participant contexts 820, 822 may include a virtual reality context and an augmented reality context. The Commons XR Manager 828 may configure a participant experience that permits participants to seamlessly transition between the virtual reality context and an augmented reality context, either singularly or as a group. In one example, a group may congregate in a physical location, where each member of the group enters an augmented reality context that enables a leader to provide information and/or manage certain initial activities. The activities may include a briefing of group participants, taking a rollcall, assigning tasks and responsibilities, establishing rules and conditions, equipment check and so on.

In some instances, the augmented reality context may enable assembled group members to visualize and interact with remote participants who are operating in a vertical reality context associated with the group. The group may then transition from the augmented reality context to a virtual reality context when directed by the leader.

Figure 9:
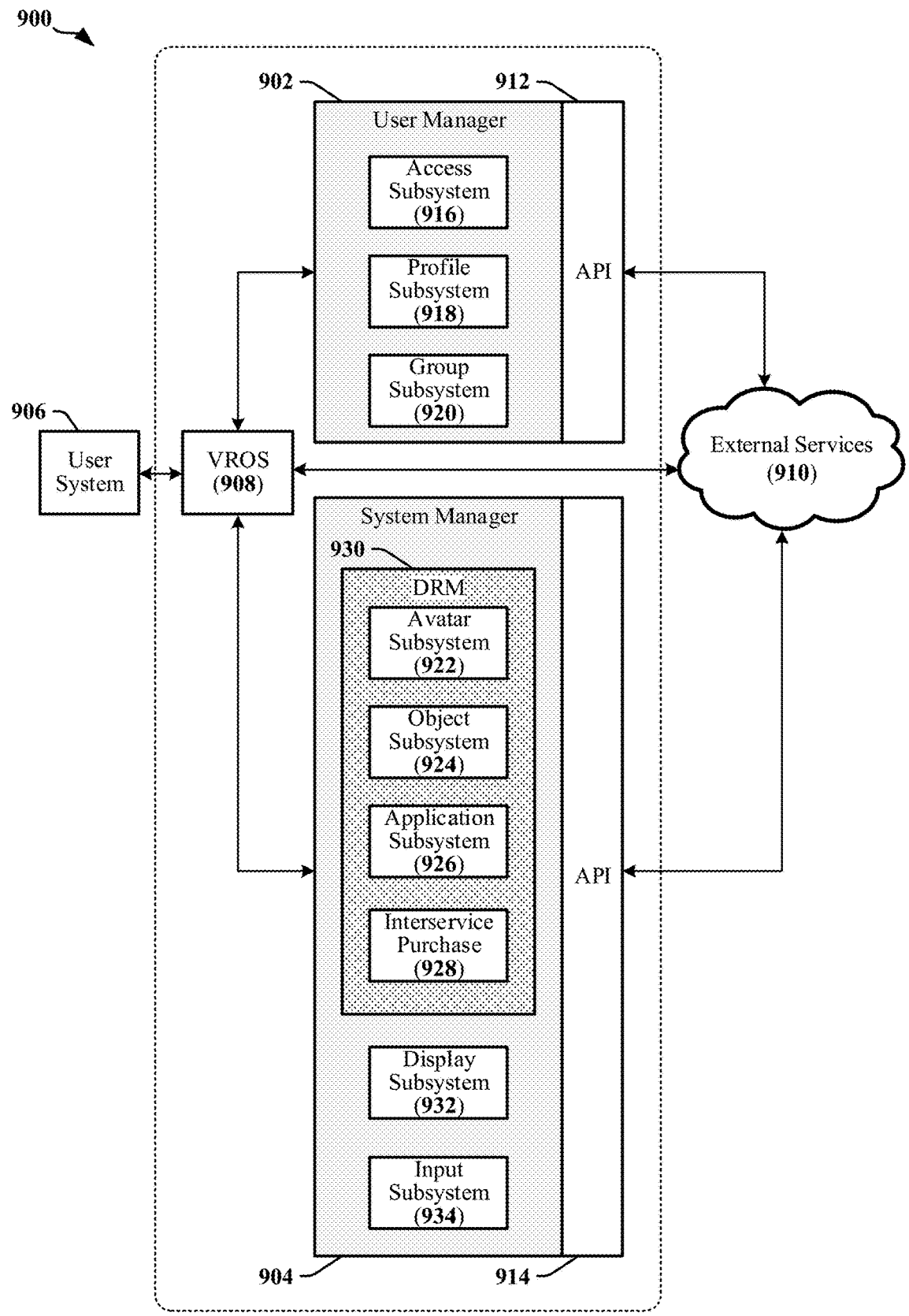
FIG. 9 illustrates an example of a logical system architecture that includes a Commons XR Manager provided in accordance with certain aspects disclosed herein.

FIG. 9 illustrates an example of a logical system architecture that includes a Commons XR Manager 900 provided in accordance with certain aspects disclosed herein. The Commons XR Manager 900 includes a participant manager 902 and a system manager 904 and may include or cooperate with a VROS 908. The participant manager 902, system manager 904 and VROS 908 may interact with one or more external services 910. The external services 910 may provide access to a VR, AR and/or XR space. The external services 910 may interact with the participant manager 902 and system manager 904 through respective interfaces 912, 914 and/or through the VROS 908. In some implementations the interfaces 912, 914 include application programming interfaces. The interfaces 912, 914 and/or interfaces associated with the VROS 908 may translate and/or conform descriptions of VR, AR and/or XR features to corresponding features of the VROS 908. The features may include video format, audio format, image format, formats for 3D representations of objects, avatars, as well as tactile input and output. A participant system 906 may interact with the VROS 908, and one or more interfaces associated with the VROS 908 may translate and/or conform descriptions of VR, AR and/or XR features to corresponding features of the participant system 906.

The participant manager 902 interacts with participant profiles and authentication systems. In the illustrated Commons XR Manager 900, the participant manager 902 may include an access manager 916 that manages and controls access rights of each participant. The access manager 916 may determine and communicate access rights of each participant to the various external services 910.

In the illustrated Commons XR Manager 900, the participant manager 902 may include a profile subsystem 918 that maintains participant-specific configurations and preferences, including avatars, system capabilities, including display resolution, for example. The profile subsystem 918 may manage and facilitate use of subscriptions.

In the illustrated Commons XR Manager 900, the participant manager 902 may include a group subsystem 920 that identifies group memberships and affiliations of each participant. This may include the use of UUIDs as necessary associated with the user's authorization. In some instances, the group memberships and affiliations may be related to one or more subscriptions, invitations and/or access rights. In one example, an educational application may support affiliations that represent study groups preassigned by a group leader or assigned through on the fly instantiation by a group meeting without a leader.

In the illustrated Commons XR Manager 900, the system manager 904 may include an avatar subsystem 922. The avatar subsystem 922 may include libraries that help identify provenance of avatars. In one example, avatars associated with each reality context 106 accessible to the participant may be available through the access manager 916. The avatar subsystem 922 may provide or maintain configuration information in the profile subsystem 918, including information related to avatar type, pseudonym, attire, skills and/or ornamentation. This avatar subsystem 922 may enable conversion of an avatar obtained from one reality context 106 for use in various other reality contexts 106 that are indicated to be accessible to the participant in the profile subsystem 918, where permitted by agreement with a license holder where applicable.

In the illustrated Commons XR Manager 900, the system manager 904 may include an object subsystem 924. The object subsystem 924 may be configured to participate in the conversion of objects known in one reality context 106 to corresponding objects in other reality contexts 106 that are indicated to be accessible to the participant in the profile subsystem 918. The object subsystem 924 may provide or maintain configuration information in the profile subsystem 918 as well as any licensing considerations in the interservice purchase subsystem 928 or DRM module 930.

In the illustrated Commons XR Manager 900, the system manager 904 may include an application subsystem 926. The application subsystem 926 may be configured to participate in conversion of application entities known in one reality context 106 to corresponding application entities in other reality contexts 106 that are indicated to be accessible to the participant in the profile subsystem 918. The application subsystem 926 may provide or maintain configuration information in the profile subsystem 918.

In the illustrated Commons XR Manager 900, the system manager 904 may include an inter-service purchase subsystem 928. The inter-service purchase subsystem 928 may be configured to participate in the acquisition and conversion of commercially-available objects known in one reality context 106 to corresponding objects in other reality contexts 106 that are indicated to be accessible to the participant in the profile subsystem 918. The inter-service purchase subsystem 928 may provide or maintain configuration information in the profile subsystem 918. The inter-service purchase subsystem 928 may facilitate a marketplace for objects between reality contexts 106. In one example, an item that has a market valuation in one reality context 106 may be traded or bought in another reality context 106. A common currency may be used and/or created for valuation conversion between reality contexts 106.

The avatar subsystem 922, object subsystem 924, application subsystem 926 and inter-service subsystem 928 may include, interact with or exchange objects that are protected as the intellectual property of a third-party system or participant. The system manager 904 may include or be integrated with a digital rights management (DRM) module 930 that can negotiate, purchase and/or sell rights in certain objects. The DRM module 930 may control or gate transfers through one or more logical connections between participant contexts.

In the illustrated Commons XR Manager 900, the system manager 904 may include display subsystem 932 used to exchange images and video between reality contexts 106. The system manager 904 may include an input subsystem 934 used to exchange sensory information between reality contexts 106.

Figure 10:
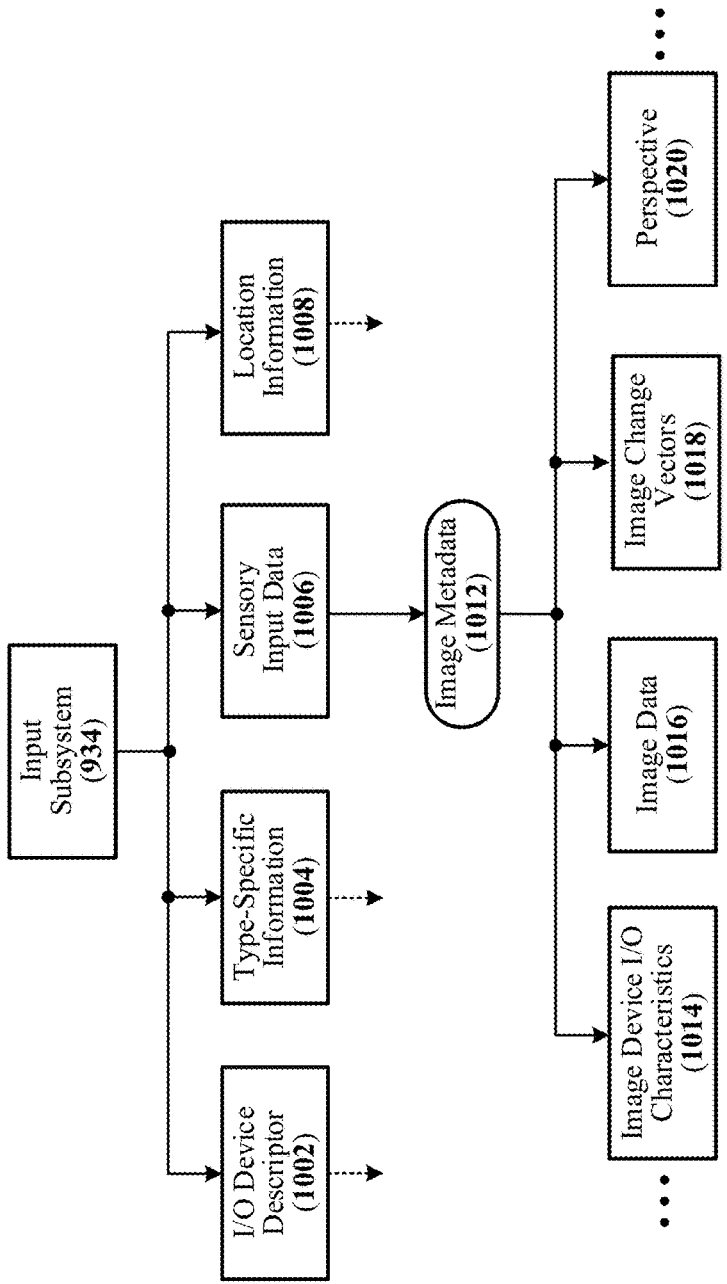
FIG. 10 illustrates a first example of a descriptive structure that may be used for managing a virtual, augmented and extended reality system implemented in accordance with certain aspects disclosed herein.

FIG. 10 illustrates a first example of a structure 1000 that may be used for describing and managing a virtual, augmented and extended reality system implemented in accordance with certain aspects disclosed herein. The structure 1000 relates to an example that describes certain portions of an input subsystem 934. The input subsystem 934 may be expected to correlate information generated by multiple types of sensory devices and/or other input information directed to a context in the virtual, augmented and extended reality system, and may translate and/or communicate output information directed to one or more devices in a participant system.

The example illustrates an entry in the structure 1000 that relates to one or more XR imaging devices. Other examples may relate to other types of input devices. For example, an entry may relate to a streaming source that provides recordings, streaming information, chat information, program information, etc. The entry is maintained and accessed under the input subsystem 934. The entry may include an input/output device descriptor 1002 that identifies the type of device, which is an imaging device in the illustrated example. The input/output device descriptor 1002 may be associated with additional device-specific information 1004 that defines capabilities, status and other information including manufacturer, model, and software version. The entry may include location information 1008 that identifies the physical and/or virtual location of the imaging sensor. Physical location may be maintained as global positioning system (GPS) coordinates or another type of coordinate system. In one example, the location information 1008 describes a location of an imaging device that contributes to a scene or setting for a virtual reality context. In one example, the location information 1008 is used to determine movement of a participant that may be mapped to a virtual reality context.

The entry may include descriptors of sensory input data 1006 that is generated by or directed to the corresponding device. In the illustrated example, metadata 1012 corresponding to the video sensory input data 1006 may be maintained with virtual or augmented information. The metadata 1012 serves to identify, map, index, categorize and/or otherwise describe such information. The virtual, augmented or other information and/or metadata 1012 may include imaging device input/output characteristics 1014 that describes format, resolution, encoding and other characteristics of image data 1016, which may be associated with or maintained in the structure 1000. The image data 1016 may be formatted and/or encoded according to a standard or protocol identified by the imaging device output characteristics information 1014 or metadata 1012. In some instances, the image data 1016 is included in or includes a video stream and the video information may include change vectors 1018 that may be used for video compression. The information may include perspective information 1020 that may be used to locate the image within scene, virtual context or physical volume.

Figure 11:
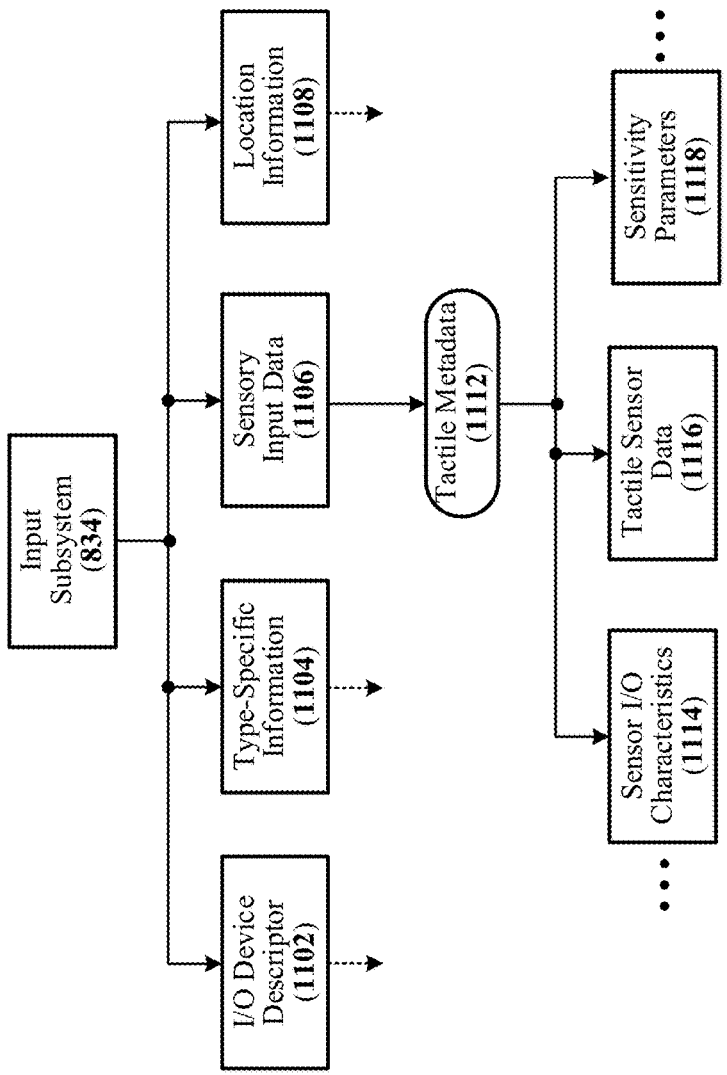
FIG. 11 illustrates a second example of a descriptive structure that may be used for managing a virtual, augmented and extended reality system implemented in accordance with certain aspects disclosed herein.

FIG. 11 illustrates a second example of a structure 1100 that may be used for describing and managing a virtual, augmented and extended reality system implemented in accordance with certain aspects disclosed herein. The structure 1100 relates to an example that describes certain portions of an input subsystem 934. The input subsystem 934 may be expected to correlate information generated by multiple types of sensory devices and/or other input information directed to a context in the virtual, augmented and extended reality system, and may translate and/or communicate output information directed to one or more devices in a participant system.

The example illustrates an entry in the structure 1100 that relates to one or more tactile sensors used in an XR system. Other examples may relate to other types of input devices. The entry is maintained and accessed under the input subsystem 934. The entry may include an input/output device descriptor 1102 that identifies the type of device, which is a tactile sensor in the illustrated example. The input/output device descriptor 1102 may be associated with additional device-specific information 1104 that defines capabilities, status and other information including manufacturer, model, and software version. The entry may include location information 1108 that identifies the physical and/or virtual location of the tactile sensor. Physical location may be maintained as global positioning system (GPS) coordinates or another type of coordinate system. In one example, the location information 1108 describes a location of a tactile sensor that contributes to a scene or setting for a virtual reality context. In one example, the location information 1108 is used to determine movements made by a participant while interacting with a virtual reality context.

The entry may include descriptors of sensory input data 1106 that is generated by or directed to the corresponding device. In the illustrated example, metadata 1112 corresponding to the tactile sensor input data 1106 may be maintained with virtual or augmented information. The metadata 1112 serves to identify, map, index, categorize and/or otherwise describe such information. The virtual, augmented or other information and/or metadata 1112 may include sensor input/output characteristics information 1114 that describes format, resolution, encoding and other characteristics of tactile sensor data 1116, which may be associated with or maintained in the structure 1100. The tactile sensor data 1116 may be formatted and/or encoded according to a standard or protocol identified by the sensor output characteristics information 1114, metadata 1112, and/or sensitivity parameters 1118.

Figure 12:
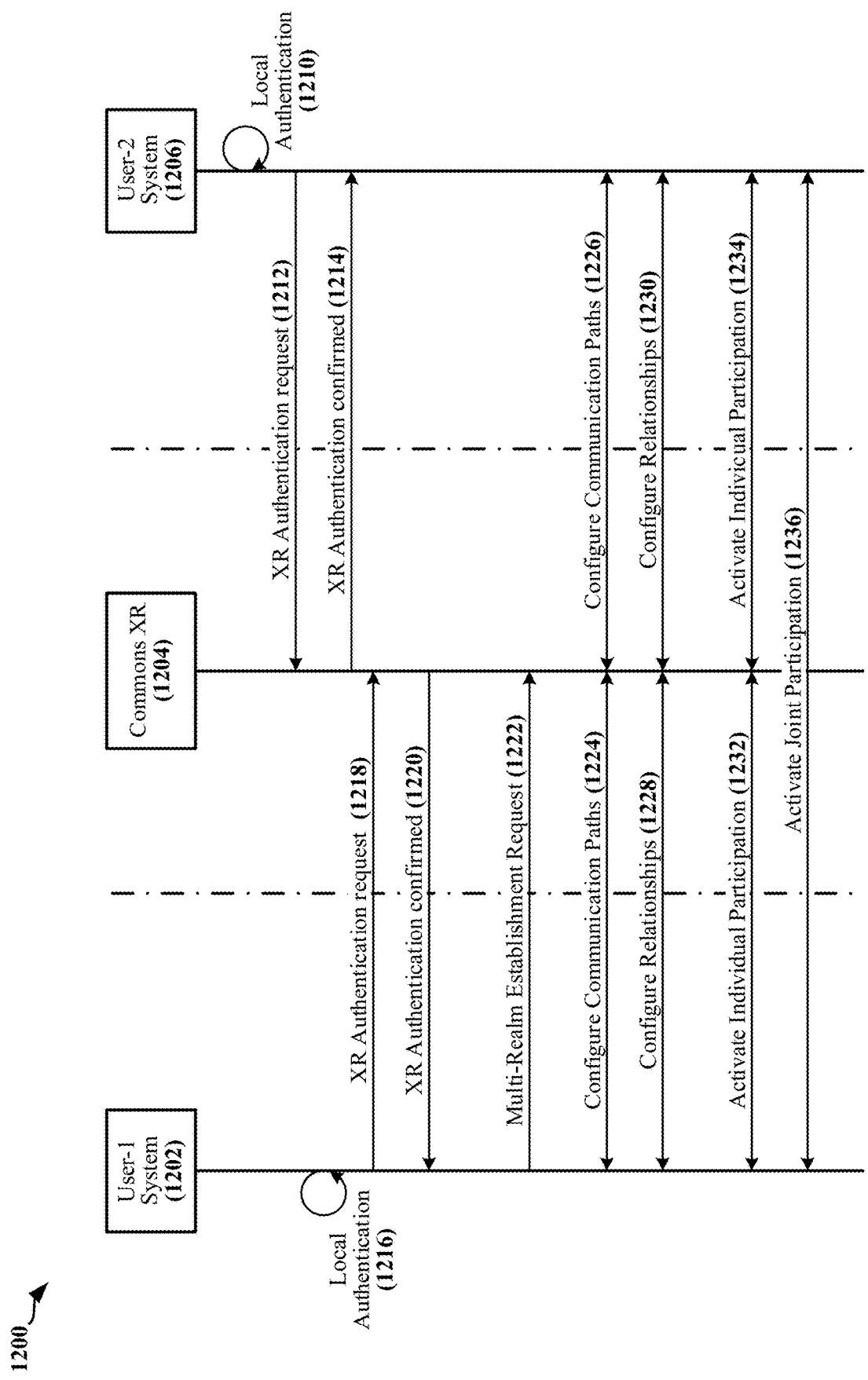
FIG. 12 is a message flow diagram that illustrates certain aspects of operations related to a multi-device VR, AR and/or XR system.

FIG. 12 is a message flow diagram 1200 that illustrates certain aspects of operations related to a multi-device VR, AR and/or XR system. Two participant systems 1202, 1206 may participate in an integrated VR, AR and/or XR system through a server or other controller 1204. The illustrated operations may be employed when more than two participant systems 1202, 1206 are to be used in a multi-device VR, AR and/or XR system. In the illustrated example, a first participant system 1202 activates a relationship between the two participant systems 1202, 1206. A participant of the second participant system 1206 may be authenticated 1210 by the second system 1206. The second participant system 1206 may send an authentication request 1212 to the controller 1204 and may become active in the in the integrated VR, AR and/or XR system when the controller 1204 responds with an authentication confirmation message 1214. At some point, a participant of the first participant system 1202 may be authenticated 1216 by the first system 1202. The first participant system 1202 may send an authentication request 1218 to the controller 1204 and may become active in the in the integrated VR, AR and/or XR system when the controller 1204 responds with an authentication confirmation message 1220.

The participant of the first participant system 1202 may cause the first participant system 1202 to send a multi-realm request 1222 to establish a multi-realm relationship and/or participate in a multi-realm application. In response to the multi-realm request 1222, the controller 1204 may exchange control and command information 1224 with the first participant system 1202 and control and command information 1226 with the second participant system 1206 to establish communication paths between reality contexts in the participant systems 1202, 1206. The controller 1204 may exchange control and command information 1228 with the first participant system 1202 and control and command information 1230 with the second participant system 1206 to configure the relationship between the participant systems 1202, 1206 based on the multi-realm request 1222. Thereafter, the participant systems 1202, 1206 may exchange information related to the multi-realm application in messages 1232, 1234 communicated through the controller 1204. These messages 1232, 1234 may include content, control, meta, position, perspective, focus of attention, posture and/or notice information between these participants or a group of participants. Participant systems 1202, 1206 may exchange information related to the multi-realm relationship in direct messages 1236 communicated between the participant systems 1202, 1206. Direct messages 1236 may include content, control, meta, position, perspective, focus of attention, posture and/or notice information between these participants or a group of participants.

Figure 13:
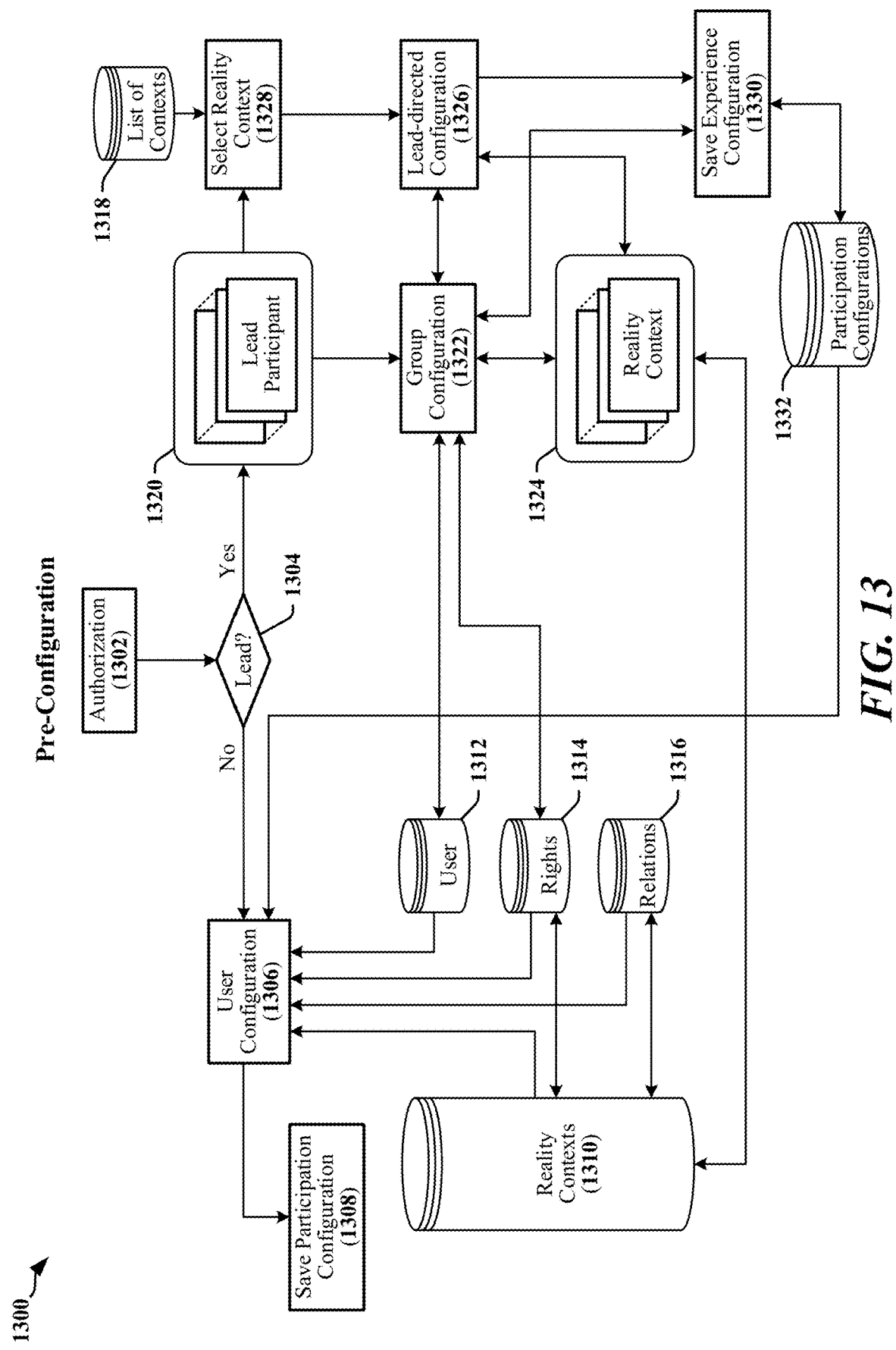
FIG. 13 is a logical representation of a system that may be implemented in accordance with certain aspects disclosed herein.

FIG. 13 is a logical representation of a pre-configuration flow 1300 in accordance with certain aspects disclosed herein. The pre-configuration flow 1300 may enable individual participants and/or groups of participants to interact with or participate concurrently in a VR/AR/XR experience. The VR/AR/XR experience may include multiple reality contexts 106, where the reality contexts 106 may be instantiated using one or more reality types, standards or environments. Each participant gains entry to the VR/AR/XR experience through an authentication and/or authorization process 1302.

If the user is authorized through the authorization process, the user becomes a TCXR participant ("participant"). During authorization process 1302, the TCXR SYSTEM through a user portal assistant, will help the user determine the type of participation roles allowed, the experiences authorized for, which may be identified through configuration information on the participant or asked.

At block 1304, the participant may be identified as a leader or participant. In some instances, a lead participant profile may be selected at block 1320 when the participant is a leader. A participant may be identified as a leader based on information derived from the authentication and/or authorization process 1302. The lead participant profile may provide permissions necessary for the leader to configure various aspects of the VR/AR/XR experience. The leader may configure the VR/AR/XR experience and participants iteratively and/or in a sequence defined for the VR/AR/XR experience.

At block 1322, the leader may identify and configure participants in one or more groups for participation in the VR/AR/XR experience. The groups may be created based on level or type of participation using information received or retrieved from the repositories or databases 1312, 1314, 1316. Prior to configuring group participation at block 1322, the leader may determine the role of the participant based on information retrieved from a participant profiles repository 1312, rights management system 1314 and other sources of information related to participant preferences and capabilities. The leader may update the participant profiles repository 1312, rights management system 1314 as needed. At block 1328, the leader may select and configure a set of reality contexts to be included in the VR/AR/XR experience. The set of reality contexts may be selected from a listing or database 1318. At block 1326, the leader configures a framework or structure for directing and controlling the VR/AR/XR experience. In one example, the leader may configure a default participation level for AIVA. In another example, the leader may configure an avatar for one or more sessions. In another example, the leader may define an initial position, perspective, focus of attention and posture of the avatar.

Pre-configuration may involve interaction with a reality context database 1310 and/or one or more reality contexts 106 through a reality context interface 1324. In one example, the leader may configure participant participation using information that defines preferences, options, permissions, enrollments and requirements for participation in group activities. The leader may follow the pre-configuration flow 1300 to configure aspects of the VR, AR and/or XR experience for each participant and/or for each group before the initiation of the VR, AR and/or XR experience. At block 1330, and after completion of pre-configuration, the leader may store the configuration in a configurations database 1332. In some implementations, the leader may create multiple configurations for one or more VR, AR and/or XR experiences, and can activate a stored configuration prior to commencing the pre-configuration flow 1300.

Participants may also perform a pre-configuration and/or test a configuration defined by a leader. The participant gains entry to the VR/AR/XR experience through the authentication and/or authorization process 1302. At block 1306, the participant may load a configuration from the configurations database 1332. The participant may personalize the configuration to adjust for participant preferences and/or capabilities of the participant-operated system. The participant may personalize the configuration within limits specified by the profiles repository 1312 and/or rights management system 1314. In some instances, personalization may involve adjusting the configuration based on predefined relationships with other participants and/or with the leader.

Figure 14:
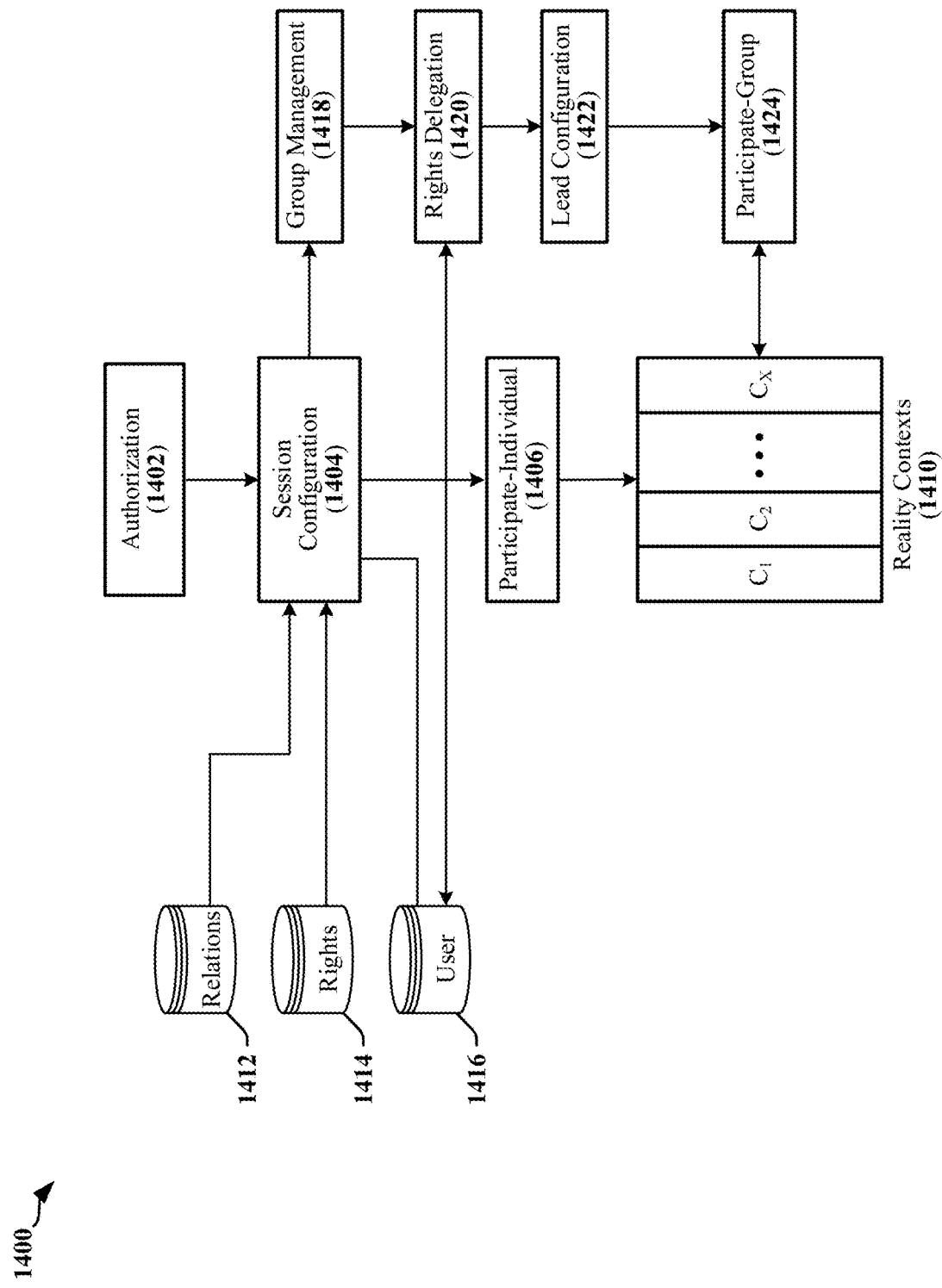
FIG. 14 is a functional representation of a system that may be operated in accordance with certain aspects disclosed herein.

FIG. 14 is a functional representation of a system 1400 that may be operated in accordance with certain aspects disclosed herein. The system 1400 may enable participants (individual participant or groups) to interact with or participate concurrently in multiple reality contexts 106, where the reality contexts 106 may be instantiated using one or more reality types, standards or environments. Each participant gains entry to the system 1400 through an authentication and/or authorization process 1402. The authentication and/or authorization process 1402 may identify the participant, the system capabilities of the participant and/or a reality context 106 in which the participant is a current participant. The participant may indicate whether participation in one or more reality contexts 106 is desired and whether the participant expects to participate autonomously, as a solo participant in a multi-participant reality, or as a member of a group of participants in a shared VR, AR and/or XR experience. In some instances, the participant may initially enter the system 1400 as an individual and may transition to group participation during or after an initial configuration.

The system 1400 may initiate a participant configuration process 1404. In some instances, participation of AIVA may be precipitated for a session involving the selected reality context 106. In one example, the participant configuration process 1404 configures participant participation using configuration information maintained in one or more repositories or databases 1412, 1414, 1416. The configuration information may include information associated with multiple reality contexts 106, where the reality context information may be accessed from a database of reality contexts 1410. The participant configuration process 1404 may configure participant participation using information in a participant profile database 1412, which may define system preferences metadata, avatars and/or other parameters that affect the participant's presence, appearance, personality and/or imagery in different reality contexts 106. The participant configuration process 1404 may configure participant participation using information in a rights management database 1414, which may define participant subscriptions, access rights acquired or provided to the participant, credit and payment information. The participant configuration process 1404 may configure participant participation using information in a relations or affiliations database 1416, which may define preferences, options, permissions, enrollments and requirements that enable the participant to communicate and/or interact with other participants and/or reality contexts 106. After completion of the participant configuration process 1404, the participant may participate 1406 as a solo or autonomous participant in one or more reality contexts 1410 (and see the reality contexts 106 in FIG. 1).

When the participant is to be admitted as a group participant, the participant configuration process 1404 may pass participant configuration information to a group management function 1418 that manages and/or updates a VR, AR and/or XR experience shared by the group. The group management function 1418 may cooperate or control a rights management function 1420 that can delegate, assign, acquire or otherwise provide the access rights to objects and reality contexts 106 needed for the participant to participate in the shared AR and/or XR experience. In one example, the rights management function 1420 may configure participant participation using information that defines preferences, options, permissions, enrollments and requirements for participation in group activities received or retrieved from one or more repositories or databases 1412, 1414, 1416. The system 1400 may determine the role of the participant as part of a leader configuration function 1422. For example, the leader configuration function 1422 may register the participant as a lead participant or as an ordinary or subordinate participant. After configuration, the participant may participate 1424 in the shared AR and/or XR experience and/or in one or more corresponding or related reality contexts 106.

Figure 15:
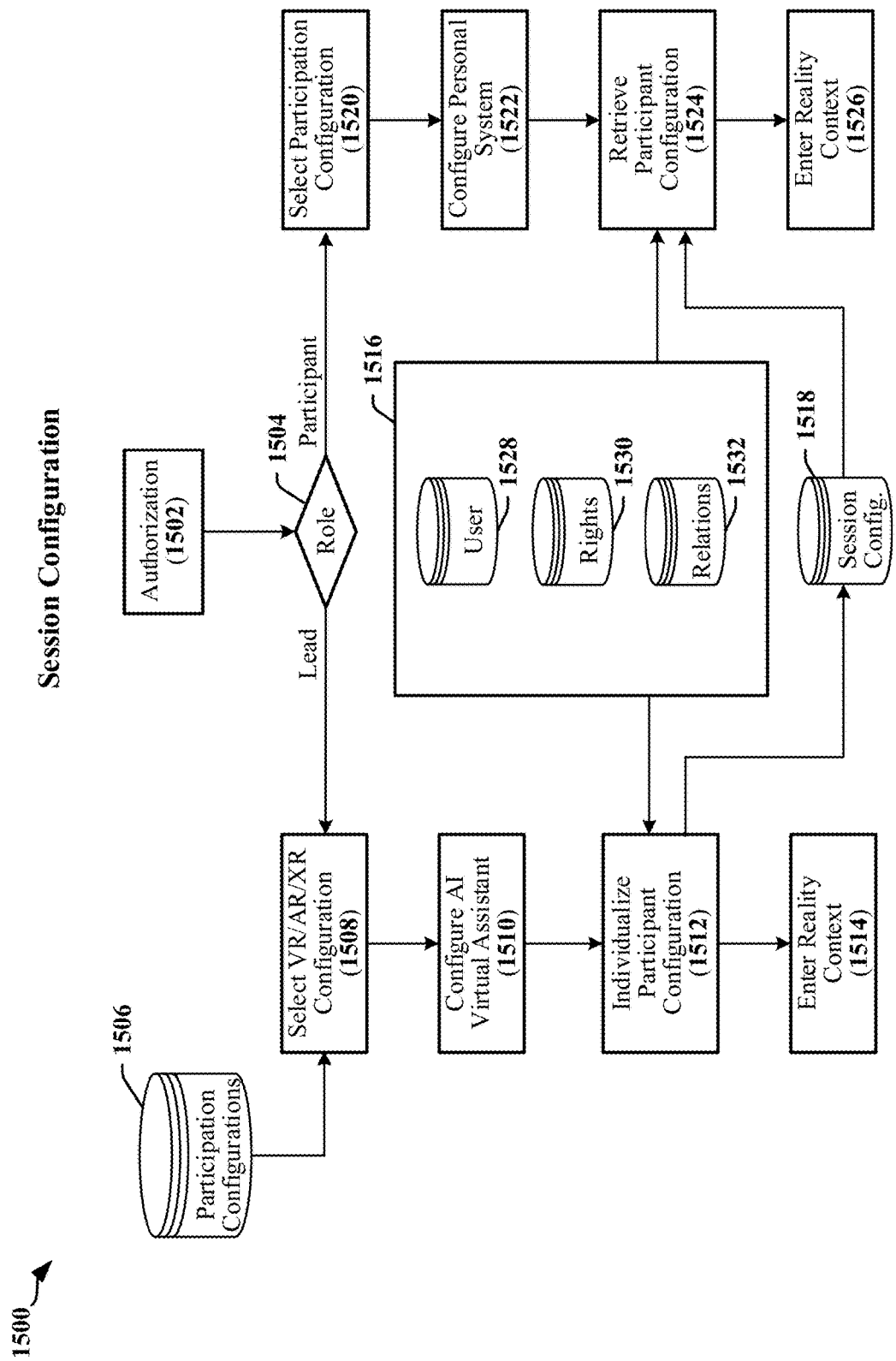
FIG. 15 is a logical representation of a VR/AR/XR session configuration flow in accordance with certain aspects disclosed herein.

FIG. 15 is a logical representation of a VR/AR/XR session configuration flow 1500 in accordance with certain aspects disclosed herein. Each participant may participate in the VR/AR/XR session after performing an authentication and/or authorization process 1502. The participant may be a leader or a participant. A participant who is identified as a leader at block 1504 may select and initiate an initial configuration for the VR/AR/XR session at block 1508. The initial configuration may be received from a configurations database 1506, and may be created during a pre-configuration process. At block 1510, the leader may adjust or configure the participation level of the AIVA. At block 1512, the leader may update or amend the list of authorized participants, and/or the participation levels of one or more participants. The leader may provide or update a session configuration in a repository 1518 maintained for the VR/AR/XR session. The leader may initiate the VR/AR/XR session and enter the VR/AR/XR venue at block 1514. In one example, an instance of a particular reality context 106 may be created at this point to facilitate entry of the leader and one or more other participants.

A user who is identified as a participant at block 1504 may select a participant configuration for the VR/AR/XR session at block 1520. The participant configuration may be maintained locally or from a shared repository. In one example, a base configuration may be received from the configurations database 1506. At block 1522, the participant may adjust or configure a personal system. At block 1524, the participant may retrieve a session configuration from the repository 1518. The participant may modify the session configuration by adjusting appearance, posture and/or status prior to entering the VR/AR/XR venue. The participant may join the VR/AR/XR session at block 1526.

Figure 16:
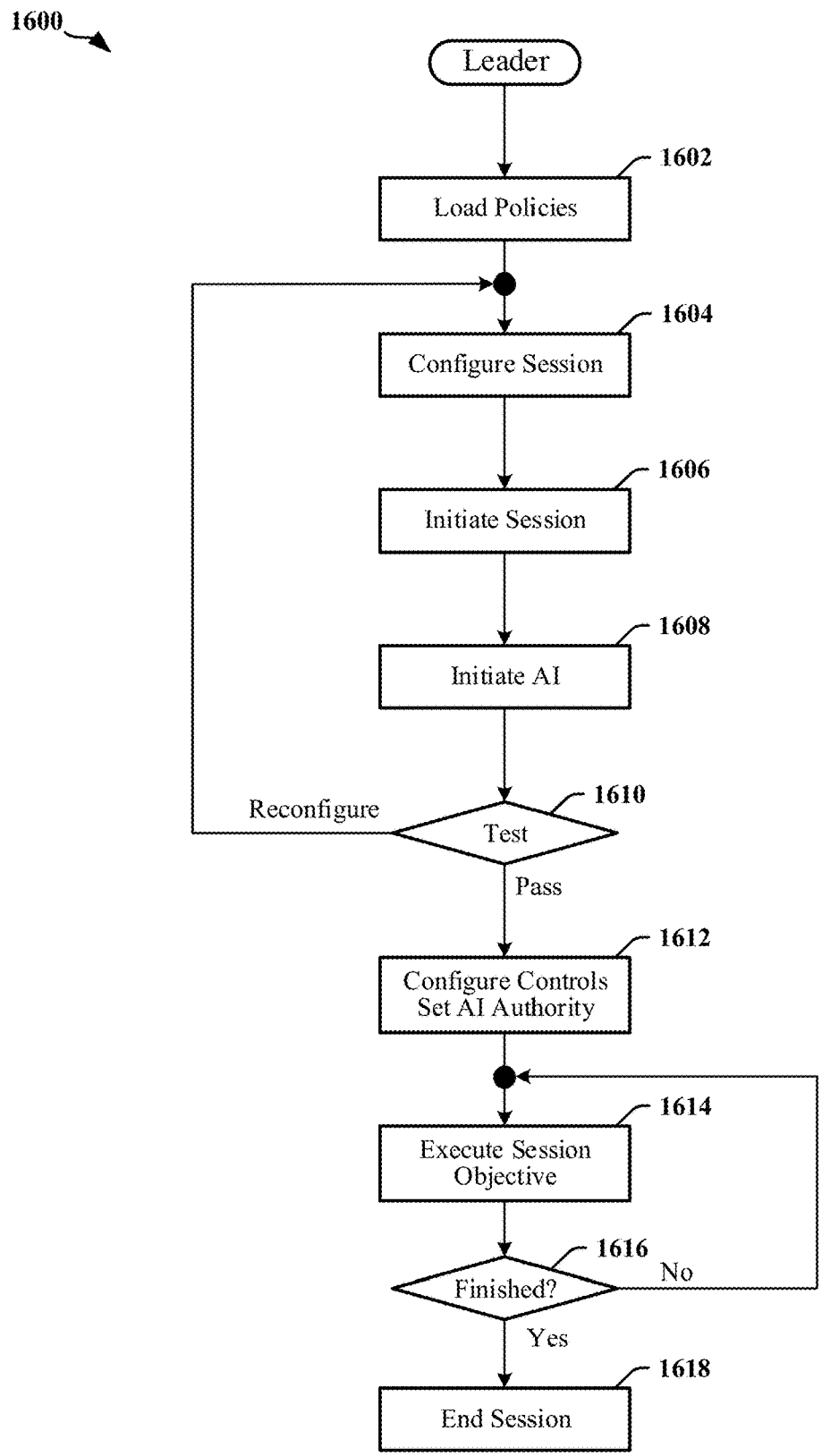
FIG. 16 is a flowchart that illustrates an example of a VR/AR/XR session conducted by a leader in accordance with certain aspects disclosed herein.

FIG. 16 is a flowchart 1600 that illustrates an example of a VR/AR/XR session conducted in accordance with certain aspects disclosed herein. The flowchart 1600 represents the experience of a leader of the VR/AR/XR session. In one example, the VR/AR/XR session may relate to an educational class, a tour or training event provided on behalf of a commercial, educational, governmental or not-for-profit entity (the "sponsoring entity"). The sponsoring entity may establish guidelines, evaluation and test criteria and may define reporting standards for classifying participants in the VR/AR/XR session. In some instances, the sponsoring entity may evaluate the VR/AR/XR session in advance in order to credit or reward participants in the VR/AR/XR session for their attendance. The sponsoring entity may require that evaluations of the VR/AR/XR session and its leader be obtained from participants in the VR/AR/XR session. The sponsoring entity may define policies related to conduct of the VR/AR/XR session, its leader and its participants. In some instances, the sponsoring entity may provide VR equipment to the leader and/or to some or all of the participants.

At block 1602, the leader may load policies, guidelines, evaluation forms and report cards for the VR/AR/XR session. In some implementations, the policies may define or govern certain permissible behaviors in the VR/AR/XR session. In one example, the polices may include regional polices, institutional polices, acceptable use policies, age policies and regulations and/or polices directed to the leader.

At block 1604, the leader may configure the session. In a pre-configuration mode, the leader may configure venues, timing of the session, individual and groups of participants, roles, goals, objectives and participation metrics, and other aspects of the VR/AR/XR session. When a VR/AR/XR session has been previously configured, the leader may load an existing configuration and modify or adjust certain aspects of the VR/AR/XR session as needed. Some configuration information may be provided by the sponsoring entity including, for example, profile information, subscription, credit. Certain configuration metadata may be obtained from profiles generated or maintained in a different virtual contact, including appearance, avatar, personality posture and other appearance characteristics. Imported configuration information related to appearance may be subject to policies defined for the VR/AR/XR session.

The leader may configure status and controls that are displayed as dials or other control mechanisms. In certain examples, status and controls may be provided to track participant attendance, presence and participation status (e.g., signed-in, active, passive, distracted). In some examples, status and controls may be provided for timing or other temporal considerations of an object, including status and controls associated with a participant's attention and/or the cadence of the session. A leader may have access to identifying information for each participant, including one or more of an attendee pseudonym, nickname, full name, affiliation, etc. In certain examples, status and controls may be provided to manage and monitor scripts, protocols, lesson plans and the like. The leader may control and/or have access to one or more active message boxes for corresponding with participants privately or publicly. The leader may control access of participants to one or more active message boxes for corresponding with the leader or other participants privately or publicly. The leader may have access to an inquiry window that can provide session information, including attendance, activities, queries received and AIVA configuration.

The leader may control Maestro configuration, including balancing the control of the VR/AR/XR session between the leader and AIVA. The Maestro may be configured to control presentations, lectures, materials, timing of environments, classroom controls and monitoring of the VR/AR/XR session. Within the VR/AR/XR session, the leader may change, alter or filter parameters controlled by Maestro. For example, parameters may be changed to reflect changes in the number of participants, group performance, volume of queries, etc. The Maestro may be configured to adjust the percentage of management control of AIVA from full control to no control. The configuration and/or metadata used to manage the Maestro may be configured by the leader for each environment within a venue and can be adjusted from one environment to another based on participant variables, engagement and actions.

The leader may configure Maestro to provide stimuli (nudges) to participants when participation level has dropped off. The leader may configure the thresholds that determine when a stimulus is to be provided. The Maestro may exercise control over the virtual location of a participant by controlling location of the participant's avatar within one or more reality contexts during the VR/AR/XR session. In one example, the Maestro may cause the participant's avatar to be moved between locations within a context or between contexts. Movement of the avatar may be instantaneous or at a rate determined by the Maestro and/or system parameters. The Maestro may be configured to monitor session completion per participant. Upon completion of certain tasks or stages within the VR/AR/XR session, participants may receive deliverables ("Easter Eggs"). The Maestro may be configured to manage environment time outs, which may be adjustable in real time based on group performance in current VR/AR/XR session or predetermined set-up criteria.

At block 1606, the leader may initiate and enter the VR/AR/XR session. In some instances, the VR/AR/XR session may be initiated upon first entry, sign-in or request by a leader or by a participant. At block 1608, the leader may initiate the AIVA.

At block 1610, the leader may perform one or more tests. In one example, the leader may configure and calibrate the venues and scenes used in the VR/AR/XR session. In another example, the leader may perform a walkthrough of the venues defined for the VR/AR/XR session. In another example, the leader may rehearse a script for the VR/AR/XR session. In another example, the leader may record at least a portion of the content to be used in the VR/AR/XR session. If the leader determines at block 1610 that the VR/AR/XR session is not ready for operation, the leader may return to block 1604 to repeat the configuration process.

When the leader determines at block 1610 that the VR/AR/XR session is properly or adequately configured, then at block 1612 the leader may configure displayable controls and status fields presented in the leader's field of view within one or more venues of the VR/AR/XR session. The leader may also configure the authority and/or adjust the level of participation of AIVA.

At block 1614, the leader may initiate the VR/AR/XR session and execute the objectives of the VR/AR/XR session. At block 1616, the leader may determine if the goals and objectives of the VR/AR/XR session have been met. If the one or more participants has not performed all tasks, goals and/or objectives of the VR/AR/XR session have not been met, the leader may cause the VR/AR/XR session to continue at block 1614. At block 1618, the leader may terminate the VR/AR/XR session when the objectives have been met.

Figure 17:
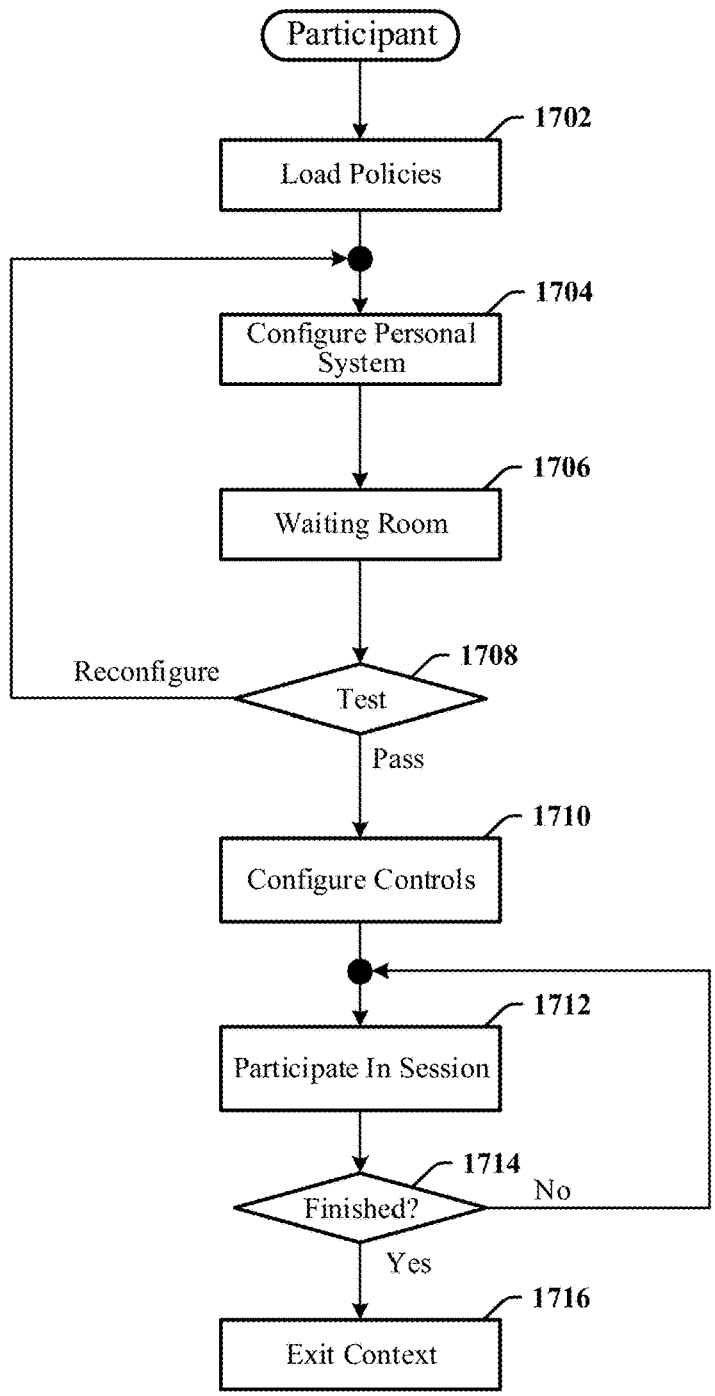
FIG. 17 is a flowchart that illustrates a participant's perspective of a VR/AR/XR session conducted in accordance with certain aspects disclosed herein.

FIG. 17 is a flowchart 1700 that illustrates an example of a VR/AR/XR session conducted in accordance with certain aspects disclosed herein. The flowchart 1700 represents the experience of a participant. The participant may be a subscriber or otherwise registered with the sponsoring entity. At block 1702, the participant may load policies that define or govern certain permissible behaviors of the participant while in the VR/AR/XR session.

At block 1704, the participant may configure personal equipment and systems to be used in the VR/AR/XR session. In a pre-configuration mode, the participant may load an existing configuration and modify or adjust certain aspects of the VR/AR/XR session corresponding to the participant environment as needed.

At block 1706, the participant may enter a waiting room. In the waiting room, the participant may engage the AIVA and may configure interactions and assistance levels requested from AIVA. The participant may configure, test and review certain aspects of the participant system. The participant may be prompted to perform a system configuration and may receive configuration information from the sponsoring entity. Profile information, subscription, credit and other configuration capabilities such as appearance, personality and appearance characteristics metadata can be loaded or determined from other VR systems.

At block 1708, the participant may determine that the participant system is not ready for operation, and the participant may return to block 1704 to repeat the configuration process. When the participant determines at block 1708 that the participant system is properly or adequately configured, then at block 1710 the participant may configure displayable controls and status fields presented in the participant's field of view within one or more venues of the VR/AR/XR session.

At block 1712, the participant may join the VR/AR/XR session and participate in the objectives of the VR/AR/XR session. At block 1714, the participant may determine that all tasks, goals and/or objectives of the VR/AR/XR session have not been performed and may continue participating in the VR/AR/XR session at block 1712. At block 1716, the leader may exit the VR/AR/X8R session when the objectives have been met.

Performance Assessment In VR, AR and XR Systems

VR, AR and XR systems may be adapted in accordance with certain aspects disclosed herein provide a multi-participant environment that can span multiple reality contexts. The multi-participant environment may be employed for education, simulation-based training gaming, and other purposes. In certain applications, a participant may enter the multi-participant environment through an initial virtual context and traverse through links to one or more virtual contexts. The multi-participant environment may bridge between two or more of the virtual contexts that may be inherently mutually incompatible. The multi-participant environment may provide an interface between participant systems and the virtual contexts regardless of the protocols and standards governing the operation of the participant systems and the virtual contexts. In one example, a multi-participant environment enables the implementation of a group experience led by a docent, instructor, guide, escort or other leader alone or in combination with an AIVA.

According to certain aspects of this disclosure, performance measurements may be used to characterize activities and behaviors in a multi-participant environment. Applications that can be executed in the multi-participant environment and/or materials presented in the multi-participant environment may be developed, modified, optimized and/or evaluated using the performance measurements. Participants and leaders can be assessed, graded and/or otherwise evaluated based on performance measurements obtained in the multi-participant environment.

In one aspect, a managed system architecture provided in accordance with certain aspects disclosed herein may be configured to collect performance data in a virtual, augmented and/or extended reality system that spans multiple reality contexts. The performance data may relate to leaders and participants and may characterize individual performance against a baseline or peer profile. In one example, performance data can be collected in a common communication layer 704 of a Commons XR Manager 716 (see FIG. 7) where actions, activities, relationships, postures and other aspects of the managed VR/AR/XR system have been characterized according to a common protocol or format. Messages 1232, 1234 communicated through the controller 1204 (See FIG. 12) or direct messages 1236 communicated between the participant systems 1202, 1206 may include content, control, meta, position, perspective, focus of attention, posture and/or notice information between these participants or a group of participants.

Figure 18:
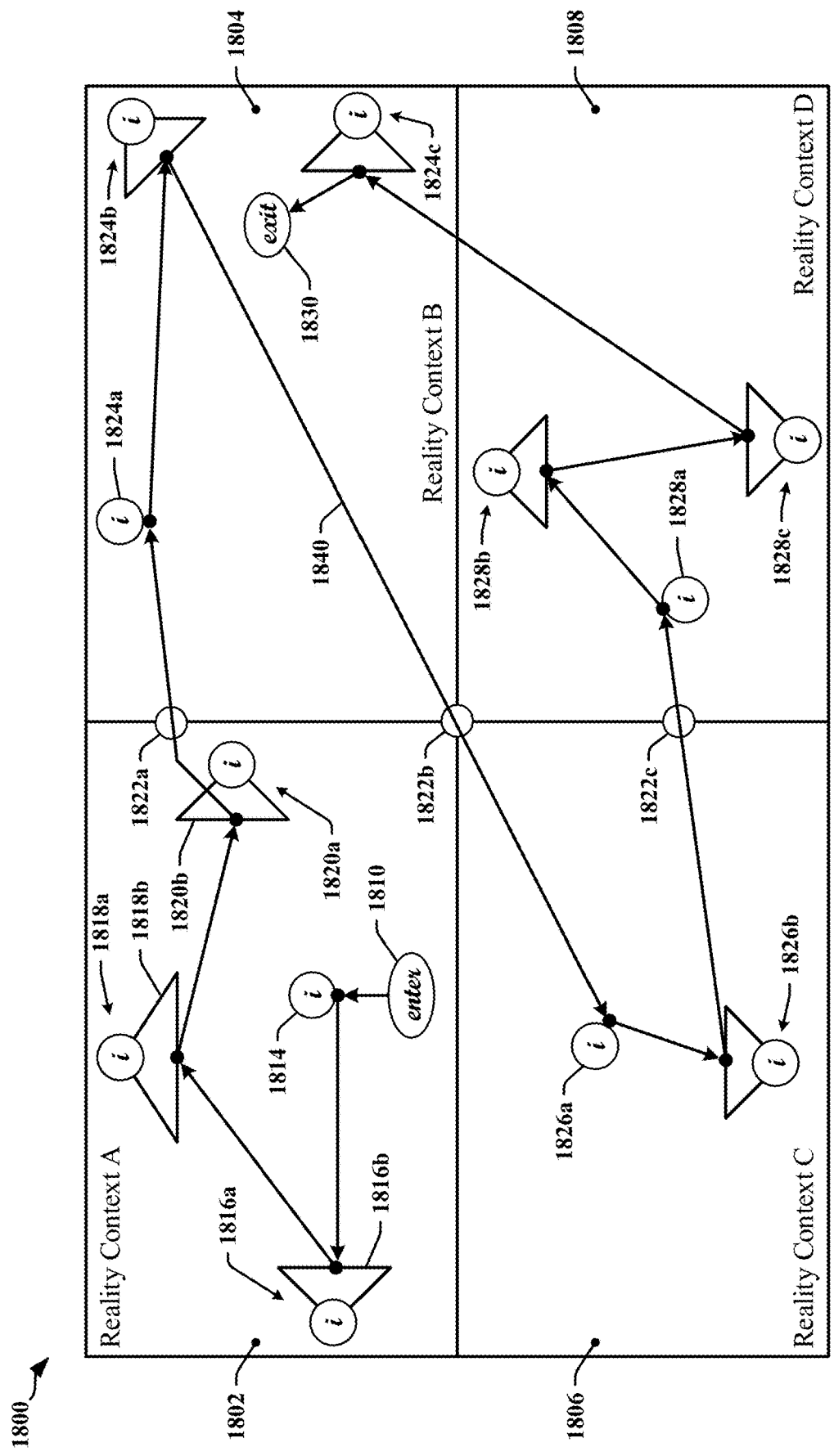
FIG. 18 illustrates a managed VR/AR/XR system from which performance data may be collected, aggregated and analyzed in accordance with certain aspects disclosed herein.

FIG. 18 illustrates a managed VR/AR/XR system 1800 from which performance data may be collected, aggregated and analyzed. The managed VR/AR/XR system 1800 spans four virtual reality contexts 1802, 1804, 1806, 1808, which may have been developed using different and/or incongruent programming interfaces or protocols, where each virtual reality context 1802, 1804, 1806, 1808 is coupled to the managed VR/AR/XR system 1800 through an adapter configured to convert input, output, definitions, descriptors and behaviors of the corresponding reality context to a common set of input, output, definitions, descriptors and behaviors. In one example, the adapter may include or cooperate with the processing layer 702, the common communication layer 704, the interface layer 706 and/or one or more of the participant contexts 714 illustrated in FIG. 7.

The managed VR/AR/XR system 1800, although illustrated in two dimensions may provide a three-dimensional experience. In one example, the managed VR/AR/XR system 1800 provides a multiparticipant virtual educational environment, where a leader may guide a group of participants through a lesson plan. In another example, the VR/AR/XR system 1800 provides a multiplayer online role-playing game. In one example, the managed VR/AR/XR system 1800 provides a flight training environment, where an air traffic controller or control function guide one or more pilots through a flight plan.

The managed VR/AR/XR system 1800 includes a set of features to be visited, including waypoints 1814, 1816a, 1818a, 1820a, 1824a, 1824b, 1824c, 1826a, 1826b, 1828a, 1828b, 1828c. In some applications, entry points 1810 and exit points 1830 may be defined within one or more virtual reality contexts 1802, 1804, 1806, 1808. In other applications, unrestricted entry and departure from the virtual reality contexts 1802, 1804, 1806, 1808 may be permitted. In some implementations, transition between virtual reality contexts 1802, 1804, 1806, 1808 may be enabled through links or portals 1822a, 1822b, 1822c. In one example, transition between virtual reality contexts 1802, 1804, 1806, 1808 is effected through a common portal 1822b.

In a virtual educational environment, the features may be points of interest, subjects addressed in a lesson plan, assembly points, challenges, rest stops, stopping/catchup points or waypoints which serve as distribution points or sources of information identified in the lesson plan. In a flight training environment, the features may include simulated air traffic control waypoints.

Certain waypoints 1816a, 1818a, 1820a, 1824b, 1824c, 1826b, 1828b, 1828c may be viewed or accessed from a defined or required perspective. In the illustrated example, the waypoints 1816a, 1818a, 1820a in a first reality context 1802 may be viewed or accessed through a zone of attendance 1816b, 1818b, 1820b defined by the application.

A lesson plan, game storyline, flight plan or other plan defined by an application may define a preferred, optimal or prescribed path 1840 to be followed through the managed VR/AR/XR system 1800. The path 1840 may be initially defined by a designer and/or may be adjusted or optimized based on observed or measured behavior of participants as avatars of the participants follow the path 1840. Adjustments and optimizations may be made based on performance measurements that characterize how closely a participant adheres to a plan, including how closely an avatar of the participant follows the path 1840.

Figure 19:
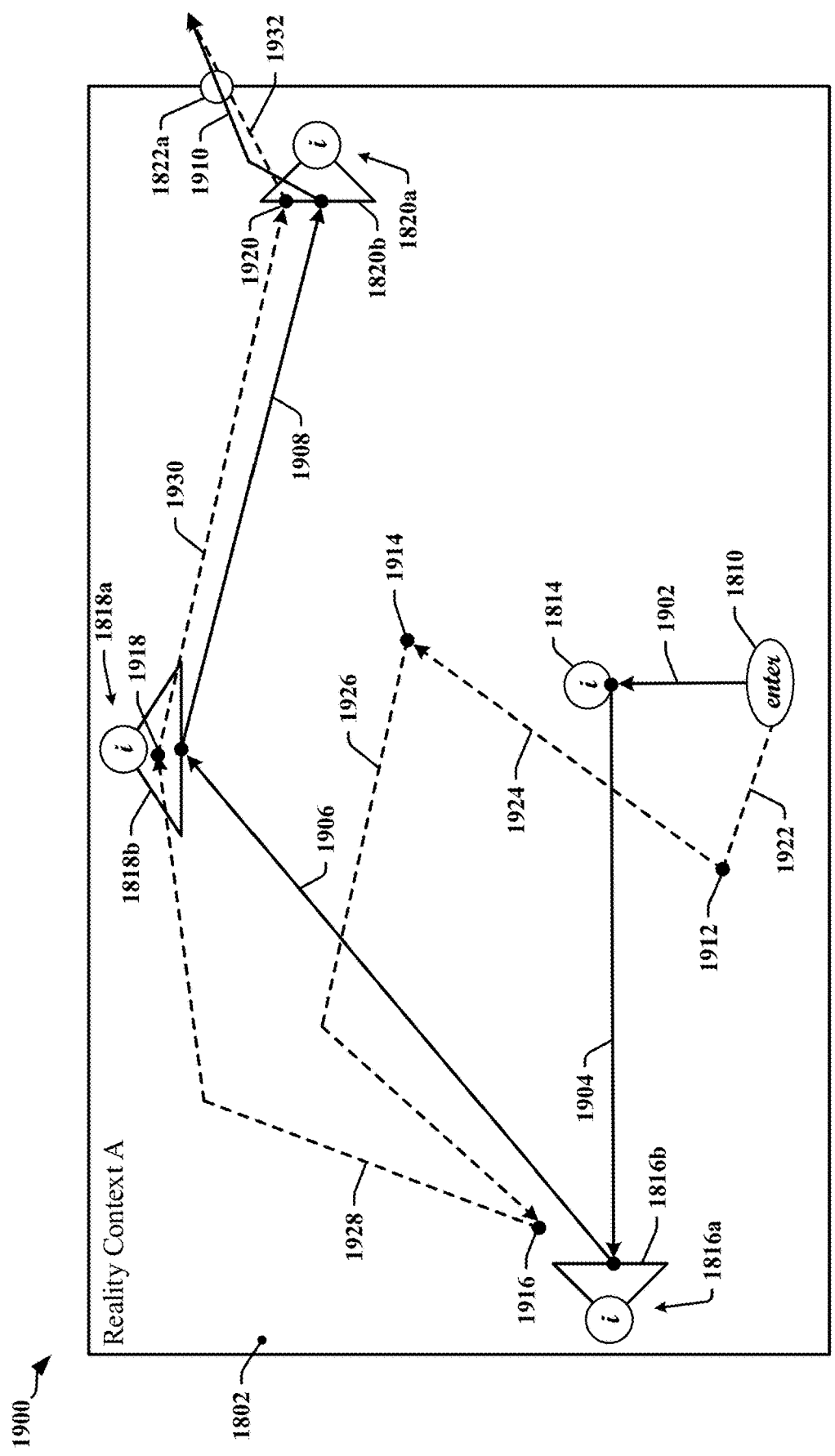
FIG. 19 illustrates a first participation example that relates to spatial aspects of traversal of the first reality context of FIG. 18 in accordance with certain aspects disclosed herein.

FIG. 19 illustrates a first participation example 1900 that relates to spatial aspects of traversal of the first reality context 1802 in FIG. 18. The first participation example 1900 relates to the passage of a single participant through the first reality context 1802. The performance of the participant may be measured, at least in part, by comparison of participant performance to a baseline performance. In one example, baseline performance may be based on performance of peers or predecessors and may include adherence to a preferred, optimal or prescribed path. The preferred, optimal or prescribed path may include a segment 1902 that leads from an entry point 1810 to a first waypoint 1814 that serves as an orientation or assembly point. In one example, an assembly point may be defined to allow participants to receive initial instructions. In this example, the assembly point may have no limitation on proximity or perspective of the participant. A participant entering through the entry point 1810 may proceed along a path that includes a first segment 1922 leading to a first point 1912. The participant may linger and or move along a second segment 1924 to a second point 1914, before, during or after delivery of instructions. The system may infer that a lag with respect to the baseline performance may be attributable to the participant's focus of attention on an object of interest at the second point 1914, which may be inferred from the lingering at the second point 1914 and/or from other sensors, activity or inactivity during the period of lingering.

The preferred, optimal or prescribed path includes a second segment 1904 that leads to a second waypoint 1816a, which has a required zone of attendance 1816b. In the illustrated example, the participant proceeds by way of a third, indirect path segment 1926 to a point 1916 proximate but exterior to the required zone of attendance 1816b associated with the second waypoint 1816a. The preferred, optimal or prescribed path includes a third segment 1906 that leads to a third waypoint 1818a, which has a required zone of attendance 1818b. In the illustrated example, the participant proceeds over a fourth path segment 1928, which is an indirect segment, to a point 1918 within the required zone of attendance 1818b associated with the third waypoint 1818a. The preferred, optimal or prescribed path includes a fourth segment 1908 that leads to a fourth waypoint 1820a, which has a required zone of attendance 1820b. In the illustrated example, the participant proceeds through a fifth path segment 1930 to a point 1920 within the required zone of attendance 1820b associated with the third waypoint 1820a. The preferred, optimal or prescribed path includes a transition segment 1910 through a portal 1822a to a next reality context, and the participant follows the preferred, optimal or prescribed path along a segment 1932 to the next reality context.

The participation example 1900 illustrates two-dimensional deviations from the preferred, optimal or prescribed path by a single participant. These deviations can be characterized using various measurements. In one example, adherence to the plan can be measured by path length, maximum or average distance from the preferred, optimal or prescribed path may quantify certain aspects of participant performance. In another example, certain aspects of performance can be measured by maximum or average linear and/or angular separation from required zones of attendance. In some implementations, participation three-dimensional deviations from the preferred, optimal or prescribed path by a single participant may be measured. Linear and angular separation can be measured in two-dimensional space or in three-dimensional space.

Figure 20:
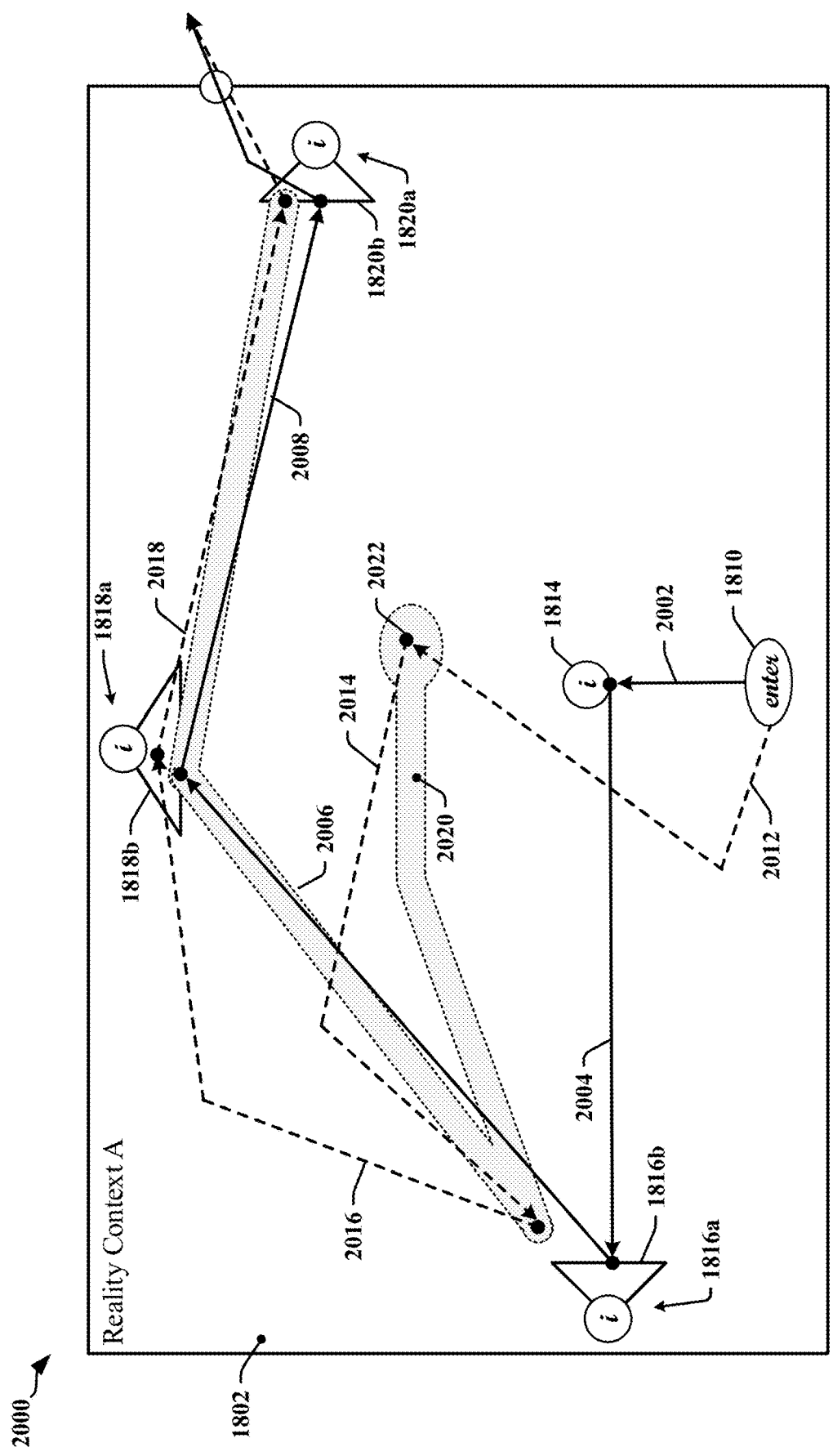
FIG. 20 illustrates a second participation example that relates to spatial aspects of traversal of the first reality context of FIG. 18 in accordance with certain aspects disclosed herein.

FIG. 20 illustrates a second participation example 2000 that relates to spatial aspects of traversal of the first reality context 1802 in FIG. 18. The second participation example 2000 relates to the passage of a single participant through the first reality context 1802, where the performance of the participant may be measured by comparison of participant performance to a baseline performance and to concurrent activities of other participants or leaders in the same first reality context 1802 and/or who are following the same lesson plan, game storyline, flight plan or other plan defined by an application. In this example, baseline performance may be adjusted based on a comparison to the adherence of peers or predecessors to the preferred, optimal or prescribed path.

FIG. 20 includes a heat map 2020 that illustrates an aggregate or average path associated with a group of co-participants. In one example, the heat map 2020 may represent the bounds of the paths followed by some percentage of participants, where the percentage may be defined by a distribution curve based on average distance of each participant from an average path. In another example, another type of heat map may include the path of each participant, with darker areas representing more heavily travelled zones than lighter areas.

The preferred, optimal or prescribed path may include a segment 2002 that leads from an entry point 1810 to a first waypoint 1814 that serves as an orientation or assembly point. In one example, an assembly point may be defined to allow participants to receive initial instructions. In this example, the assembly point may have no limitation on proximity or perspective of the participants. A target participant entering through the entry point 1810 may proceed along a path that includes a first segment 2012 leading to a first point 2022. In one example, the target participant may gravitate to a group of co-participants gathered at the first point 2022. The participants may receive instruction from the leader or from a controller.

The preferred, optimal or prescribed path includes a second segment 2004 that leads to a second waypoint 1816*a*, which has a required zone of attendance 1816*b*. In the illustrated example, the target participant proceeds by way of a second indirect path segment 2014 to a point exterior to the required zone of attendance 1816*b* associated with the second waypoint 1816*a*. The preferred, optimal or prescribed path includes a third segment 2006 that leads to a third waypoint 1818*a*, which has a required zone of attendance 1818*b*. In the illustrated example, the target participant proceeds over a third indirect path segment 2016 to the required zone of attendance 1818*b* associated with the third waypoint 1818*a*. The preferred, optimal or prescribed path includes a fourth segment 2008 that leads to a fourth waypoint 1820*a*, which has a required zone of attendance 1820*b*. In the illustrated example, the target participant proceeds through a fourth path segment 2018 to a point within the required zone of attendance 1820*b* associated with the third waypoint 1820*a*. In some instances, a participant may not be using equipment that can zoom in on a prescribed object for viewing, and the participant's avatar may be moved to a position suitable for viewing. The position suitable for viewing may be removed from the preferred, optimal or prescribed path, but the attention of the participant may be considered to be focused on the objective. In other instances, participants may be using equipment that have stronger zoom capabilities and such participants' avatars need not be placed at points on the preferred, optimal or prescribed path. According to certain aspects disclosed herein, the system may be capable of combining positional information, perspective (angle of viewing in 3D space) and zoom level of viewing equipment in order to accurately determine the object of participants' focus of attention.

The participation example 2000 illustrates two-dimensional deviations from the preferred, optimal or prescribed path by a single target participant, and/or deviations from the average path (e.g., center line of the heat map 2020) followed co-participants. These deviations can be characterized using various measurements. In one example, adherence to the plan can be measured by path length, maximum or average distance from the preferred, optimal or prescribed path may quantify certain aspects of participant performance. In another example, certain aspects of performance can be measured by maximum or average linear and/or angular separation from required zones of attendance or from the center of the heat map 2020. Linear and angular separation can be measured in two-dimensional space or in three-dimensional space.

Multiple types of variables may be measured to quantify performance of participants. For example, temporal measurements may define sufficiency of time expended by the participants, as well as time elapsed and cadence associated with target participant's traversal of a managed VR/AR/XR system. In another example, sensor input received from participant equipment may be used to determine quality of participation as a function of attentiveness at waypoints. Certain waypoints may include tasks, challenges or tests that can be used to assess quality of participation. Each of these variables may be measured as an absolute quantity or in relation to variables associated with a baseline, aggregated or peer performance. In some implementations, the performance of each participant may be aggregated and/or integrated into a baseline metric. In some implementations, a lesson plan, game storyline, flight plan or other plan may be updated or optimized based on measured performance of one or more participants or leaders.

Figure 21:
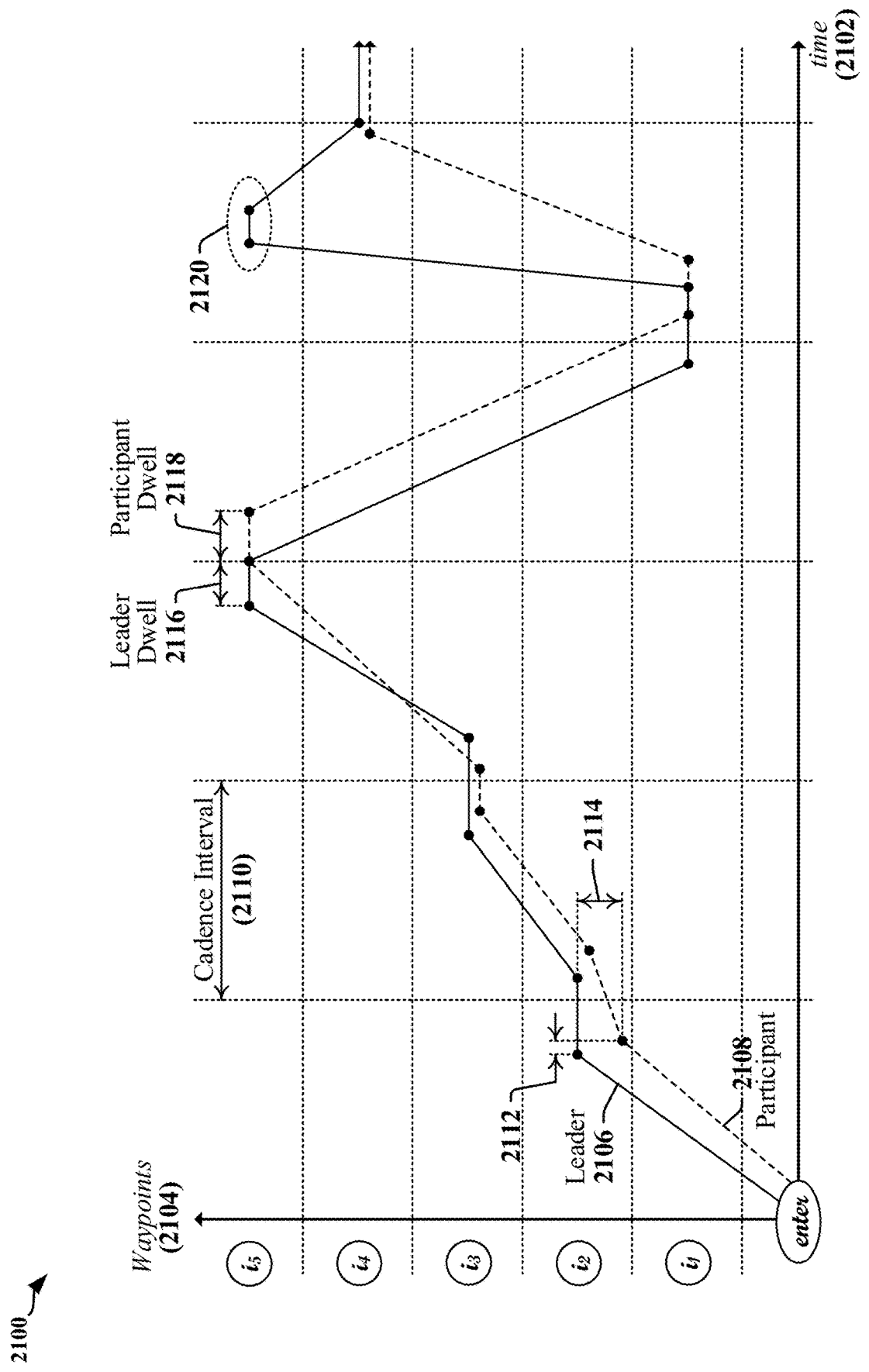
FIG. 21 illustrates a participation example that relates to temporal aspects of traversing a portion of a managed VR/AR/XR system in accordance with certain aspects disclosed herein.

FIG. 21 illustrates a participation example 2100 that relates to temporal aspects of traversal a portion of a managed VR/AR/XR system. A first curve 2106 illustrates the path taken by a leader between waypoints 2104, while a second curve 2108 illustrates the path taken by a participant between the waypoints 2104. The leader may navigate the waypoints 2104 in accordance with a defined or desired cadence. The cadence may define a period 2101 between visitations to each of a pair of waypoints 2104. The leader may exhibit some variability in times of arrival or departure from a waypoint 2104, while maintaining cadence through presence at the waypoint 2104 at a prescribed point in time, for example. Visitations may be defined as having temporal and spatial components. In one example, the system may define a minimum duration of time for a visitation at a waypoint 2104 to be recognized. In another example, the system may define a combination of position, perspective (angle of viewing in 3D space) and zoom level of viewing equipment that satisfy a participant focus of attention requirement sufficient to recognize visitation at a waypoint 2104.

The participant may arrive or depart a waypoint 2104 before or after the arrival or departure of the leader. In some examples, performance of the participant may be measured as a delay 2112 between the arrivals of the leader or participant at points proximate to a waypoint 2104. In the illustrated example, the curves 2106, 2108 include a representation of distance from waypoints 2104. In some examples, performance of the participant may be measured as angular or linear separation 2114 from a waypoint 2104. In some instances, the performance of the participant may be measured based on angular or linear separation 2114 from the leader at a waypoint 2104. The leader may dwell at a waypoint for a first period of time 2116, while the participant dwells at the same waypoint for a second period of time 2118. In some examples, performance of the participant may be measured as a difference between the first period of time 2116 and the second period of time 2118, and/or as the overlap between the first period of time 2116 and the second period of time 2118.

In some implementations, the participant may not attend a stop by the leader at a waypoint 2104. In some examples, performance of the participant may be measured as a number of missed waypoints 2104, or a number of additional stops at locations or waypoints 2104 that are different from stops at locations or waypoints 2104 made by the leader. In some examples, the leader may make an optional stop 2120 that may be included or excluded from performance measurement. Adherence to the cadence may be a measure of the leader's performance and additional stops 2120 or missed stops may affect cadence.

Cadence may be expressed as a frequency, and/or may be analyzed using digital signal processing techniques to enable real-time performance assessments. For example, a traversal of a managed VR/AR/XR system may be characterized using a period function, such as a Fourier series that permits rapid comparison of each traversal of the managed VR/AR/XR system with an optimal traversal of the managed VR/AR/XR system. Other signal processing techniques may be employed to measure performance in a managed VR/AR/XR system. For example, phase and amplitude relationships may be used to define stops at waypoints 2104 and distances from the waypoints or leader. In some instances, high volumes of performance data may be processed and assimilated in real time, enabling artificially intelligent functions to rapidly detect variances and issues and provide assistance and prompts to participants and leaders.

According to certain aspects of this disclosure, performance measurements used to characterize participation in activities and behaviors in a multi-participant environment may be generated based on participant focus. Participant focus may be determined from information received from one or more sensors in a device worn by a participant in a session conducted on a managed reality system. The information may be generated by the sensors and may indicate a point of gaze or a direction of view of the participant. In one example, a backwards-facing camera mounted on or within a headset or other wearable device may provide images that can be processed to determine a point-of-gaze based on participant's eyes and a knowledge of images being displayed to the participant within or related to the multi-participant environment. In another example, an eye-tracking sensors mounted on or within a headset or other wearable device may be configured to directly report a point-of-gaze of the participant. Participant focus may further be determined from information regarding positioning of a participant's avatar within the multi-participant environment as reported by one or more controllers that manage the multi-participant environment. Participant focus may further be determined from information received from a controller or local system that indicates activities by the participant that are not related to the multi-participant environment. In some instances, a controller or local system may indicate inactivity of the participant when activity is expected.

FIG. 22 illustrates an example of a participation report that may be generated for a session in a multi-participant environment. The participation report includes a listing of session configuration information 2200. Session configuration information 2200 may set certain global parameters and constraints to be applied during the session. In the illustrated example, certain guidelines are defined that determine an expect virtual distance of participants from a leader of the session and from an object of interest identified by the leader or by a session plan, study plane, etc.

The participation report includes a listing of object configuration information 2210. Object configuration information 2210 may identify certain controls that are available to the leader when the leader is focused on the object, and/or certain controls that are available to a participant when the participant is focused on the object. The Object configuration information 2210 may configure certain parameters that define the expected relationship between the leader and/or the participant, including parameters and constraints that override corresponding global parameters and constraints set for the session. In some instances, the leader may redefine certain parameters and constraints set for the session, or for an object.

The participation report includes performance information 2220 for participants. In the illustrated example, the performance of M participants is presented for each of N objects that were visited in the session. In some instances, the performance information 2220 may include one or more objects that can be used to record participant performance, including focus, with respect the leader. The performance information 2220 may include information that reports total dwell time of a participant at each object, virtual distance from the object and from the lead, which may be expressed as an average, mean or statistically relevant representation of distance for the corresponding dwell time. The performance information 2220 may include information that indicates activity level with respect to each object. Activity level may be reported on a scale (here 0-10), whereby a participant's activity related to an object of interest may be recorded in the range 1-10 and complete inactivity or non-participation may be reported as a zero value. The illustrated performance information 2220 includes a participant 2222 with a consistently high level of activity, a participant 2224 with varying activity levels and a participant 2226 with an activity level that indicates inattention.

Figure 23:
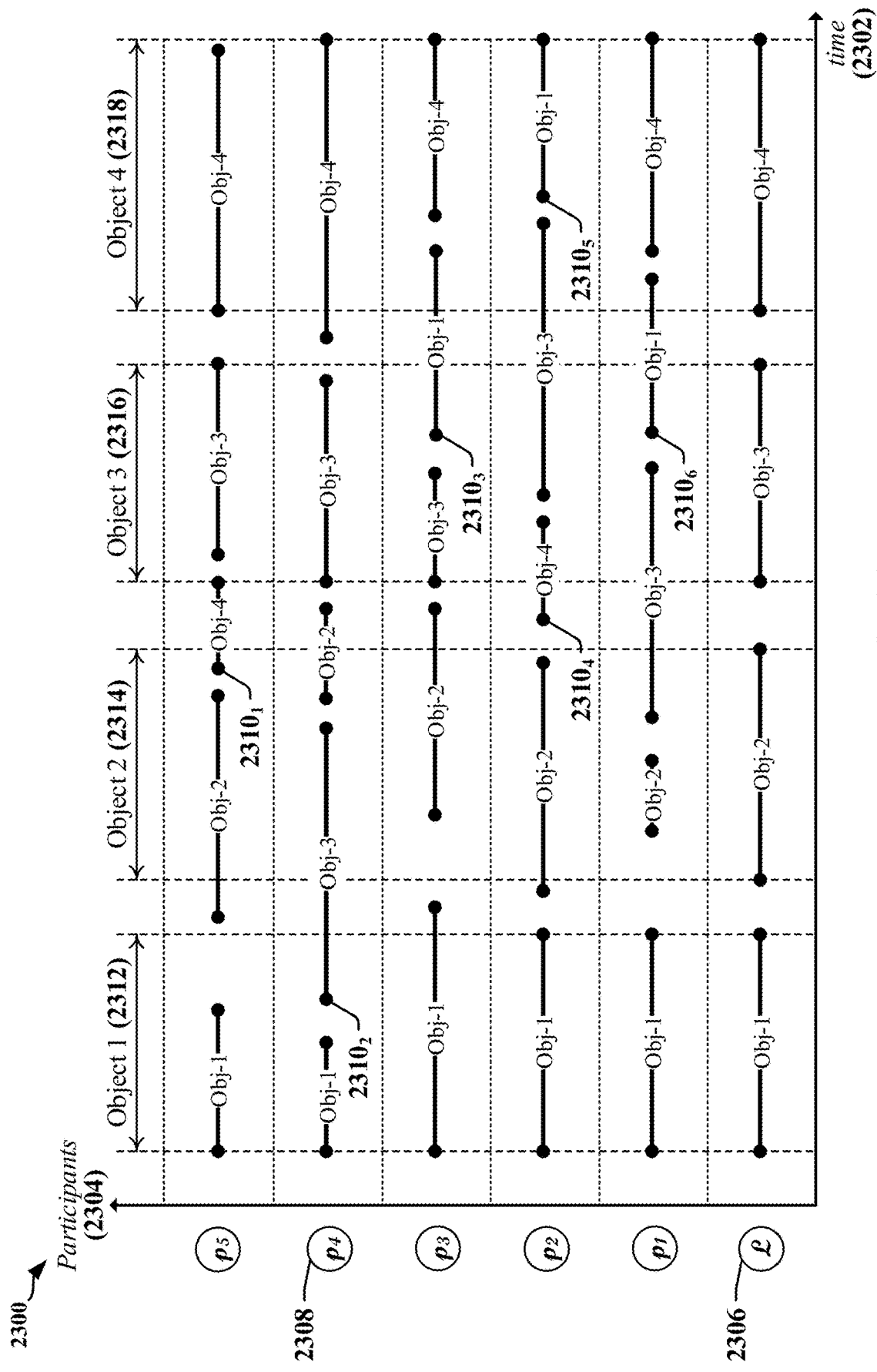
FIG. 23 illustrates one example of a graphical representation of participation information presented in accordance with certain aspects of this disclosure.

A leader may view configuration, participation and control information during a session. The information may be available in the form of the participation report illustrated in FIG. 22. In certain implementations, configuration, participation and control information may be superimposed on the images presented to the leader, as illustrated the example of an experiential teaching scene 2600 in FIG. 26. In some implementations the configuration, participation and control information may be presented graphically during or after the session. FIG. 23 illustrates one example of a graphical representation of participation information 2300 presented in accordance with certain aspects of this disclosure.

The graphical representation of participation information 2300 plots focus of multiple participants 2304 over time 2302. The leader 2306 may be used as a baseline for determining focus and participation of the other participants 2304. In the illustrated example, the leader 2306 traverses the session between four objects 2312, 2314, 2316 and 2318, with each of the other participants 2304 expected to follow. The location and duration of dwell of each participant is represented by a line, such as the lines $2310_1$-$2310_6$. Certain lines $2310_1$, $2310_4$ indicate a short dwell time, while other lines, including each of lines $2310_1$-$2310_6$, indicate an out-of-sequence focus on an object 2312, 2314, 2316 or 2318. The lines $2310_1$-$2310_6$ may be color-coded to indicate point-of-gaze and/or to indicate out-of-sequence focus.

Figure 24:
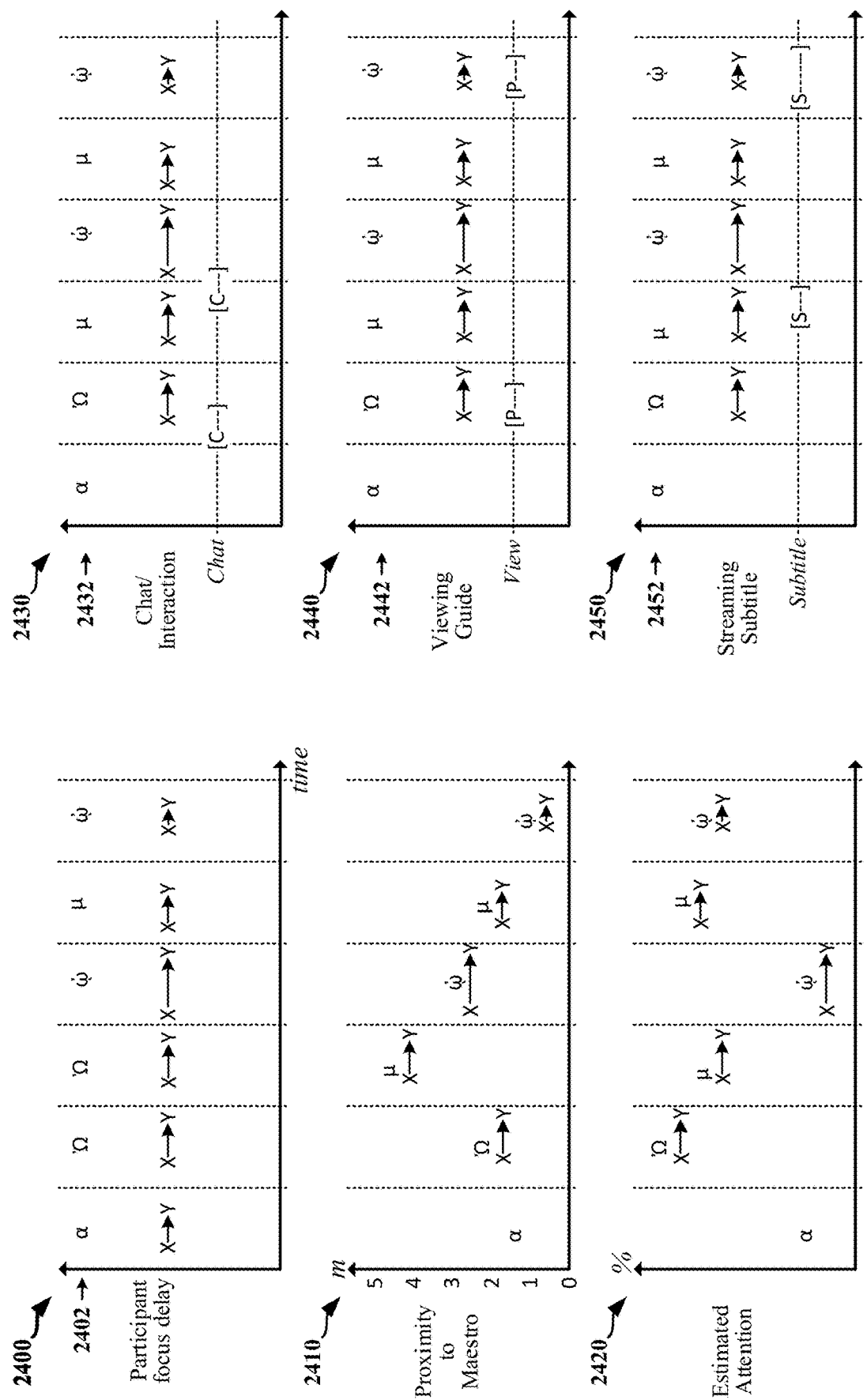
FIG. 24 illustrates certain other parameters that may contribute to an assessment of performance within a managed VR/AR/XR system in accordance with certain aspects disclosed herein.

FIG. 24 illustrates certain other parameters that may contribute to an assessment of performance within a managed VR/AR/XR system. The parameters may be measured and processed to enable real-time observation and reporting of status to a leader or system manager. The parameters may be measured for each participant, for a group of participants and/or for all traversals or uses of the managed VR/AR/XR system. The parameters may be quantified, weighted, combined and/or aggregated to obtain one or more metrics that can be provided in real-time to a leader or system manager. In one example, parameters representing attentiveness may be combined with measurements of spatial and temporal performance (see FIGS. 19-20) to assess participant performance in real time.

Various performance measurements may be displayed to the leader in real time. A first graphical display element (for instance any object type UUID) may be generated, displayed or invoked to represent the transition activity for change of participant focus of attention 2400 from a first waypoint (x) to a second waypoint (y). According to certain aspects disclosed herein, the system may be capable of combining positional information, perspective (angle of viewing in 3D space) and zoom level of viewing equipment in order to accurately determine the object of participants' focus of attention. The delay between change of focus of attention may be displayed for each of a group of participants 2402. Change of focus of attention may be determined from motion sensor data, data received from head, face or eye-tracking sensors, display information, zoom settings and inactivity indicators received from participant equipment. In some instances, data provided by the head, face or eye-tracking sensors, in addition to display information, zoom settings and inactivity indicators received from participant equipment may be used to determine current focus of attention or to signal no change in focus of attention. A second graphical display element may be generated to represent distance 2410 of each participant in addition to the transition activity for each participant. Distance information may be obtained from motion, location and orientation sensor data, including zoom settings, received from participant equipment. A third graphical display element may be generated to represent the level of attention 2420 of each participant in addition to the transition activity for each participant. The level of attention may be reduced when a participant is performing other tasks on the participant equipment, when no motion is detected or the participant provides no input or is non-responsive for some period of time, as indicated by participant equipment.

One or more participants may engage in activities that are supported by an application, but that may indicate certain issues with participant performance, including accesses to system-generated information. For example, issues may be indicated when the participant engages in excess in-application conversations, AIVA interactions, references to a guide and/or replaying streaming or subtitles. A fourth graphical display element may be generated to represent the chat activity 2430 between two or more participants and an AIVA, as indicated by participant equipment and/or system equipment. A fifth graphical display element may be generated to identify interactions 2440 between participants and a viewing guide, as indicated by participant equipment and/or system equipment. A sixth graphical display element may be generated to identify interactions 2450 between participants and a streaming or subtitle feed.

Figure 25:
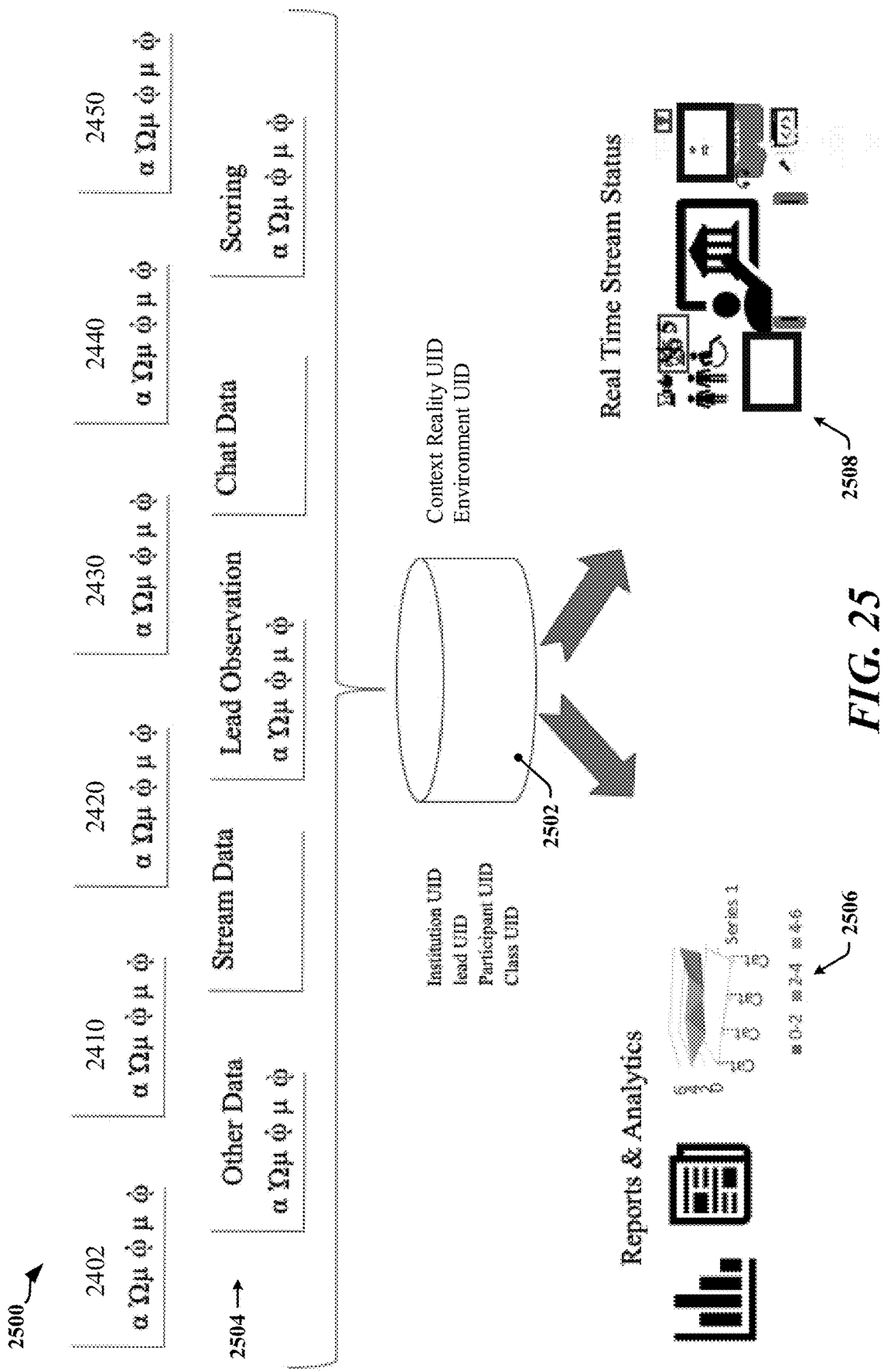
FIG. 25 illustrates an example of data flow related to parameters that may contribute to an assessment of performance within a managed VR/AR/XR system.

FIG. 25 illustrates an example of data flow 2500 related to parameters that may contribute to an assessment of performance within a managed VR/AR/XR system (see FIG. 24). A database 2502 may be configured to receive information related to change of focus of attention 2400, distance 2410 of each participant, level of attention 2420 of each participant, chat activity 2430 between two or more participants and an AIVA, interactions 2440 between participants and the viewing guide, and interactions 2450 between participants and a streaming or subtitle feed. Other types of information 2504 may be provided to the database, including chat, streamed and other data captured by the system, scoring calculated by one or more algorithms used to process performance data and observations made by the leader. In one example, the leader may dictate or manually annotate an activity.

Information maintained by the database 2502 may be managed and/or processed by one or more applications that produce performance measurements for participants. In some implementations, performance measurements can be used to determine or predict future persistence and retention rates. In one example, information maintained by the database 2502 may be processed to generate reports and other analytics 2506. In another example, information maintained by the database 2502 may be analyzed to provide status information 2508 that can be provided into a stream received by the leader and/or one or more participants. Reports and status information may be provided in various fields of a scene presented to the leader or participants, where the fields include focus of attention, status and controls.

Figure 26:
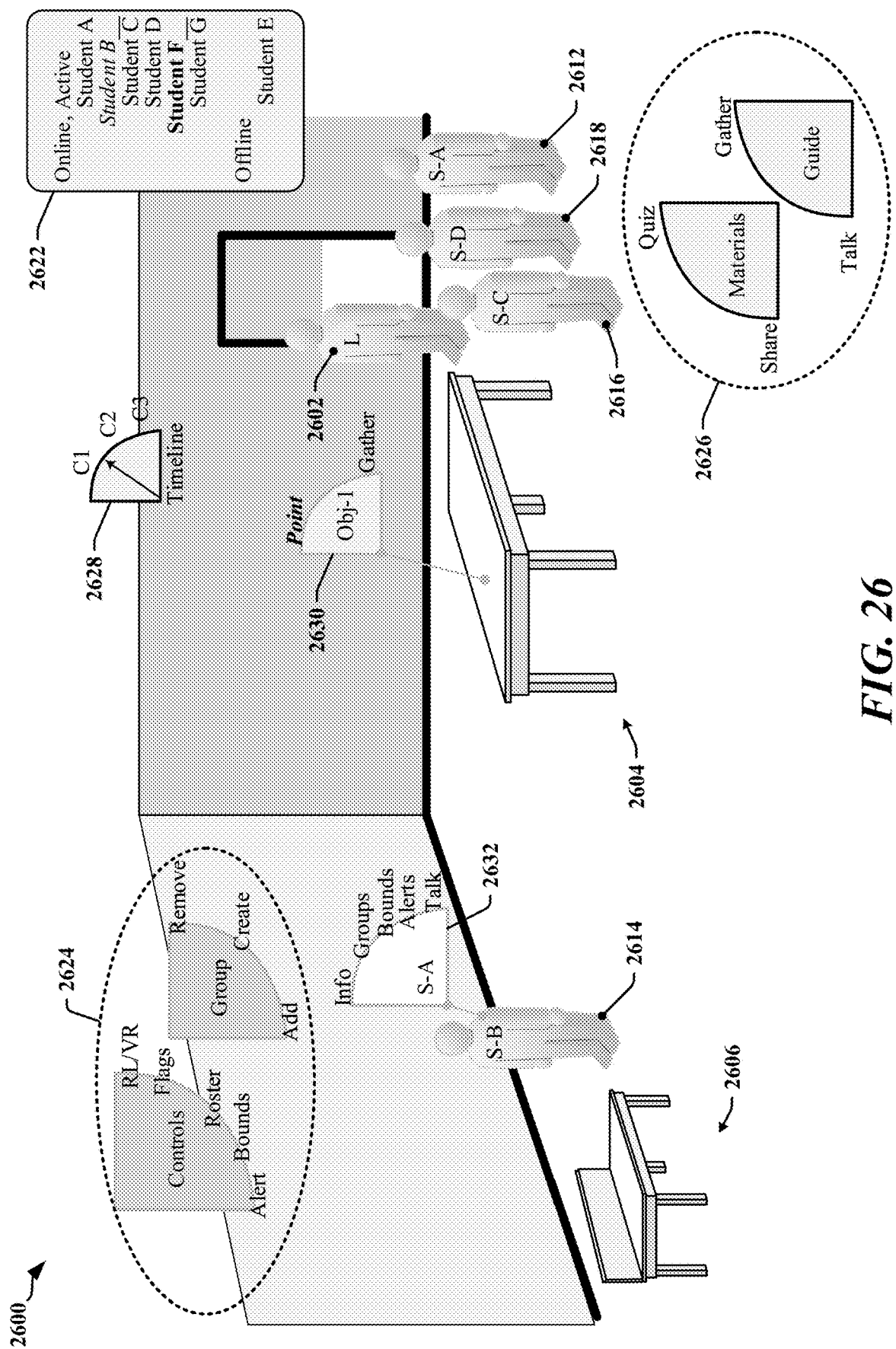
FIG. 26 illustrates an example of an experiential teaching scene provided in accordance with certain aspects disclosed herein.

FIG. 26 illustrates an example of an experiential teaching scene 2600 that may be implemented and/or managed by a Commons XR Manager 900 in accordance with certain aspects disclosed herein. In one example, the experiential teaching scene 2600 is part of a group led by a docent, instructor 2602, guide, escort or other leader within a VR timeline, reality context and/or a reality type accessed through the first adapter 114, 116, 118 illustrated in FIG. 1. In one example, the leader of the group may be considered an instructor 2602, and the VR timeline 2628 is managed by the instructor 2602. The experiential teaching scene 2600 may represent a time slice at which an instructor 2602 can stop, and/or from which the instructor 2602 can use the VR timeline 2628 to navigate backward or forward in time as desired. In some instances, manipulating the VR timeline 2628 may impact the VR timeline for the entire group. The instructor 2602 may control the presented material, including one or more objects 2604, 2606 that can be added dynamically by the instructor 2602. The objects 2604, 2606 may be added to a background constructed for the purpose of the instruction, or to a virtual or augmented reality provided by one or more VR, AR and/or XR system. The objects 2604, 2606 may also contain embedded links and metadata that the group or a member of the group (if so allowed or selected) to further inspect the object and/or provide more detail about the object itself. This may include more information, such as:
  a) part of the lesson plan,
  b) a hint about what to do,
  c) to how to obtain this particular object as an AR or VR object,
  d) how to obtain this particular object in the real world, and/or
  e) a test.

Presence and level of participation of students or other participants 2612, 2614, 2616, 2618 may be controlled by the instructor 2602. Participants 2612, 2614, 2616, 2618 may join the experiential teaching scene 2600 through a different type of VR, AR and/or XR system, through services provided by the Commons XR Manager 900. Participation may require an invitation, subscription and/or consent of the instructor 2602. Some participants 2612, 2614, 2616, 2618 may interact with the instructor 2602 and/or objects 2604, 2606 within the experiential teaching scene 2600. Some participants 2612, 2614, 2616, 2618 may be observers or auditors of the instruction provided through the experiential teaching scene 2600.

The instructor 2602 may have access to information regarding the participants 2612, 2614, 2616, 2618. For example, status information included in control mechanisms 2622 may list participants 2612, 2614, 2616, 2618 participating or auditing in the instruction. The status information may identify participant level of engagement in the instruction, which may be provided by corresponding participant contexts. In some implementations, the participant contexts may report activities of a participant, and the Commons XR Manager 900 may relate such activities to the experiential teaching scene 2600 and/or to objects 2604, 2606 in the experiential teaching scene 2600. The instructor 2602 may, for example, be alerted to participants 2612, 2614, 2616, 2618 who are distracted, looking in the wrong direction (e.g., see the lines $2310_1$ and $2310_2$ in FIG. 23) and/or engaging in activities unrelated to the instruction (e.g., see participant 2226 in FIG. 22). The instructor 2602 may message or speak directly to one or more participants as needed through a private session.

The instructor 2602 may dynamically control certain aspects of the experiential teaching scene 2600. Control mechanisms 2622, 2624, 2626, 2628, 2630 that may be manipulated within the experiential teaching scene 2600 by the instructor 2602. Certain control mechanisms 2624 may be related to management of participants 2612, 2614, 2616, 2618 and objects 2604, 2606 within the experiential teaching scene 2600. Certain control mechanisms 2626 may be related to control of activities related to participants 2612, 2614, 2616, 2618 and objects 2604, 2606 within the experiential teaching scene 2600. Certain control mechanisms 2628, 2630 may be related to management of the experiential teaching scene 2600 itself and the timeline in which the experiential teaching scene 2600 resides. Some control mechanisms 2622, 2624, 2626, 2628, 2630 will be used to generate, display or invoke objects for that context reality. The objects may appear in specific locations or may appear in a place that the lead designates by reference to a location UUID or similar. Once an object is in view for all participants 2612, 2614, 2616, 2618, some control mechanisms 2622, 2624, 2626, 2628, 2630 can be used to make participants 2612, 2614, 2616, 2618 gather at that location or make participants 2612, 2614, 2616, 2618 look at that object. Some control mechanisms 2622, 2624, 2626, 2628, 2630 can be used to hide one, any number or all participants 2612, 2614, 2616, 2618 from each other so as not to obstruct objects to be viewed from each other. This may include hiding the lead. Some control mechanisms 2622, 2624, 2626, 2628, 2630 may also be used to indicate, for example a laser light, which objects the lead is discussing or would like the participants 2612, 2614, 2616, 2618 to view. As indicated previously, all actions done in real-time are assigned a time-stamp to indicate when those actions were done and what resultant experiences occurred (see for instance FIGS. 18-23).

Each control mechanism 2622, 2624, 2626, 2628, 2630 may have a separate logical channel potential to be a separate channel to the Commons XR Manager 900. The Commons XR Manager 900 may overlay or integrate input from the control mechanisms 2622, 2624, 2626, 2628, 2630 onto VR or AR content provided in a reality context. The Commons XR Manager 900 may process and interpret input from the control mechanisms 2622, 2624, 2626, 2628, 2630 and may generate requests and commands that can be transmitted through logical connections and, in some instances, may establish additional logical connections in response to the input. In some instances, input from the control mechanisms 2622, 2624, 2626, 2628, 2630 trigger certain preconfigured actions.

In one example, the control mechanism 2622 may alert the instructor 2602 that a student has wandered away from the group or is looking at something that is not related to the group or to a group activity. An automatic warning can be configured to alert the student that the student has been flagged for non-participation. In some implementations, control mechanism 2624 may be dialed to allow for removal of a student or an object. In some implementations, control mechanism 2624 may be dialed to summon a student or an object, where summoning a student or an object may operate with different effects. In one example, a student may be summoned and can optionally proceed to a gathering point indicated by the instructor 2602. In another example, a student or an object may be automatically transitioned to a gathering point when summoned by the instructor 2602. A participant 2614 other than a leader may participate through a participant control 2632 at one or more levels based on subscription, activity type and policies defined by the VR/AR/XR experience (See FIG. 28 for more detail).

A Commons XR Manager 900 may be manipulated by third parties in accordance with certain aspects disclosed herein. In one example, a sponsor or other content supplier may provide product information relevant to the instruction including video, audio, images and/or 3D representations of objects. The content supplier may be provided with information identifying the type of product that is to be discussed or highlighted in the experiential teaching scene 2600. The information provided to the content supplier may identify aspects of the display location, perspective and size of the product to be displayed. The Commons XR Manager 900 may configure a logical connection between the experiential teaching scene 2600 and the content supplier that allows the content supplier to install an image or 3D representation of the product in the experiential teaching scene 2600. In some instances, the logical connection between the experiential teaching scene 2600 and the content supplier is bidirectional and permits interaction between the content supplier and the instructor 2602 and/or participants 2612, 2614, 2616, 2618. In one example, the instructor 2602 and/or a participant 2612, 2614, 2616, 2618 may browse products similar products to a displayed product. In another example, the instructor 2602 and/or a participant 2612, 2614, 2616, 2618 may opt to visit a reality context maintained by the content supplier.

According to certain aspects disclosed herein, the Commons XR Manager 900 may be configured to broker access rights, associated costs, and display conversion for objects within the shared environment (such as the experiential teaching scene 2600), allowing objects which exist in one reality context 106 to be instantiated across two or more reality contexts 106, while preserving intellectual property rights and enforcing restrictions necessitated by license or regulation. In certain implementations, ad hoc access can be obtained within an VR, AR and/or XR experience in situ. For example, the access rights may be obtained, updated or invoked without leaving a current VR, AR and/or XR environment, space or experience based on subscriptions or point-of-sale interfaces. Participant rights, object information, display requirements, and/or external context information may be maintained as metadata attached to the participants 2612, 2614, 2616, 2618 and objects within the XR Manager 900 system.

In some implementations, a "floating" object may overlay the VR/AR content. The floating object may be actionable. For example, a floating object may have an instructional management object may float on either the students or the leader's screens. In some instances, instructional links may be provided as needed, including links that may be classified as advertisement placements.

In some implementations, an "embedded" object may maintain a position relative to certain objects located within the content itself. In one example, a recognition type AR-based embedded object may be defined where a radiator, or chair or stairway can be identified for instructional purposes. In some instances, a leader may define the embedded object dynamically or in advance of the initiation of instruction. The action on that object may be to have the entire object stored by the participants 2612, 2614, 2616, 2618 for a subsequent, more complete review. In some instances, the embedded object may be enhanced or more fully-used in the subsequent review in the participant XR environment.

In some implementations, "highlight" objects may be available to enhance participant presence. In one example, a participant avatar may be adorned with wearable content, wigs and/or tattoos. The character of the avatar itself may be selected such that it can be identified by other participants 2612, 2614, 2616, 2618 and stored for later purposes. The highlight objects may include objects that have been purchased or obtained through licensing. Highlight objects may enable certain recognition or outlining features in an VR, AR and/or XR system.

In accordance with certain aspects disclosed herein, participants 2612, 2614, 2616, 2618 in a VR/AR/XR experience may include one or more leaders, subscribers and/or invitees. The VR/AR/XR experience may be provided in a venue that includes one or more different VR reality contexts and/or environment that can be combined or used individually for an event that involves a singular participant or a multi-participant group. In certain examples, a VR/AR/XR experience may be constructed as a tour, training, educational or other event or for other purposes.

Participants 2612, 2614, 2616, 2618 in a group activity may include one or more leaders who can control or manage a VR/AR/XR session and who may act as a lecturer, guide or instructor 2602 for the VR/AR/XR session. A leader may invoke, configure and/or control an artificially intelligent virtual assistant (AIVA) that can be configured to monitor and respond to participant requests, actions and needs. The leader may delegate responsibilities and control to the AIVA for a VR/AR/XR session, some part of a VR/AR/XR session and/or VR/AR/XR experience. The leader and the AIVA may be presented within an VR/AR/XR experience as a hybrid leader referred to herein as a "Maestro" where the relative contributions of the AIVA and the leader can be configured by the leader. In one example, the AIVA may be assigned to monitor participation levels of individual participants 2612, 2614, 2616, 2618, respond to queries from the participants 2612, 2614, 2616, 2618 and provide replays of earlier activities, guidance within the VR/AR/XR experience and feedback to the leader regarding participation. In another example, the AIVA may be assigned to present core material of the VR/AR/XR experience or otherwise direct the VR/AR/XR experience.

A participant other than a leader may participate in a group activity at one or more levels based on subscription, activity type and policies defined by the VR/AR/XR experience. Policies may be defined as a course or principle of action adopted or proposed by a government, institution, business, or individual. Policies can be adopted to individual situations or group situations within a reality context or VR/AR/XR experience, including leader and institutional requirements. For example, participants 2612, 2614, 2616, 2618 in the group activity include individual participants in an event session (attendees), individual participants in a training session (trainees), and individual participants in a tour (tourists).

A leader may initiate a VR/AR/XR experience through pre-configuration. Pre-configuration may be used to configure one or more events, venues associated with the events, and to identify participants 2612, 2614, 2616, 2618 in the VR/AR/XR experience. The leader may configure individual participant experiences, access and rights. In some instances, participants 2612, 2614, 2616, 2618 may be assigned obligations and/or tasks to perform within the VR/AR/XR experience. The leader may configure AIVA participation levels during pre-configuration. The leader may configure time constraints during pre-configuration. In one example, the leader may configure a start time, an end time, a minimum duration of the VR/AR/XR experience and/or a maximum duration of the VR/AR/XR experience. The leader may configure objectives for one or more participants 2612, 2614, 2616, 2618 and metrics to be used to judge performance to the objectives during pre-configuration.

Figure 27:
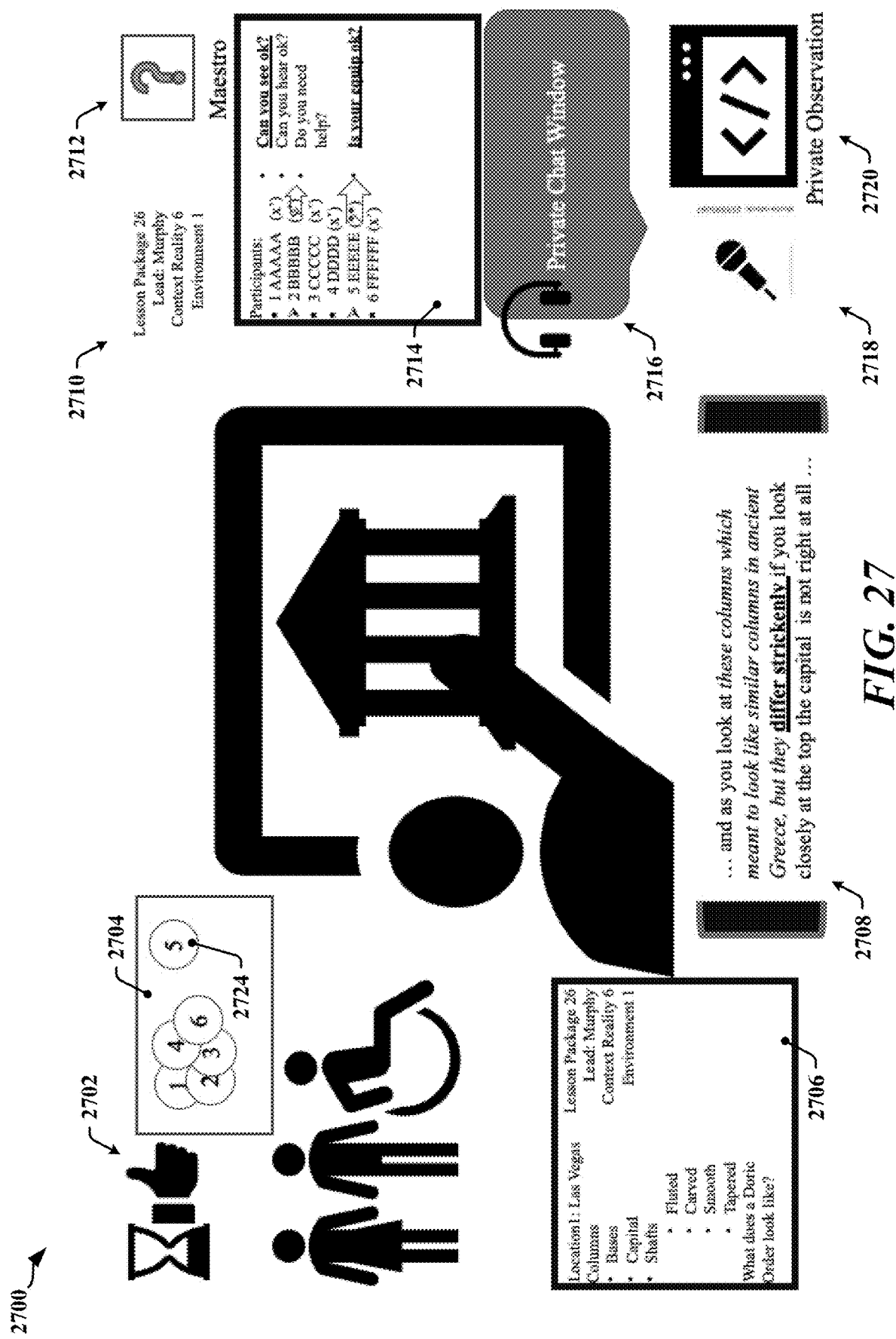
FIG. 27 illustrates an example of a scene provided to a docent, instructor, guide, escort or other leader within a VR timeline, reality context and/or a reality type.

FIG. 27 illustrates an example of a scene 2700 provided to a docent, instructor, guide, escort or other leader within a VR timeline, reality context and/or a reality type. Various elements are superimposed on the scene 2700. General status information may include timing status 2702 indicating adherence to a schedule of the presentation by the leader. Participant information 2704 may identify active, unfocused, and/or inactive participants. An information panel 2706 may be provided as a lesson plan, guide or map for the leader. A subtitle 2708 may be displayed as a transcription of the leader as spoken, a prompt or summary of information disclosed concerning a current waypoint. In the illustrated example, elements of the transcript material are highlighted. In some implementations, highlighting may be automatically generated by the system via the leader pointing or focusing attention to a specific element identified in the context reality. Other mechanisms may be used to self-identify, or to have leaders help in identifying elements to be focus of attention, for instance, detailed in the lesson plan.

System status information 2710 and an access point 2712 to an AIVA may be provided. A participant performance field 2714 may be displayed to permit the leader to identify and communicate with participants. In the illustrated example, participant-5 2724 is flagged in the participant performance field 2714 with a stored message to be sent to participant-5. This stored message to the participant may be generated automatically, and may be initiated when the leader focuses attention to the corresponding participant performance field element of participant-5 or some other combination of actions. The leader may communicate privately with one or more participants through a chat window 2716. The leader may record notes and observations by activating a recorder through an icon 2718 and/or may provide textual notes and observations or select check boxes, predefined text scripts through a user interface 2720.

Figure 28:
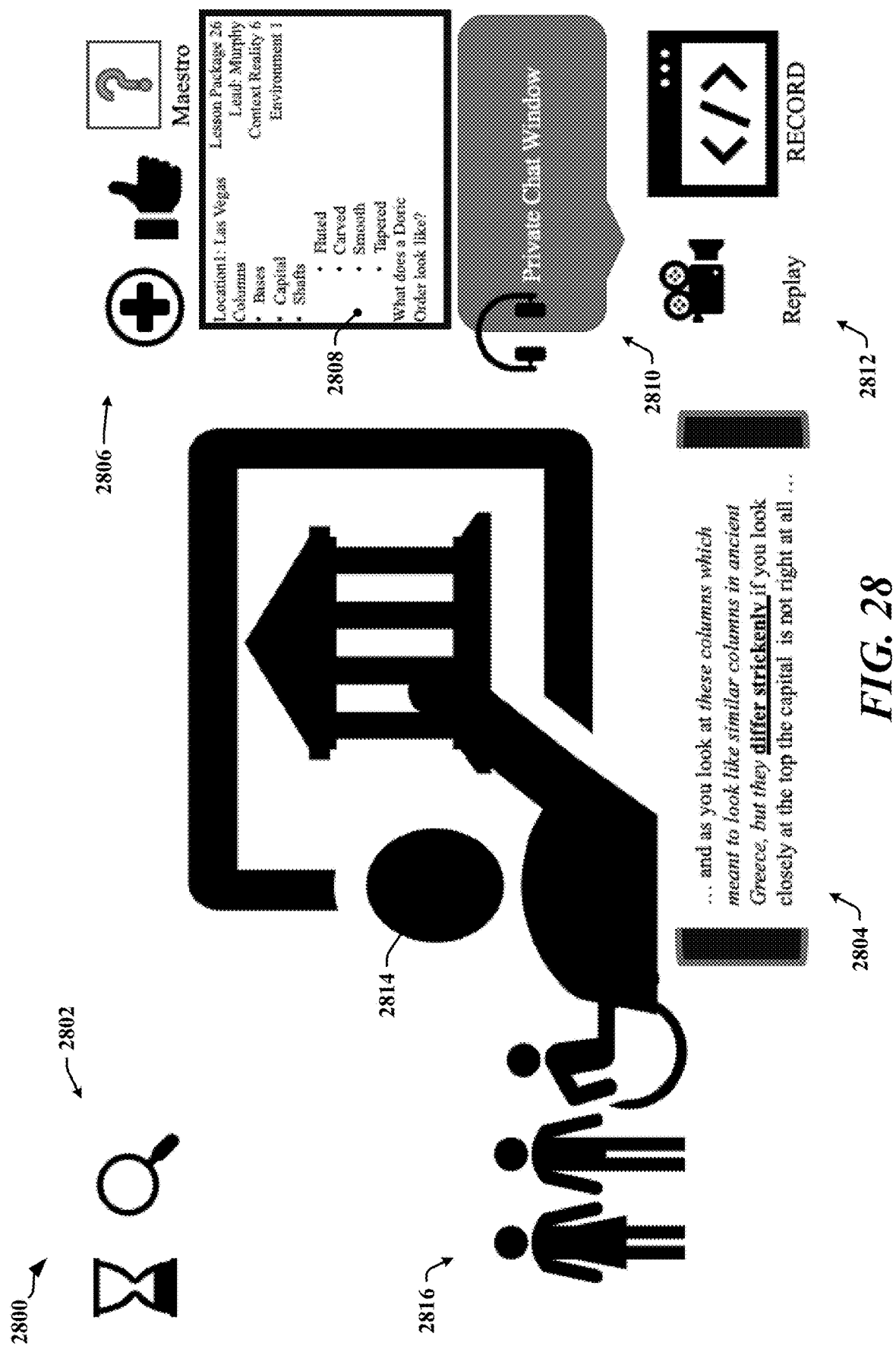
FIG. 28 illustrates an example of a scene provided to a participant within a VR timeline, reality context and/or a reality type.

FIG. 28 illustrates an example of a scene 2800 provided to a participant within a VR timeline, reality context and/or a reality type. Various elements are superimposed on the scene 2800. General status information 2802 may provide timing status and a search capability. An assistance grouping 2806 may be provided that enables a participant to seek online help, including from an AIVA, and/or flag the leader that assistance is needed. A subtitle 2804 may be displayed as a summary of information being disclosed concerning a current waypoint. In the illustrated example, the subtitle 2804 displays a transcription of the leader as spoken of information disclosed concerning a current waypoint. The participant may communicate privately with the leader or the one or more participants through a chat window 2810. The participant may record the session, and/or access replays through multimedia icons 2812. In some contexts, the leader may be represented by an avatar 2814. In an AR context, an image of the leader may be shown. Other participants may be represented by corresponding avatars 2816 or other entities configured for the participant viewer. In some instances, certain participants are not represented in the scene. Representation of participants may be determined by an institution, leader or by personal choice of the participant. The institution, leader or participant may determine that no representation of the participant is to be displayed.

Figure 29:
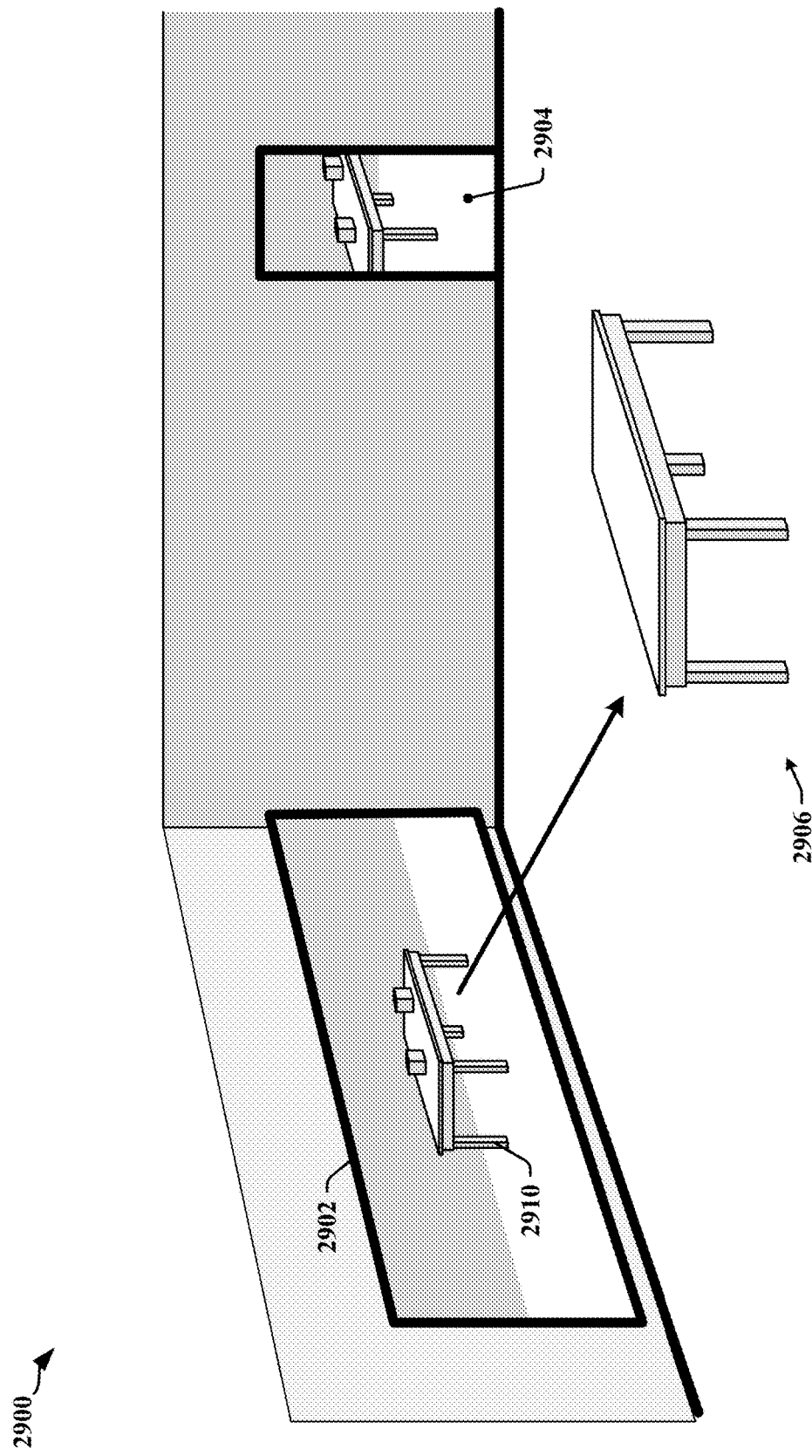
FIG. 29 illustrates a scene that includes or interacts with multiple virtual reality contexts in accordance with certain aspects of the disclosure.

FIG. 29 illustrates a scene 2900 that may be constructed to include or interact with multiple virtual reality contexts. In one example, the scene 2900 may be used to initiate a classroom event. In some implementation, the scene 2900 can be constructed in an augmented reality context superimposed on a physical meeting room or classroom. Audiovisual and other equipment present in the physical meeting room or classroom may be integrated into the scene. In some instances, a display system 2902 may be provided through the augmented reality context. Material may be presented to the group through the display system 2902. In another example, the scene 2900 may be constructed in a virtual reality context that may be designed to resemble or function as a meeting room or classroom. Material may be presented to the group through a display system 2902 provided through the virtual reality context.

A group of participants may gather within the scene 2900. The participants may be summoned by a leader (see for example control mechanism 2624 in FIG. 26), and or may enter the scene 2900 through their own actions. The scene 2900 may link to other AR, VR, XR scenes and/or elements. In one example, a presentation displayed on the display system 2902 may include elements that are represented by virtualized objects that can be introduced to the scene 2900 in a variety of manners. In one example, the presentation may include an image of an object 2910 that is a subject of instruction or discussion.

The Commons XR Manager may manage relationships between the presentation and one or more virtualized objects. The relationships may be defined by a script or lesson plan, for example. In one example, the leader may bring one or more virtualized objects 2906 into the scene 2900 while discussing an associated image of an object 2910 displayed on the display system 2902. In another example, the leader may cause a portal 2904 to be opened, and the group may transition to and from a different reality context through the portal 2904. In the illustrated example, the portal 2904 leads to a virtual room depicted in the presentation displayed on the display system 2902, where the object 2910 that is the subject of instruction or discussion is present in the virtual room. The object 2910 may be represented in 3D form in the virtual room. In some instances, the object 2910 may be viewed in a 360° view within a virtual space accessed through the portal.

Example of an Editing Process

Figure 30:
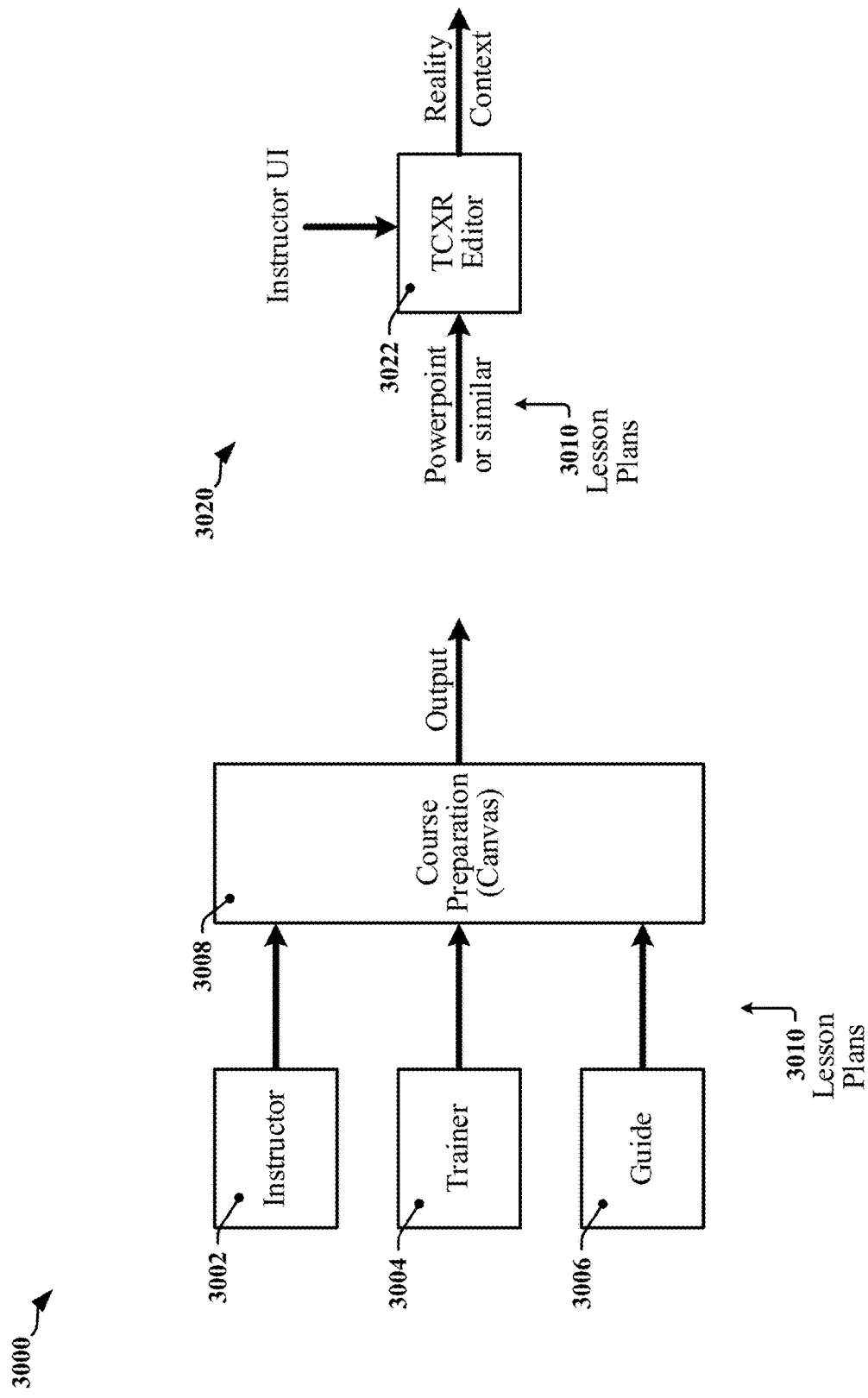
FIG. 30 illustrates a process for creating reality contexts from instructional course material in accordance with certain aspects disclosed herein.

FIG. 30 includes diagrams 3000, 3020 illustrating the process by which a docent, instructor 3002, guide 3006, trainer 3004, escort or other leader can take an instructional course syllabus, lesson plans 3010 or similar instructional material, input that material into the TCXR editor 3022 and have one or more reality context(s) constructed for later use. The TCXR editor 3022 allows leads to integrate their prepared course material with reality context(s) by creating various object UUIDs (as described above) such that those identified objects can be shown during the reality context VR experience. In this way the identified object can be manipulated by the lead, seen by the participants and metrics derived based on view, grouping, discussion or questions of that object.

In certain implementations, the TCXR editor 3022 may build a script that defines a four-dimensional session in a multi-participant environment. In one example, objects may be identified in one or more lesson plans 3010 and used to create scenes to be traversed in a session. Session configuration information 2200 and object configuration information 2210 may be embedded within the lesson plans 3010 and/or provided separately. A timeline or cadence may be defined the lesson plans 3010 and/or provided separately. The resulting reality context may include scenes that unfold according to a scene-specific timeline with objects that become a focus of attention according to an object-specific timeline. The TCXR editor 3022 may define a session script that can be customized or modified by a leader, and that may be adaptable to accommodate any number of participants that register enter the experience.

In some implementations, the TCXR editor 3022 may define relative start and end times that can be mapped to start and end times defined by a leader. In some instances, the timeline may be scaled to fit within the start and end times defined by the leader.

Figure 31:
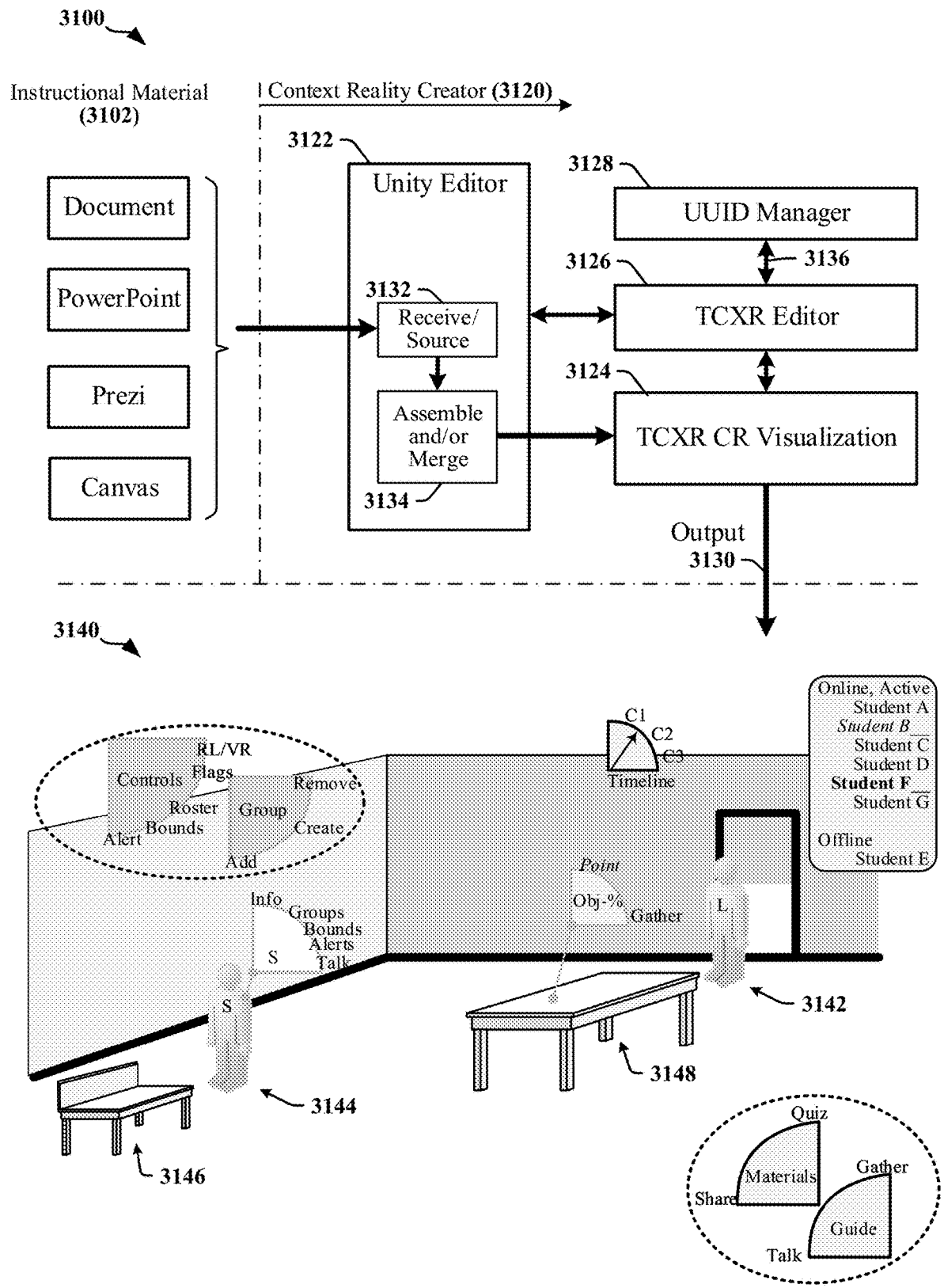
FIG. 31 illustrates an example of a system for converting instructional material into one or more reality contexts constructed in accordance with certain aspects disclosed herein.

FIG. 31 illustrates an example of a system 3100 in which a docent, instructor, guide, trainer, escort or other leader can input an instructional course syllabus, lesson plans or similar instructional material 3102 into a TCXR Context Reality Creator ("CRC") Tool 3120 and have one or more reality contexts 3130 constructed for later use.

The CRC Tool 3120 allows leads or assigned editors to integrate prepared course material through the use of an available 3D editor 3122 (such as the UNITY® Editor) 3122 in conjunction with the TCXR CR editor 3126 and the TCXR CR Visualization Tool 3124. The 3D editor 3122 may include modules or circuits 3132 that receive or source instructional material 3102 and/or modules or circuits 3132 that assemble, edit and/or merge the instructional material 3102 to obtain an aggregated or assembled input. The aggregated or assembled input is provided to a TCXR CR Visualization tool 3124 that may parse the instructional material 3102 page-by-page, element-by-element and/or object-by-object and, with input or control from the leads or assigned editors, may identify not only objects of importance but also timelines, paths through various scenes and/or contexts, locations and expected participant activity. These will be further detailed below with reference to FIG. 32. The CRC Tool 3120 makes use of the TCXR CR Editor and/or the UUID manager 3128 to obtain, validate and input UUIDs 3136, including UUIDs 3136 corresponding to the expected owners of the output Context Reality(s) (R-UUIDs). The types of UUIDs managed by the UUID manager 3128 may include at least one or more institution UUID ("I-UUID"), one or more Group (i.e., class, instruction, lessons) UUID ("G-UUID") and/or one or more lead (i.e., docent, instructor, guide, escort, motivator, leader) UUID ("L-UUID"). In certain implementations, one or more Reality Context(s) ("R-UUID") can be generated by a single I-UUID or G-UUID or L-UUID or any combination of any of these or other UUIDs 3136 in quantities greater than one.

The TCXR CR Visualization tool 3124 may output reality contexts in a variety of formats. The leads or assigned editors may view the reality contexts in one or more of these formats. For example, a raw format may be used to provide a development visualization 3140 that includes one or more elements 3142, 3144 representing participant avatars, one or more objects 3146, 3148 and/or other features. The development visualization 3140 may assist in planning paths, transitions, gathering points and initial placement of control elements. In some implementations, development visualization 3140 may assist in planning variabilities associated with paths, transitions, gathering points and placement of control elements during active sessions where a lead can dynamically change preplanned or preconfigured parameters.

Figure 32:
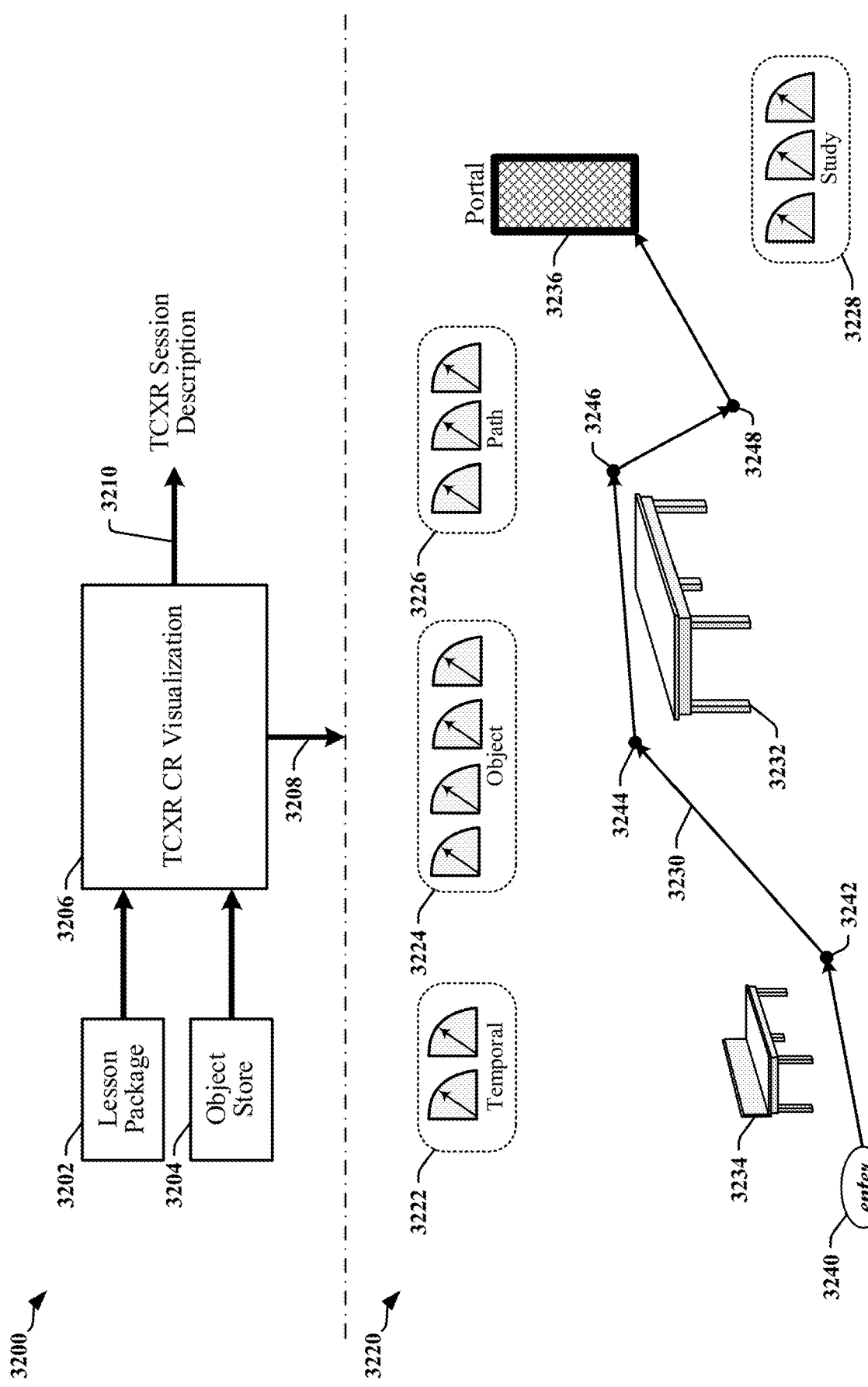
FIG. 32 illustrates a visualization tool provided in accordance with certain aspects disclosed herein.

FIG. 32 illustrates certain aspects associated with a system 3200 that includes a TCXR CR Visualization Tool 3206 provided in accordance with certain aspects of the disclosure. The TCXR CR Visualization Tool 3206 may correspond to the TCXR CR Visualization Tool 3124 illustrated in FIG. 31. As such, the TCXR CR Visualization tool 3206 may output reality contexts 3208, 3210 in a variety of formats. The TCXR CR Visualization Tool 3206 may permit the leads or assigned editors to identify not only objects of importance but also expected participant activity, timelines, paths 3230, gathering points 3242, 3244 3246, 3248 and other locations including points of entry 3240, and portals 3236. The TCXR CR Visualization Tool 3206 may provide leads with the ability to identify objects in their lesson package 3202, such as a table 3232, a seat 3234, a homestead, etc. These identified objects 3232, 3234 may be retrieved from a 2D or 3D object store 3204 (such as Unity Store) enabling the author to choose an object to use in the reality context. A chosen object, such as the 3D table 3232, may be assigned a target position in the reality context, together with various controls 3222, 3224, 3226, 3228. The TCXR CR Visualization Tool 3206 may be provided an object UUID ("Oo-UUID") and other meta-data corresponding to the Oo-UUID. In one example, the author may decide whether the temporal dials 3222 if the object is to be visible for the entire duration of the session, for a portion of the session, displayed in response to a trigger or command from the leader of the session. In another example, one or more objects 3232, 3234 may be invisible in an initial scene or context, until invoked by the leader of the session. In another example, one or more objects 3232, 3234 may be invisible in an initial scene or context, until invoked through a portal 3236.

Certain characteristics, including location, size, visibility and other attributes of one or more objects 3232, 3234 may be controlled using one or more Object Dials 3224, which may have an appearance configured by an author, editor and/or by the leader of the session. In one example, the leader of the session may configure one or more objects 3232, 3234 to be a pop-up object, be associated with a gather feature and/or be selected for a "look at" feature. In another example, the author may choose to provide and configure an invisible mode for participants, including the lead, when selecting a gather or look at function.

In another example, an author can assign a path 3230 (or multiple paths) within a reality context. The path 3230 can be used to track participants passage within the scene or context and/or deviation from the path 3230 or a selected path. The path 3230 may be followed by participants when walking between objects 3232, 3234 or portals 3236. When authors set up these paths, they can assign alerts to be triggered based on distance from the lead, from the path 3230, from gathering points 3242, 3244 3246, 3248, and/or from objects 3232, 3234. A further capability for the author to determine is how the object behaves relative to the temporal effect, which may be indicate or be configured by the study dials 3228. The study dials 3228 may provide controls that affect the time at which an object should initially be looked at, the anticipated time of departure from the object and a trigger 3256 used to alert the lead when the actual time is either less or more than configured or expected.

In another example, an object identified in the lesson package 3202 may correspond to a homestead, different scene or different reality context that is accessible through a portal 3236. The portal 3236 may be created for the purpose of transporting participants to a rendered 3D object of the homestead, different scene or different reality context. In some instances, a homestead may be found or purchased through an object store or similar.

Configurable controls 3222, 3224, 3226, 3228 may be initially set to default values based upon the author's prior history. The values associated with the controls 3222, 3224, 3226, 3228 can be modified in real-time by the lead or even be modified by AIVA in real-time if allowed.

Other types of UUIDS may be used within reality contexts in conjunction with the object UUID ("Oo-UUID), such as presentation UUID (Op-UUID", theatre UUID ("Ot-UUID"), Portal UUID ("Or-UUID"), Location UUID ("Ol-UUID") as well as other types of UUIDs to identify or illustrate temporal locations ("CL-UUID"), trigger points ("CT-UUID") or marked points ("CM-UUID").

The objects may be tagged with an identifier that shows the author may use it in other context realities. In some instances, the Commons XR Manager 900 may associate licensing and other contractual rights associated with the object not only for that reality context, but also for any other reality contexts that may be configured to use that same object (see also, the Interservice Purchase subsystem 928 and DRM subsystem 930 illustrated in FIG. 9). That object in other reality contexts may have other characteristics depending upon how the author determined settings for Temporal dials 3222, Object Dials 3224, Path Object Dials 3226 and Study Dials 3228 for instance.

Authors may also decide to include a visible AVIA within the reality context. All object characteristics may be used on AVIA as needed or wanted. In some cases, the object characteristics may be disabled.

Example of a Processing Circuit

Figure 33:
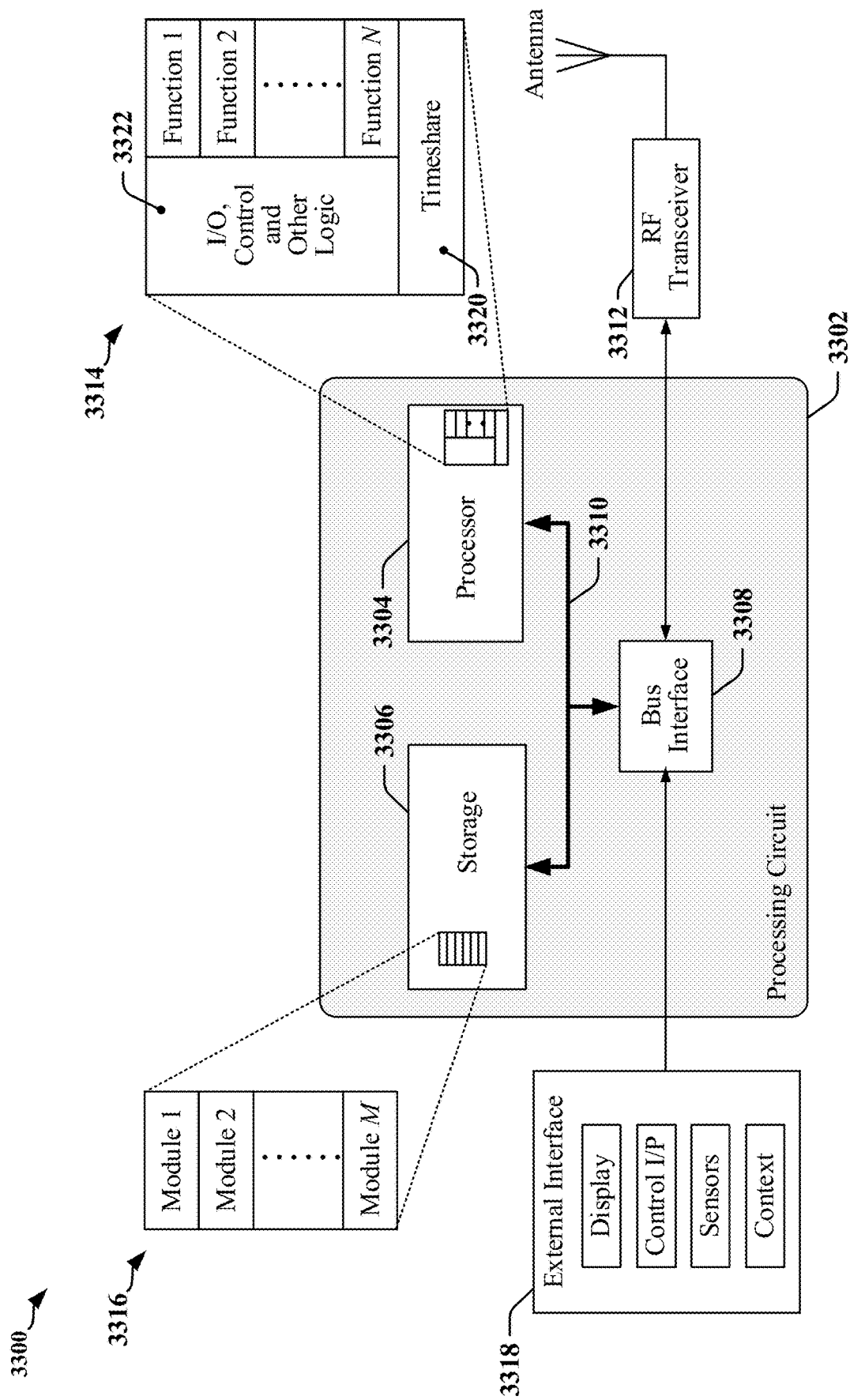
FIG. 33 illustrates one example of an apparatus employing a processing circuit that may be adapted according to certain aspects disclosed herein.

FIG. 33 is a diagram illustrating an example of a hardware implementation for an apparatus 3300. In some examples, the apparatus 3300 may perform one or more functions disclosed herein. In accordance with various aspects of the disclosure, an element, or any portion of an element, or any combination of elements as disclosed herein may be implemented using a processing circuit 3302. The processing circuit 3302 may include one or more processors 3304 that are controlled by some combination of hardware and software modules. Examples of processors 3304 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 3304 may include specialized processors that perform specific functions, and that may be configured, augmented or controlled by one of the software modules 3316. The one or more processors 3304 may be configured through a combination of software modules 3316 loaded during initialization, and further configured by loading or unloading one or more software modules 3316 during operation.

In the illustrated example, the processing circuit 3302 may be implemented with a bus architecture, represented generally by the bus 3310. The bus 3310 may include any number of interconnecting buses and bridges depending on the specific application of the processing circuit 3302 and the overall design constraints. The bus 3310 links together various circuits including the one or more processors 3304, and storage 3306. Storage 3306 may include memory devices and mass storage devices, and may be referred to herein as computer-readable media and/or processor-readable media. The storage 3306 may include transitory storage media and/or non-transitory storage media.

The bus 3310 may also link various other circuits such as timing sources, timers, peripherals, voltage regulators, and power management circuits. A bus interface 3308 may provide an interface between the bus 3310 and one or more transceivers 3312. Depending upon the nature of the apparatus 3300, a user interface 3318 (e.g., keypad, display, speaker, microphone, joystick) may also be provided, and may be communicatively coupled to the bus 3310 directly or through the bus interface 3308.

A processor 3304 may be responsible for managing the bus 3310 and for general processing that may include the execution of software stored in a computer-readable medium that may include the storage 3306. In this respect, the processing circuit 3302, including the processor 3304, may be used to implement any of the methods, functions and techniques disclosed herein. The storage 3306 may be used for storing data that is manipulated by the processor 3304 when executing software, and the software may be configured to implement any one of the methods disclosed herein.

One or more processors 3304 in the processing circuit 3302 may execute software.

Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 3306 or in an external computer-readable medium. The external computer-readable medium and/or storage 3306 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 3306 may also include, by way of example, a carrier wave, a transmission line, and any other suitable medium for transmitting software and/or instructions that may be accessed and read by a computer. Computer-readable medium and/or the storage 3306 may reside in the processing circuit 3302, in the processor 3304, external to the processing circuit 3302, or be distributed across multiple entities including the processing circuit 3302. The computer-readable medium and/or storage 3306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 3306 may maintain software maintained and/or organized in loadable code segments, modules, applications, programs, etc., which may be referred to herein as software modules 3316. Each of the software modules 3316 may include instructions and data that, when installed or loaded on the processing circuit 3302 and executed by the one or more processors 3304, contribute to a run-time image 3314 that controls the operation of the one or more processors 3304. When executed, certain instructions may cause the processing circuit 3302 to perform functions in accordance with certain methods, algorithms and processes described herein.

Some of the software modules 3316 may be loaded during initialization of the processing circuit 3302, and these software modules 3316 may configure the processing circuit 3302 to enable performance of the various functions disclosed herein. For example, some software modules 3316 may configure internal devices and/or logic circuits 3322 of the processor 3304, and may manage access to external devices such as a transceiver 3312, the bus interface 3308, the user interface 3318, timers, mathematical coprocessors, and so on. The software modules 3316 may include a control program and/or an operating system that interacts with interrupt handlers and device drivers, and that controls access to various resources provided by the processing circuit 3302. The resources may include memory, processing time, access to a transceiver 3312, the user interface 3318, and so on.

One or more processors 3304 of the processing circuit 3302 may be multifunctional, whereby some of the software modules 3316 are loaded and configured to perform different functions or different instances of the same function. The one or more processors 3304 may additionally be adapted to manage background tasks initiated in response to inputs from the user interface 3318, the transceiver 3312, and device drivers, for example. To support the performance of multiple functions, the one or more processors 3304 may be configured to provide a multitasking environment, whereby each of a plurality of functions is implemented as a set of tasks serviced by the one or more processors 3304 as needed or desired. In one example, the multitasking environment may be implemented using a timesharing program 3320 that passes control of a processor 3304 between different tasks, whereby each task returns control of the one or more processors 3304 to the timesharing program 3320 upon completion of any outstanding operations and/or in response to an input such as an interrupt. When a task has control of the one or more processors 3304, the processing circuit is effectively specialized for the purposes addressed by the function associated with the controlling task. The timesharing program 3320 may include an operating system, a main loop that transfers control on a round-robin basis, a function that allocates control of the one or more processors 3304 in accordance with a prioritization of the functions, and/or an interrupt driven main loop that responds to external events by providing control of the one or more processors 3304 to a handling function.

Figure 34:
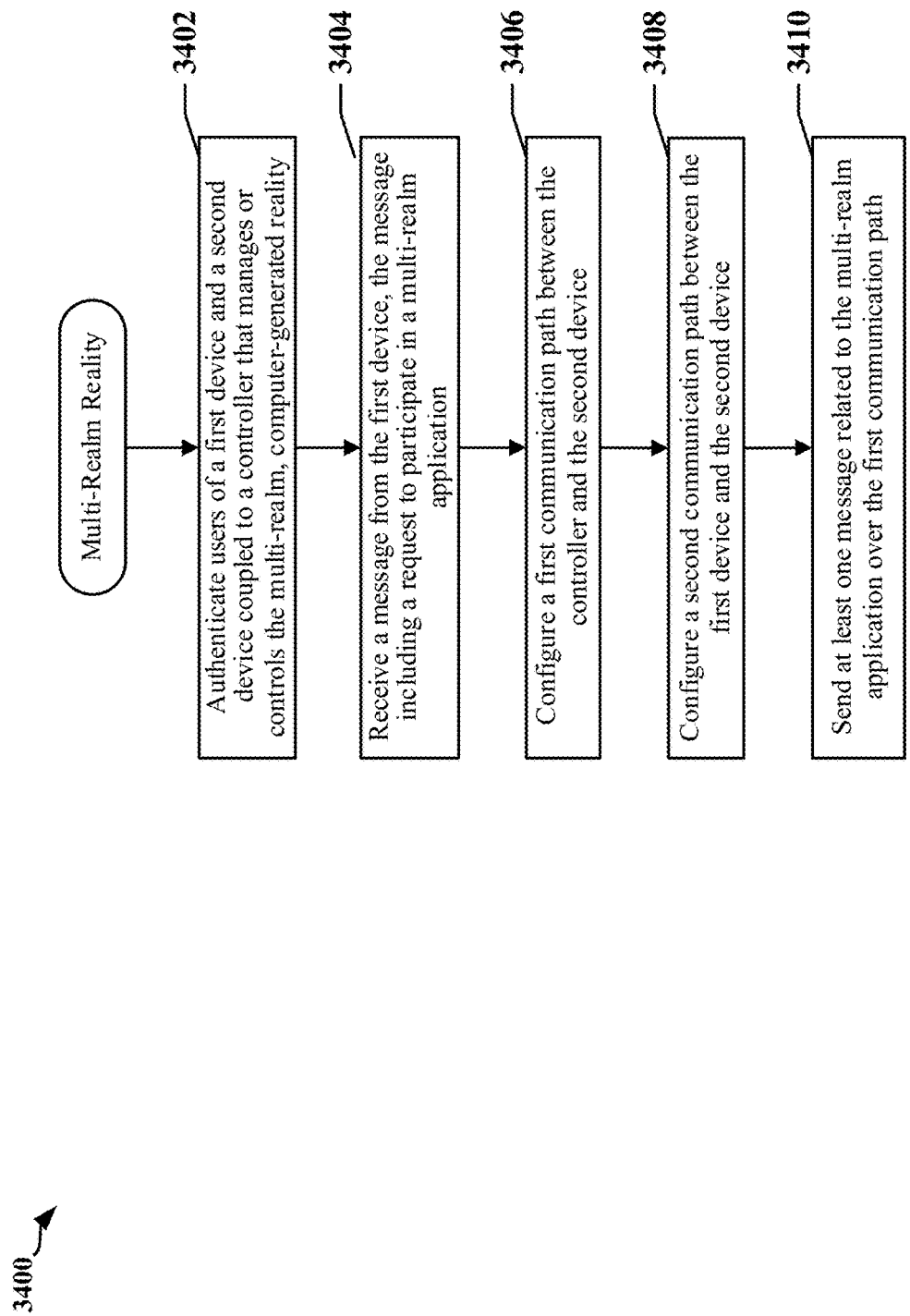
FIG. 34 is a flowchart illustrating a method for establishing a multi-realm, computer-generated reality in accordance with certain aspects disclosed herein.

FIG. 34 is a flowchart 3400 illustrating a method for establishing a multi-realm, computer-generated reality. The method may be performed by the Commons XR Manager

900 or another controller that can manage or control a multi-device VR, AR and/or XR system. At block 3402, the controller authenticates users of a first device and a second device coupled to to controller that manages or controls the multi-realm, computer-generated reality. At block 3404, the controller receives a message from the first device, the message including a request to participate in a multi-realm application. At block 3406, the controller configures a first communication path between the controller and the second device. At block 3408, the controller configures a second communication path between the first device and the second device. At block 3410, the controller may send at least one message related to the multi-realm application over the first communication path.

In some implementations, the method may establish presence of a second participant of a second reality context in the computer-generated reality through a second logical connection while maintaining presence of the second participant in a second reality context. The method may include configuring a third logical connection between the computer-generated reality and a third reality context, and integrating content provided over the third logical connection by the content provider into the computer-generated reality. The content may include a video feed, an audio feed, an image or a 3D representation of an object. In some instances, the content includes access to another computer-generated reality maintained by the content provider.

In certain examples, the method includes monitoring activities of the first participant and the second participant in the computer-generated reality through respective logical connections, and communicating status of the first participant and the second participant to an instructor or guide through a third logical connection established between the computer-generated reality and a fourth reality context associated with the instructor. The method may include receiving control information representative of manipulation of one or more control mechanisms in the computer-generated reality, and modifying the computer-generated reality experienced by the first participant or the second participant responsive to the control information. The control mechanisms may be displayed in the fourth reality context and concealed in the first reality context.

In some examples, modifying the computer-generated reality includes terminating presence of the first participant or the second participant. Modifying the computer-generated reality may include moving along a timeline of the computer-generated reality. Modifying the computer-generated reality may include adding or removing an object from the computer-generated reality.

In some implementations, the method includes importing a 3D representation of an object from a different computer-generated reality. Importing the 3D representation of an object may include obtaining permission from an owner of the 3D representation prior to importation, and associating the 3D representation with the first participant.

In some implementations, establishing presence of the first participant includes configuring a tactile feed between first reality context and the computer-generated reality. The computer-generated reality may include a simulation or a computer-generated reality implements an experiential teaching reality.

Figure 35:
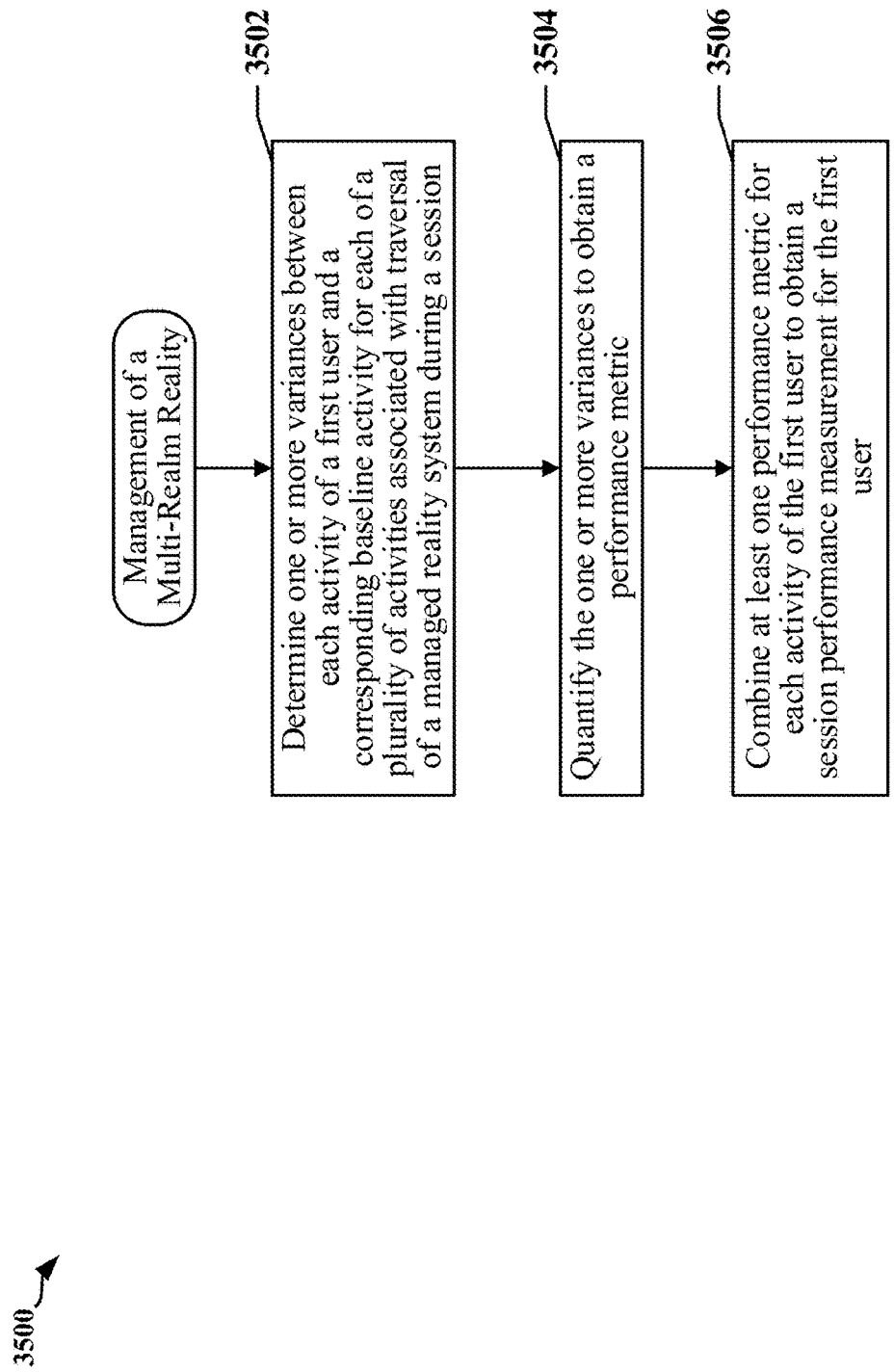
FIG. 35 is a flowchart illustrating a first example of a method for managing a multi-realm, computer-generated reality in accordance with certain aspects disclosed herein.

FIG. 35 is a flowchart 3500 illustrating a method for managing a multi-realm, computer-generated reality. At block 3502, a manager may determine one or more variances between each activity of a first participant and a corresponding baseline activity for each of a plurality of activities associated with traversal of a managed reality system during a session. At block 3504, the manager may quantify the one or more variances to obtain a performance metric. At block 3506, the manager may combine at least one performance metric for each activity of the first participant to obtain a session performance measurement for the first participant.

In some implementations, the baseline activity relates to a leader of the session. The baseline activity may be obtained from an aggregation of prior sessions. The one or more variances may include a difference in location of an avatar of the first participant from an avatar of a leader of the session. The one or more variances may include a difference in time of arrival of an avatar of the first participant at a location and a corresponding time of arrival of an avatar of a leader of the session at the location. The one or more variances may include a difference in time of departure of an avatar of the first participant from a location and a corresponding time of departure of an avatar of a leader of the session from the location. The one or more variances may include a difference in dwell time of an avatar of the first participant at a location and a corresponding dwell time of an avatar of a leader of the session at the location.

In certain implementations, the method includes determining a level of attention parameter for the first participant based on input received from one or more sensors managed by equipment operated by the first participant while participating in the session, and combining the level of attention parameter with the at least one performance metric for each activity of the first participant when obtaining the session performance measurement for the first participant. The one or more sensors may include a motion sensor. The one or more sensors may include a location sensor. The one or more sensors may include an audio sensor.

In some implementations, determining the level of attention parameter includes monitoring chat activity of the first participant. Determining the level of attention parameter may include monitoring accesses of system information by the first participant. The computer-generated reality may involve a simulation. The computer-generated reality may implement an experiential teaching reality.

Figure 36:
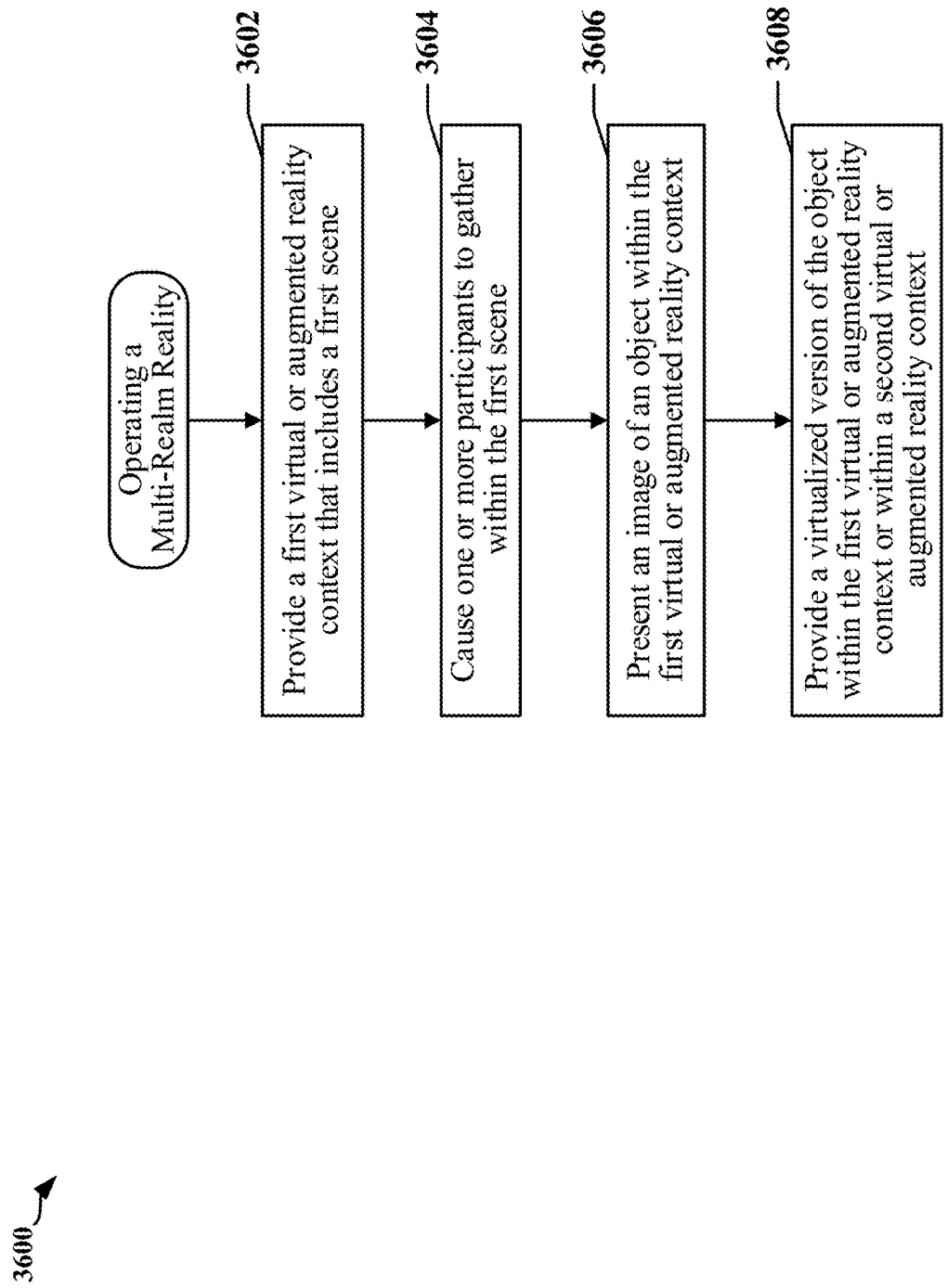
FIG. 36 is a flowchart illustrating a method for operating a multi-realm, computer-generated reality in accordance with certain aspects disclosed herein.

FIG. 36 is a flowchart 3600 illustrating a method for operating a virtual reality system. The virtual reality system may be a multi-realm, computer-generated reality that may be operated using a VR/AR/XR manager. At block 3602, the manager may provide a first virtual or augmented reality context that includes a first scene. At block 3604, the manager may cause one or more participants to gather within the first scene. At block 3606, the manager may present an image of an object within the first virtual or augmented reality context. At block 3608, the manager may provide a virtualized version of the object within the first virtual or augmented reality context or within a second virtual or augmented reality context.

In some instances, the virtualized version of the object may be provided by providing a three-dimensional representation of the object within the first scene. In some instances, the virtualized version of the object may be provided by providing a portal that provides passage between the first virtual or augmented reality context and the second virtual or augmented reality context, and providing a three-dimensional representation of the object within a second scene that is provided in the second virtual or augmented reality context.

The manager may cause the one or more participants to gather near the virtualized version of the object, and suppress visual representations of a plurality of participants provided to a first participant within the virtual reality system, thereby causing the plurality of participants to enter an invisibility mode. The manager may restore the visual representation of a second participant when the second participant is separated from the first participant by a minimum distance configured for the virtual reality system. The first virtual or augmented reality context may be generated by an editor that defines a plurality of scenes, one or more objects included in each scene and a timeline for traversing the plurality of scenes. The editor may generate each scene from a lesson plan.

Figure 37:
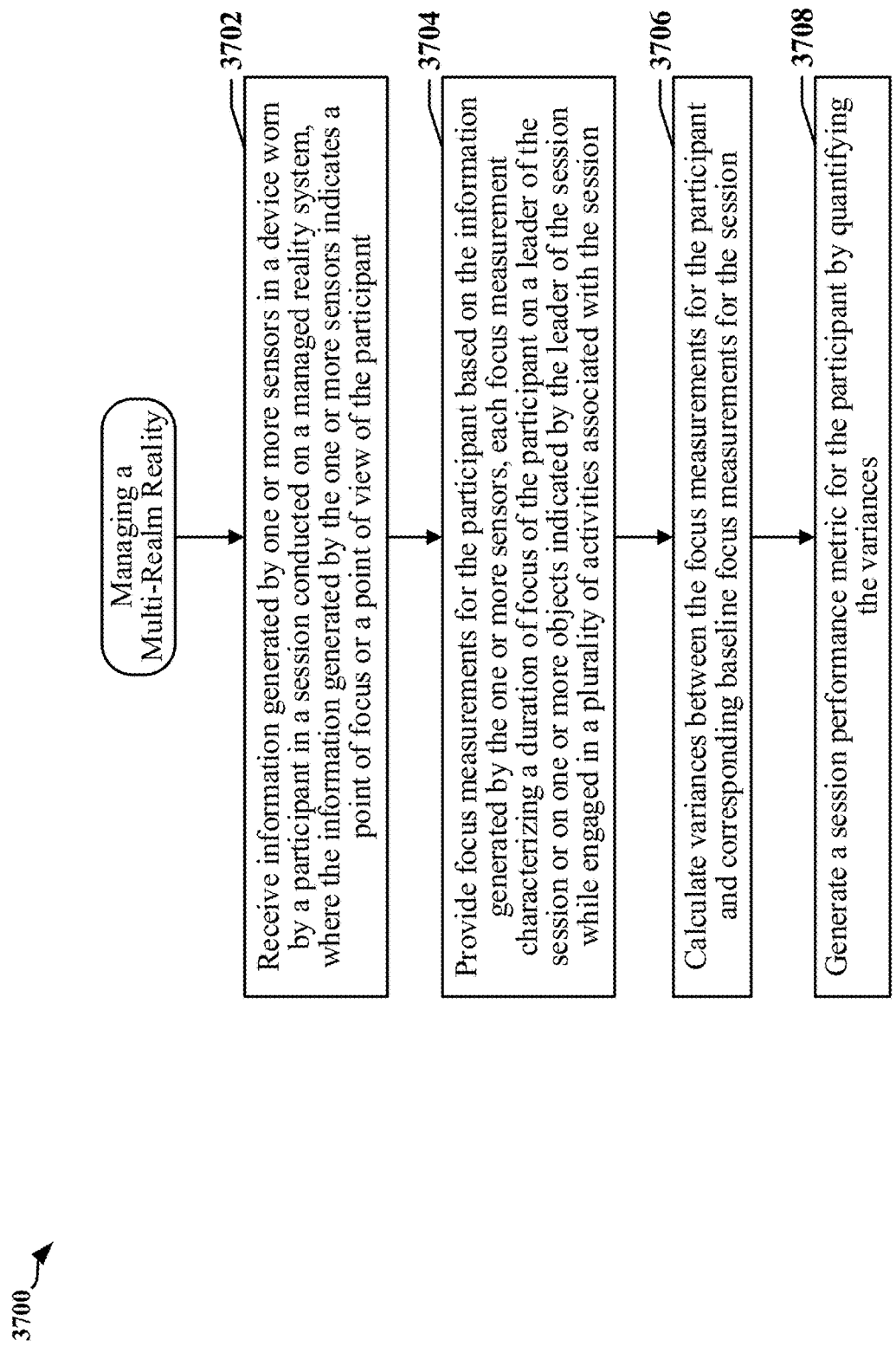
FIG. 37 is a flowchart illustrating a second example of a method for managing a multi-realm, computer-generated reality in accordance with certain aspects disclosed herein.

FIG. 37 is a flowchart 3700 illustrating a method for managing a virtual reality system. The virtual reality system may be a multi-realm, computer-generated reality that may be operated using a VR/AR/XR manager. At block 3702, the manager may receive information generated by one or more sensors in a device worn by a participant in a session conducted on a managed reality system. The information generated by the one or more sensors may indicate a point of focus or a point of view of the participant. At block 3704, the manager may provide focus measurements for the participant based on the information generated by the one or more sensors. Each focus measurement may characterize a duration of focus of the participant on a leader of the session or on one or more objects indicated by the leader of the session while engaged in a plurality of activities associated with the session. In some instances, a focus measurement may indicate a point in time when the participant first focused on the leader of the session or on an object indicated by the leader of the session, a point in time when the participant last focused on the leader of the session or on an object indicated by the leader of the session, or some other temporal aspect of an activity. At block 3706, the manager may calculate variances between the focus measurements for the participant and corresponding baseline focus measurements for the session. At block 3708, the manager may generate a session performance metric for the participant by quantifying the variances.

In one example, the manager may authenticate a user of a reality context at a controller that manages or controls the multi-realm, computer-generated reality, configure a logical connection between the reality context and the multi-realm, computer-generated reality using one or more physical communication channels, and establish presence of the user as the participant in the multi-realm, computer-generated reality through the logical connection while maintaining presence of the user in the reality context.

In one example, the baseline focus measurements are obtained by statistical analysis of focus measurements for a plurality of participants in the session. The baseline focus measurements may be based on aggregate focus measurements of a plurality of participants in a plurality of sessions conducted on the managed reality system. The baseline focus measurements may include a measurement of relative difference between locations of an avatar of the participant and an avatar of the leader of the session. The baseline focus measurements may include a measurement of relative difference between locations of an avatar of the participant and an object indicated by the leader of the session. The baseline focus measurements may include a difference in time of arrival of an avatar of the participant at a location and a corresponding time of arrival of an avatar of a leader of the session at the location. The baseline focus measurements may include a difference in dwell time or time of departure of an avatar of the participant from a location and a corresponding time of departure of an avatar of a leader of the session from the location.

In one example, the variances include a difference in dwell time of an avatar of the participant at a location and a corresponding dwell time of an avatar of a leader of the session at the location. The variances may include a difference in time of arrival of the avatar of the participant at the location and a corresponding time of arrival of the avatar of the leader of the session at the location. The variances may include a difference in time of departure of the avatar of the participant at the location and a corresponding time of departure of the avatar of the leader of the session at the location. The location may be a gathering point.

In one example, the one or more sensors include a motion sensor or a location sensor, a camera. The variances may include a distance of an avatar of the participant from an avatar of a leader of the session. The variances may include a distance of the avatar of the participant from an object pointed out by the leader of the session. The variances may include a difference in distance of the avatar of the participant from a location and the distance of the avatar of the leader of the session from the location. The location may be a gathering point.

In certain examples, providing the focus measurements for the participant includes monitoring chat activity of the participant. Providing the focus measurements for the participant may include monitoring accesses of system information by the participant.

In one example, the manager may provide focus measurements for a plurality of participants to a leader of the session. The manager may display activity performance metrics for a plurality of participants to a leader of the session as corresponding session performance metrics are being generated. The computer-generated reality may include a simulation. The computer-generated reality may implement an experiential teaching reality.

Figure 38:
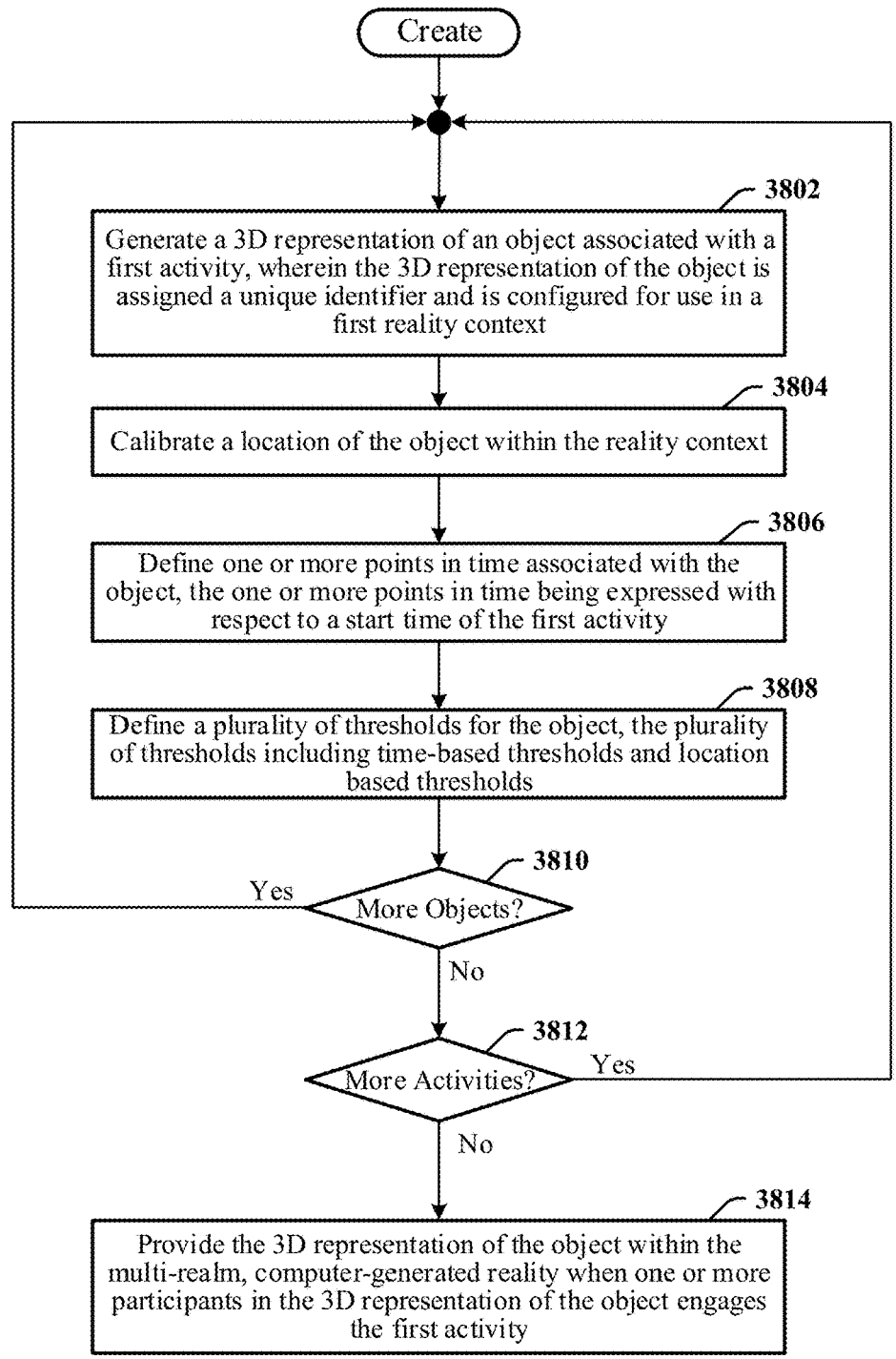
FIG. 38 is a flowchart 3800 illustrating a method for creating a virtual reality system in accordance with certain aspects of this disclosure.

FIG. 38 is a flowchart 3800 illustrating a method for creating a virtual reality system in accordance with certain aspects of this disclosure. The virtual reality system may be a multi-realm, computer-generated reality that may be operated using a VR/AR/XR manager. At block 3802, a 3D representation of an object associated with a first activity may be generated. The 3D representation of the object may be assigned a unique identifier and may be configured for use in a first reality context. At block 3804, a location of the object may be defined or calibrated within the reality context. At block 3806, one or more points in time associated with the object may be defined. The one or more points in time may be expressed with respect to a start time of the first activity. At block 3808, a plurality of thresholds may be defined for the object. The of thresholds may include time-based thresholds and location based thresholds. At block 3810, it may be determined whether 3D representations are to be generated for additional objects associated with the first activity. If 3D representations are to be generated for additional objects then the method continues at block 3802. If no further 3D representations are to be generated for the first activity, then at block 3812, it may be determined whether additional activities have been defined or configured. In additional activities have been defined or configured, then the method continues at block 3802 for the next activity. When no additional activities have been defined or configured, then the method continues at block 3814. At block 3814, the three-dimensional representation of the object may be provided within the multi-realm, computer-generated reality when one or more participants in the three-dimensional representation of the object engages the first activity.

In certain examples, the one or more points in time associated with the object identify when the three-dimensional representation of the object is visible within the multi-realm, computer-generated reality. The one or more points in time associated with the object may identify a start time and an end time for viewing the three-dimensional representation of the object. The plurality of thresholds may include a maximum time period between the start time and the end time. The plurality of thresholds may include a minimum time period between the start time and the end time. The plurality of thresholds may include an earliest start time for viewing the three-dimensional representation of the object. The plurality of thresholds may include a latest time for viewing the three-dimensional representation of the object. The plurality of thresholds may include a maximum distance for viewing the three-dimensional representation of the object, the maximum distance being calculated from the location of the object within the reality context.

In certain implementations, the three-dimensional representation of the object includes licensing information or information that defines rights and privileges associated with the object when provided within the multi-realm, computer-generated reality. In one example, the information that defines rights and privileges associated with the object may be related to negotiated, purchased and/or sold rights by the DRM module 930 provided in the system manager 904 of the illustrated Commons XR Manager 900 in FIG. 9.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for.".

What is claimed is:

1. A method for managing a multi-realm, computer-generated reality, comprising:
   receiving information generated by one or more sensors in a device worn by a participant in a session conducted on a managed reality system, where the information generated by the one or more sensors indicates a point of focus or a point of view of the participant;
   providing focus measurements for the participant based on the information generated by the one or more sensors, each focus measurement characterizing a duration of focus of the participant on a leader of the session or on one or more objects indicated by the leader of the session while engaged in a plurality of activities associated with the session;
   calculating variances between the focus measurements for the participant and corresponding baseline focus measurements for the session; and
   generating a session performance metric for the participant by quantifying the variances,
   wherein the baseline focus measurements include a difference in time of arrival of an avatar of the participant at a location and a corresponding time of arrival of an avatar of a leader of the session at the location.

2. The method of claim 1, further comprising:
   authenticating a user of a reality context at a controller that manages or controls the multi-realm, computer-generated reality;
   configuring a logical connection between the reality context and the multi-realm, computer-generated reality using one or more physical communication channels; and
   establishing presence of the user as the participant in the multi-realm, computer-generated reality through the logical connection while maintaining presence of the user in the reality context.

3. The method of claim 1, wherein the baseline focus measurements are obtained by statistical analysis of focus measurements for a plurality of participants in the session.

4. The method of claim 1, wherein the baseline focus measurements are based on aggregate focus measurements of a plurality of participants in a plurality of sessions conducted on the managed reality system.

5. The method of claim 1, wherein the baseline focus measurements include a measurement of relative difference between locations of an avatar of the participant and an avatar of the leader of the session.

6. The method of claim 1, wherein the baseline focus measurements include a measurement of relative difference between locations of an avatar of the participant and an object indicated by the leader of the session.

7. The method of claim 1, wherein the baseline focus measurements include a difference in dwell time or time of departure of an avatar of the participant from a location and a corresponding time of departure of an avatar of a leader of the session from the location.

8. The method of claim 1, wherein the one or more sensors include a motion sensor or a location sensor.

9. The method of claim 1, wherein the one or more sensors include a camera.

10. The method of claim 1, wherein providing the focus measurements for the participant comprises:
    monitoring chat activity of the participant.

11. The method of claim 1, wherein providing the focus measurements for the participant comprises:
    monitoring accesses of system information by the participant.

12. The method of claim 1, further comprising:
    providing focus measurements for a plurality of participants to a leader of the session.

13. The method of claim 1, further comprising:
    displaying activity performance metrics for a plurality of participants to a leader of the session as corresponding session performance metrics are being generated.

14. The method of claim 1, wherein the computer-generated reality comprises a simulation.

15. The method of claim 1, wherein the computer-generated reality implements an experiential teaching reality.

16. A method for managing a multi-realm, computer-generated reality, comprising:
    receiving information generated by one or more sensors in a device worn by a participant in a session conducted on a managed reality system, where the information generated by the one or more sensors indicates a point of focus or a point of view of the participant;
    providing focus measurements for the participant based on the information generated by the one or more sensors, each focus measurement characterizing a duration of focus of the participant on a leader of the session or on one or more objects indicated by the leader of the session while engaged in a plurality of activities associated with the session;

calculating variances between the focus measurements for the participant and corresponding baseline focus measurements for the session; and generating a session performance metric for the participant by quantifying the variances, wherein the variances comprise a difference in dwell time of an avatar of the participant at a location and a corresponding dwell time of an avatar of a leader of the session at the location.

17. A method for operating a virtual reality system, comprising:

providing a first virtual or augmented reality context that includes a first scene;

causing one or more participants to gather within the first scene;

presenting an image of an object within the first virtual or augmented reality context;

providing a virtualized version of the object within the first virtual or augmented reality context or within a second virtual or augmented reality context; and suppressing visual representations of a plurality of participants provided to a first participant within the virtual reality system, thereby causing the plurality of participants to enter an invisibility mode, when the one or more participants to gather near the virtualized version of the object.

18. The method of claim 17, wherein providing a virtualized version of the object comprises:

providing a three-dimensional representation of the object within the first scene.

19. The method of claim 17, wherein providing a virtualized version of the object comprises:

providing a portal that provides passage between the first virtual or augmented reality context and the second virtual or augmented reality context; and providing a three-dimensional representation of the object within a second scene that is provided in the second virtual or augmented reality context.

20. The method of claim 17, further comprising:

causing the one or more participants to gather near the virtualized version of the object.

21. The method of claim 20, further comprising:

restoring the visual representation of a second participant when the second participant is separated from the first participant by a minimum distance configured for the virtual reality system.

22. A method for creating a multi-realm, computer-generated reality, comprising:

for each of a plurality of activities defined in one or more documents:

generating a three-dimensional representation of an object associated with a first activity, wherein the three-dimensional representation of the object is assigned a unique identifier and is configured for use in a first reality context;

calibrating a location of the object within the reality context;

defining one or more points in time associated with the object, the one or more points in time being expressed with respect to a start time of the first activity; and defining a plurality of thresholds for the object, the plurality of thresholds including time-based thresholds and location based thresholds; and providing the three-dimensional representation of the object within the multi-realm, computer-generated reality when one or more participants in the three-dimensional representation of the object engages the first activity, wherein the one or more points in time associated with the object identify a start time and an end time for viewing the three-dimensional representation of the object and wherein the plurality of thresholds include a maximum time period between the start time and the end time.

23. The method of claim 22, wherein the one or more points in time associated with the object identify when the three-dimensional representation of the object is visible within the multi-realm, computer-generated reality.

24. The method of claim 22, wherein the plurality of thresholds include a minimum time period between the start time and the end time.

25. The method of claim 22, wherein the plurality of thresholds include an earliest start time for viewing the three-dimensional representation of the object.

26. The method of claim 22, wherein the plurality of thresholds include a latest time for viewing the three-dimensional representation of the object.

27. The method of claim 22, wherein the plurality of thresholds include a maximum distance for viewing the three-dimensional representation of the object, the maximum distance being calculated from the location of the object within the reality context.

28. The method of claim 22, wherein the three-dimensional representation of the object includes licensing information or information that defines rights and privileges associated with the object when provided within the multi-realm, computer-generated reality.

* * * * *